United States Patent
Kawamura

(10) Patent No.: US 10,295,802 B2
(45) Date of Patent: May 21, 2019

(54) ZOOM OPTICAL SYSTEM AND IMAGE PICKUP APPARATUS USING THE SAME

(71) Applicant: OLYMPUS CORPORATION, Hachioji-shi, Tokyo (JP)

(72) Inventor: Kazuteru Kawamura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 199 days.

(21) Appl. No.: 15/479,626

(22) Filed: Apr. 5, 2017

(65) Prior Publication Data
US 2017/0293124 A1 Oct. 12, 2017

(30) Foreign Application Priority Data

Apr. 6, 2016 (JP) .................. 2016-076429
Apr. 6, 2016 (JP) .................. 2016-076430
Apr. 6, 2016 (JP) .................. 2016-076536

(51) Int. Cl.
*G02B 15/14* (2006.01)
*G02B 15/163* (2006.01)
(Continued)

(52) U.S. Cl.
CPC ....... *G02B 15/163* (2013.01); *G02B 27/0025* (2013.01); *G02B 3/14* (2013.01);
(Continued)

(58) Field of Classification Search
CPC ............ G02B 13/0045; G02B 27/0025; G02B 27/646; G02B 13/18; G02B 9/62;
(Continued)

(56) References Cited

U.S. PATENT DOCUMENTS 6,449,433 B2   9/2002   Hagimori et al.
7,126,759 B2   10/2006  Sensui
(Continued)

FOREIGN PATENT DOCUMENTS

JP   2001350093 A   12/2001
JP   2005049843 A   2/2005
(Continued)

OTHER PUBLICATIONS

Related U.S. Appl. No. 15/479,673, filed Apr. 5, 2017, First Named Inventor: Kazuteru Kawamura, Title: "Variable Magnification Optical System and Image Pickup Apparatus Using the Same".
(Continued)

*Primary Examiner* — Evelyn A Lester
(74) *Attorney, Agent, or Firm* — Holtz, Holtz & Volek PC

(57) ABSTRACT

A zoom optical system includes a plurality of lens units, the plurality of lens units consist of lens units having a positive refractive power and lens units having a negative refractive power, and the lens units having a positive refractive power include a positive lens unit and an image-side positive lens unit, the image-side positive lens unit is not moved, in the lens plurality of units, a space between the lens units disposed adjacently is changed at a time of zooming, at a time of focusing, or at a time of zooming and at a time of focusing, the positive lens unit includes a predetermined positive lens satisfying the following Conditional Expression (2), and the following Conditional Expression (1) is satisfied:

$0.1 \leq fGBUN1/fGPM \leq 2.1$ (1), and $60.8 \leq vdGPMP1 \leq 100.0$ (2).

61 Claims, 21 Drawing Sheets

(51) Int. Cl.
*G02B 27/00* (2006.01)
*G02B 15/20* (2006.01)
*G02B 27/64* (2006.01)
*G02B 13/00* (2006.01)
*G02B 15/24* (2006.01)
*G02B 9/60* (2006.01)
*G02B 13/04* (2006.01)
*G02B 3/14* (2006.01)
*G02B 9/62* (2006.01)
*G02B 15/173* (2006.01)
*G02B 5/00* (2006.01)
*G02B 9/34* (2006.01)
*G02B 15/177* (2006.01)
*G02B 15/16* (2006.01)
*G02B 13/18* (2006.01)

(52) U.S. Cl.
CPC ............... *G02B 5/005* (2013.01); *G02B 9/34* (2013.01); *G02B 9/60* (2013.01); *G02B 9/62* (2013.01); *G02B 13/002* (2013.01); *G02B 13/009* (2013.01); *G02B 13/0045* (2013.01); *G02B 13/04* (2013.01); *G02B 13/18* (2013.01); *G02B 15/16* (2013.01); *G02B 15/173* (2013.01); *G02B 15/177* (2013.01); *G02B 15/20* (2013.01); *G02B 15/24* (2013.01); *G02B 27/646* (2013.01)

(58) Field of Classification Search
CPC ........ G02B 9/60; G02B 5/005; G02B 13/009; G02B 15/177; G02B 15/173; G02B 13/04; G02B 9/34; G02B 15/20; G02B 13/002; G02B 15/16; G02B 15/163; G02B 15/24; G02B 3/14
USPC ................. 359/557, 676–690, 713–716, 740
See application file for complete search history.

(56) References Cited

U.S. PATENT DOCUMENTS

| | | | |
|---|---|---|---|
| 8,605,362 B2 | 12/2013 | Ito | |
| 8,891,173 B2 | 11/2014 | Hagiwara | |
| 2009/0290232 A1* | 11/2009 | Hagiwara | G02B 15/173 359/695 |
| 2010/0053766 A1* | 3/2010 | Okada | G02B 15/177 359/686 |
| 2010/0134901 A1* | 6/2010 | Kimura | G02B 15/173 359/687 |
| 2011/0080653 A1* | 4/2011 | Kimura | G02B 15/173 359/683 |
| 2012/0300313 A1* | 11/2012 | Wada | G02B 15/173 359/690 |
| 2012/0314299 A1* | 12/2012 | Tashiro | G02B 13/0065 359/687 |
| 2014/0009652 A1* | 1/2014 | Sugita | G02B 15/22 348/294 |
| 2014/0036137 A1* | 2/2014 | Inoue | G02B 15/15 348/345 |
| 2014/0118603 A1* | 5/2014 | Saito | G02B 15/173 348/340 |
| 2015/0281588 A1* | 10/2015 | Izuhara | G02B 15/177 348/240.3 |
| 2017/0108676 A1 | 4/2017 | Hori | |

FOREIGN PATENT DOCUMENTS

| | | |
|---|---|---|
| JP | 2011175098 A | 9/2011 |
| JP | 2011221554 A | 11/2011 |
| JP | 2012113285 A | 6/2012 |

OTHER PUBLICATIONS

Related U.S. Appl. No. 15/479,714, filed Apr. 5, 2017, First Named Inventor: Kazuteru Kawamura, Title: "Variable Magnification Optical System and Image Pickup Apparatus Using the Same".
Office Action (Non Final Rejection) dated Jan. 14, 2019 issued in U.S. Appl. No. 15/479,714.

* cited by examiner

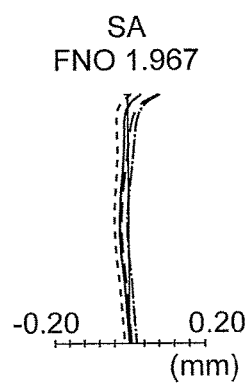
FIG. 9A
SA
FNO 1.967
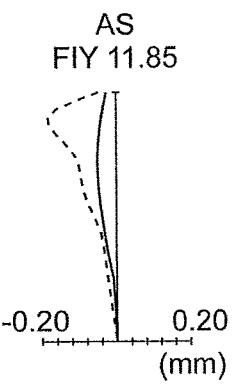
FIG. 9B
AS
FIY 11.85
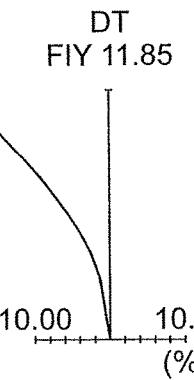
FIG. 9C
DT
FIY 11.85
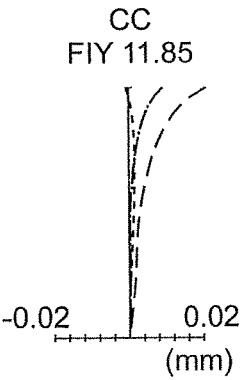
FIG. 9D
CC
FIY 11.85
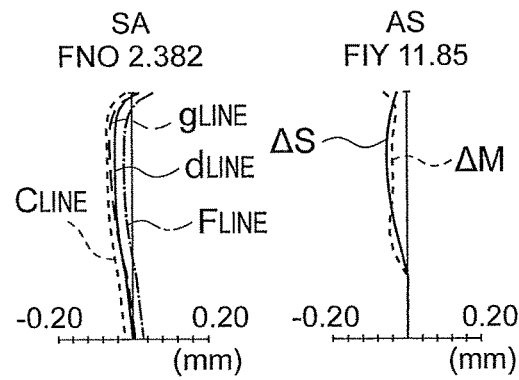
FIG. 9E
SA
FNO 2.382
FIG. 9F
AS
FIY 11.85
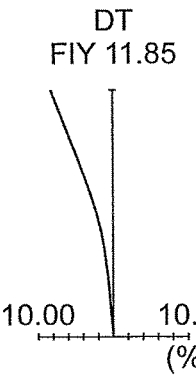
FIG. 9G
DT
FIY 11.85
FIG. 9H
CC
FIY 11.85
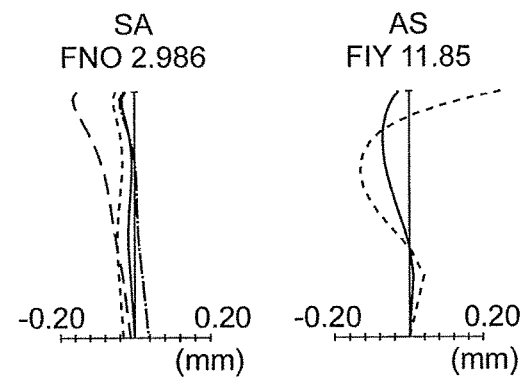
FIG. 9I
SA
FNO 2.986
FIG. 9J
AS
FIY 11.85
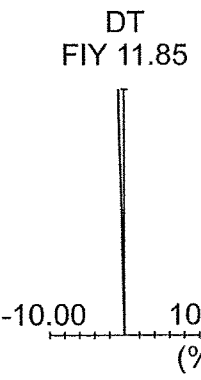
FIG. 9K
DT
FIY 11.85
FIG. 9L
CC
FIY 11.85
435.84
486.13
656.27
587.56

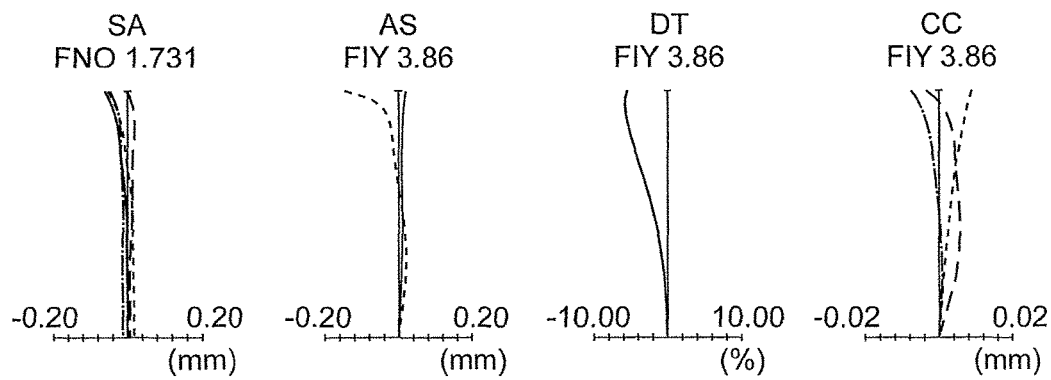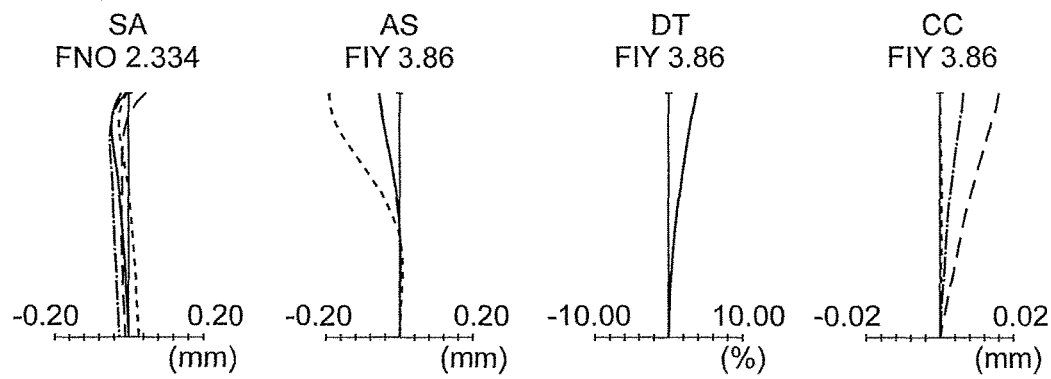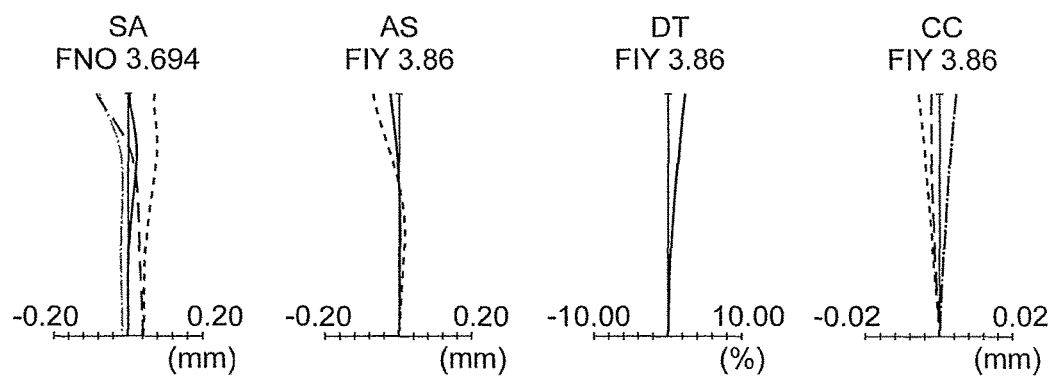

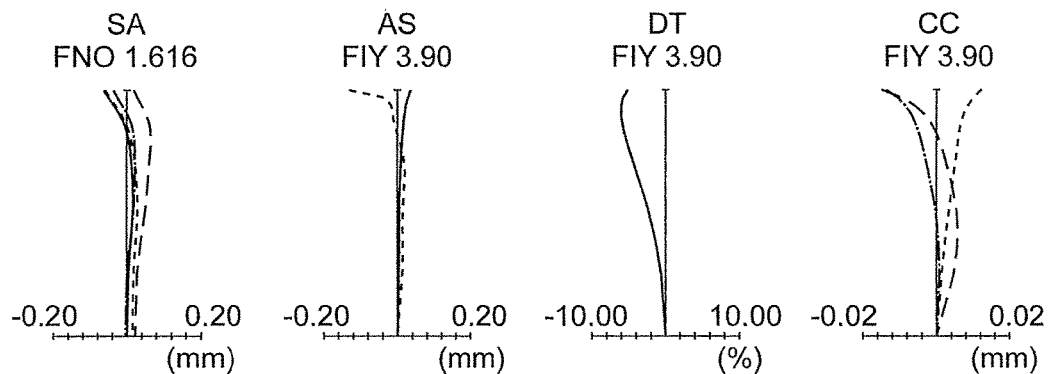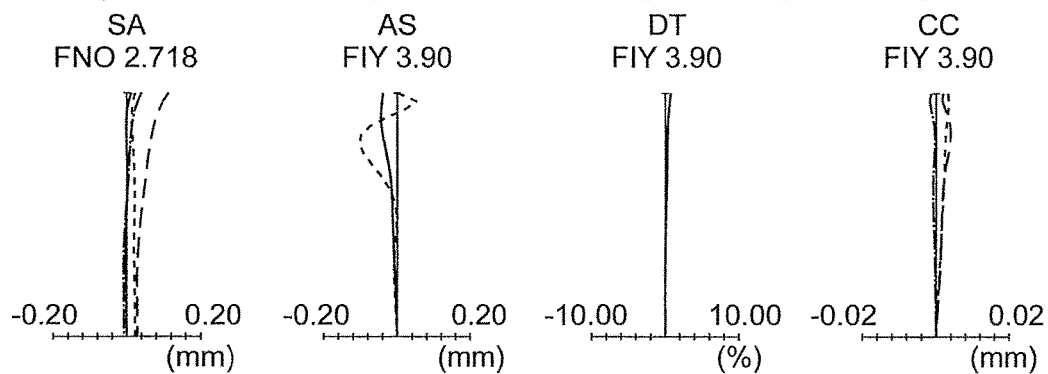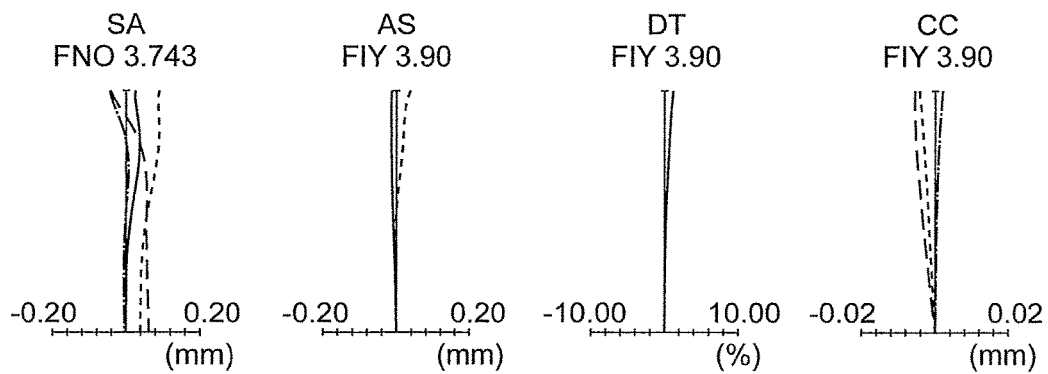

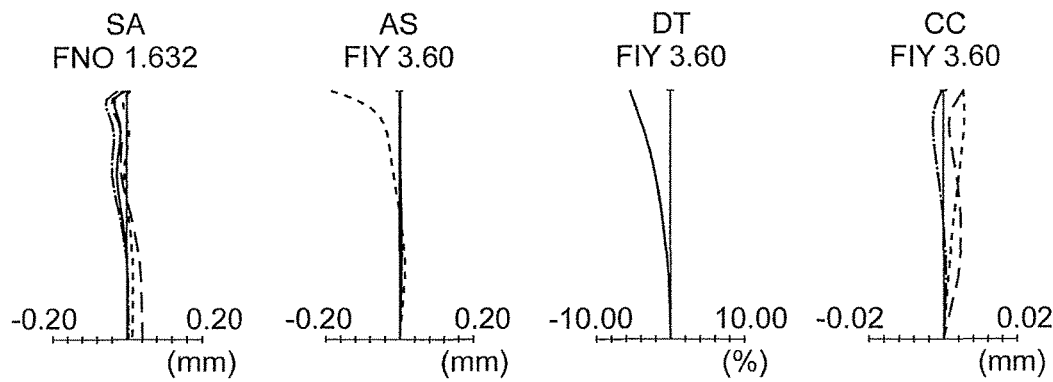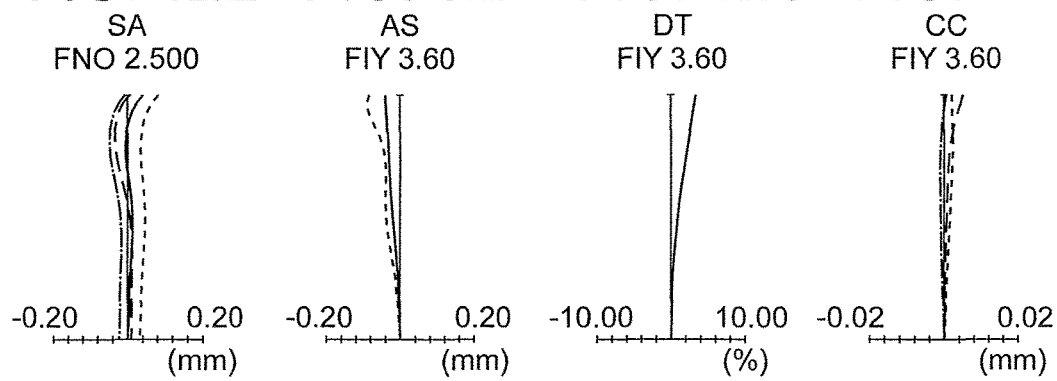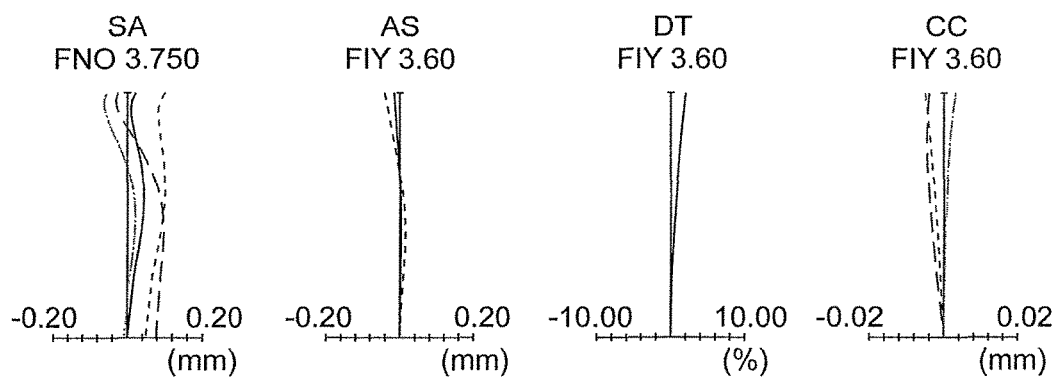

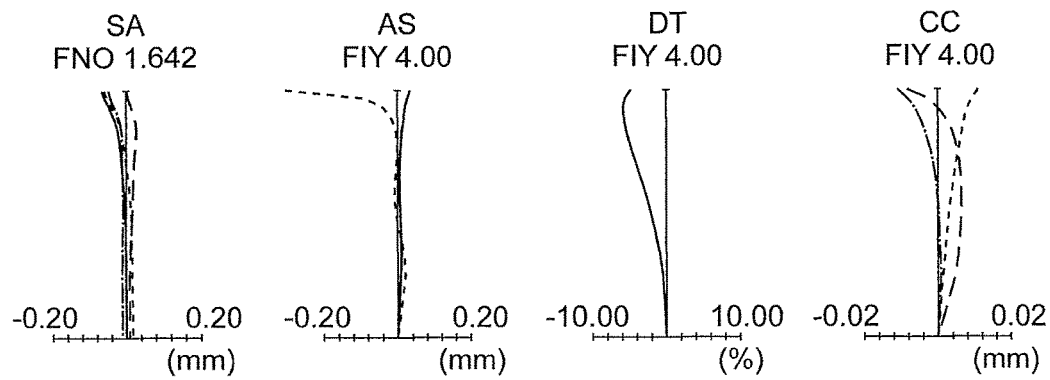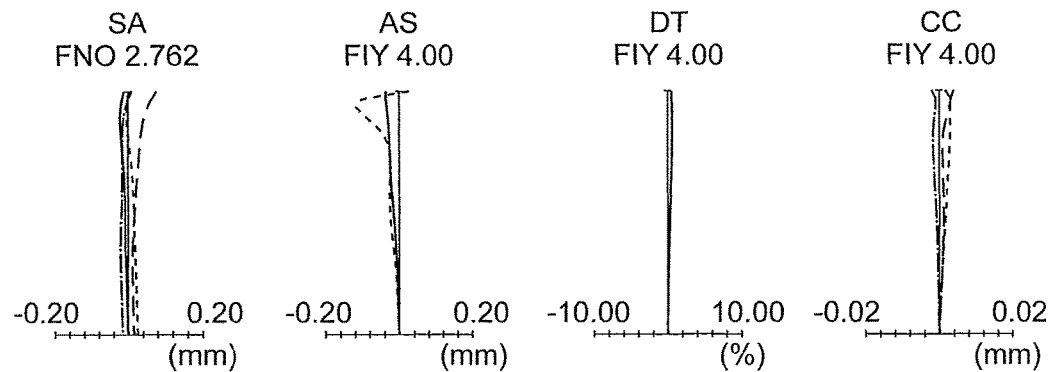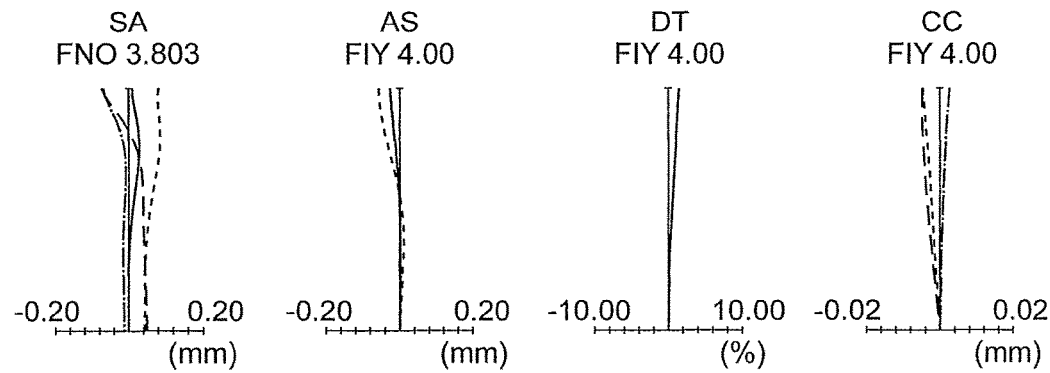

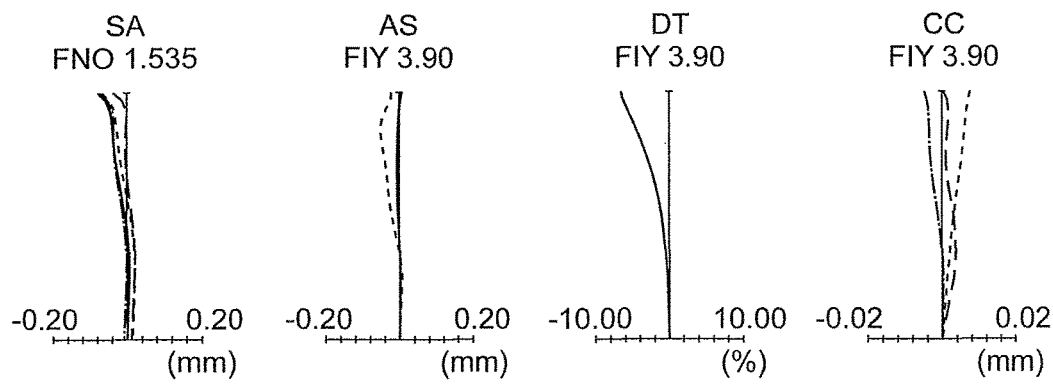
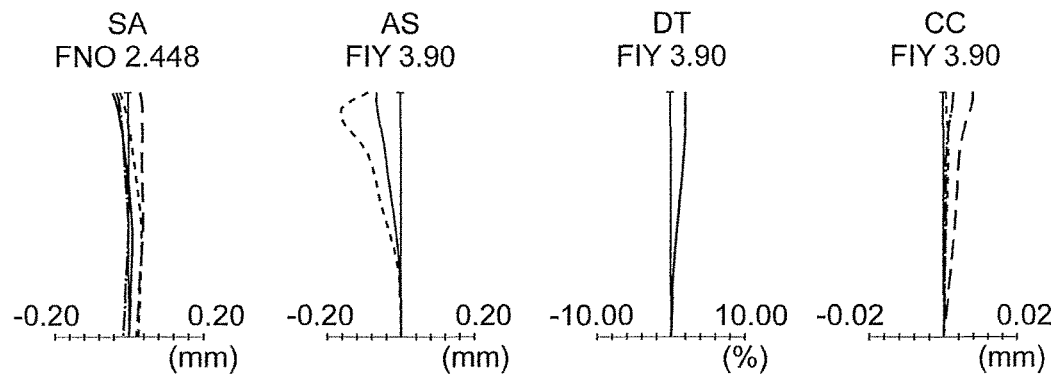
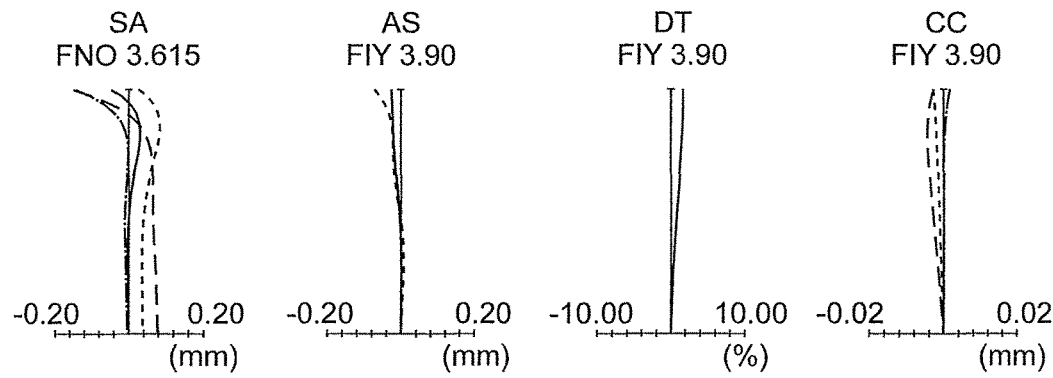

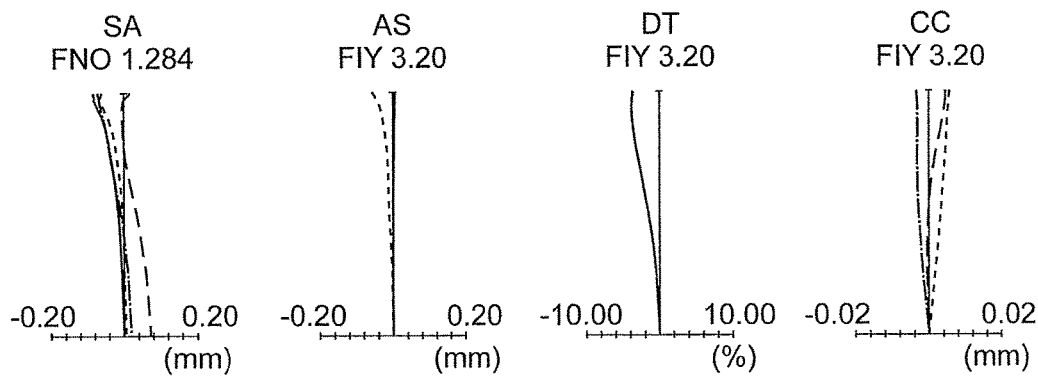
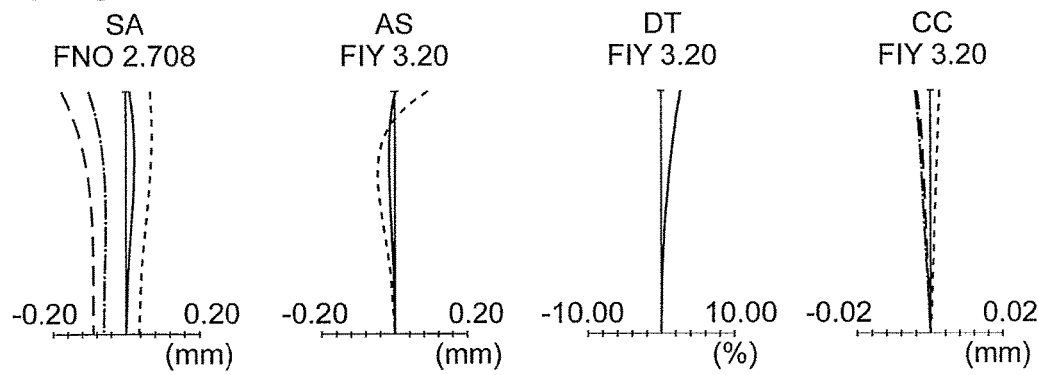
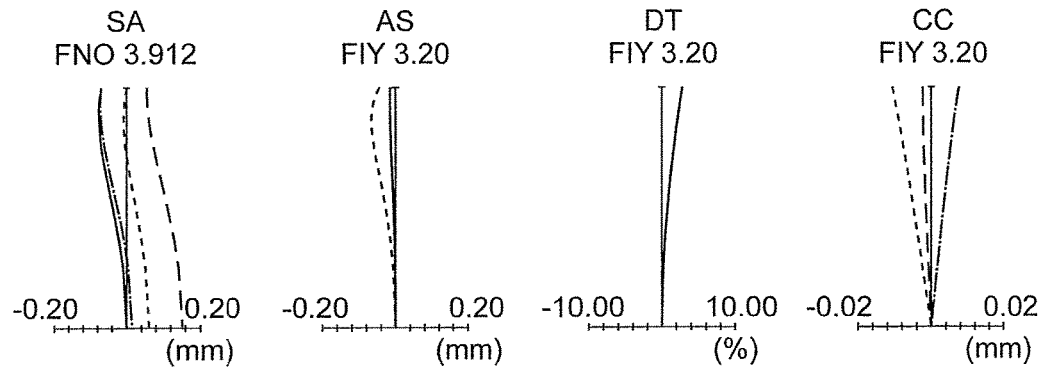

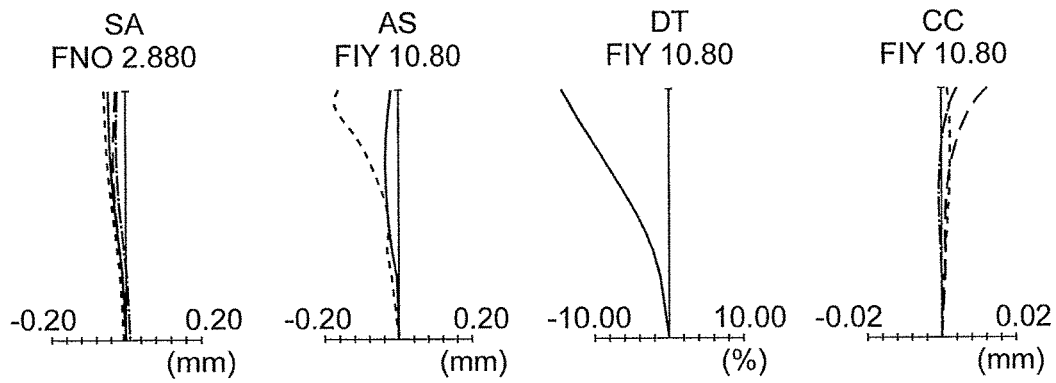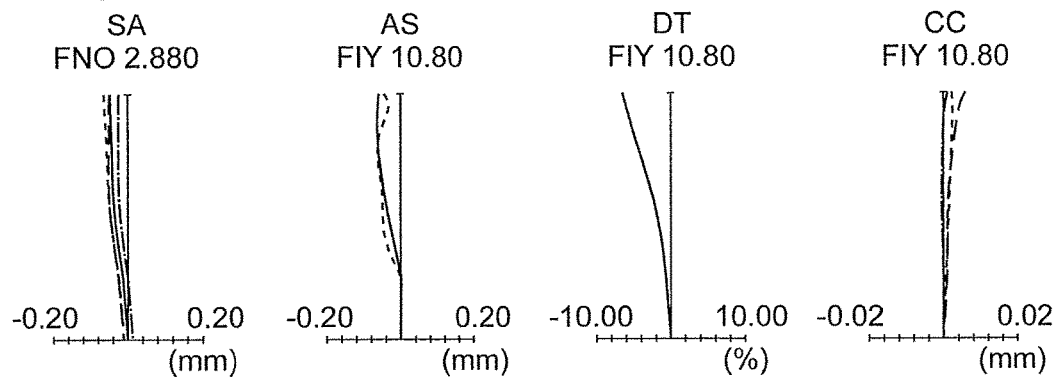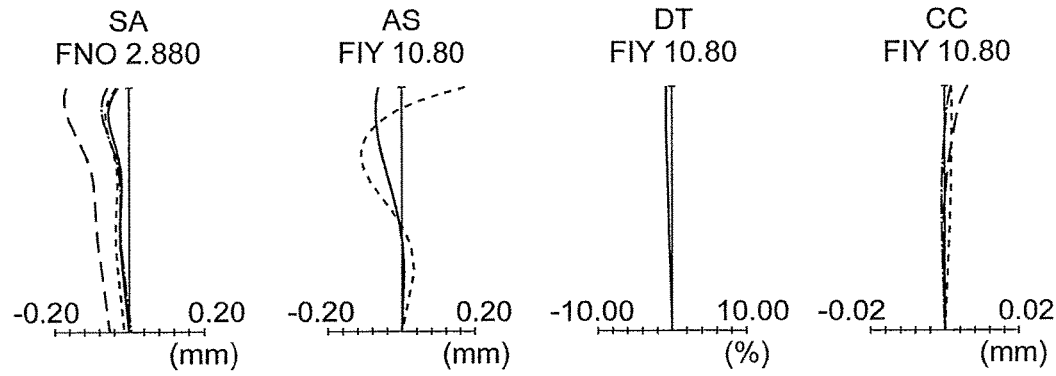

US 10,295,802 B2

ZOOM OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2016-076536 filed on Apr. 6, 2016, 2016-076429 filed on Apr. 6, 2016 and 2016-076430 filed on Apr. 6, 2016; the entire contents of which are incorporated herein by reference.

BACKGROUND OF THE INVENTION

Field of the Invention

The present invention relates to a zoom optical system and an image pickup apparatus using the same.

Description of the Related Art

In recent years, image pickup optical systems are used in fields of wide range, such as digital cameras, video cameras, monitoring cameras, and cameras for television conference systems.

A zoom optical system is used for such image pickup optical systems. Examples of a zoom optical system are zoom optical systems disclosed in Japanese Patent Application Laid-open No. 2005-49843, Japanese Patent Application Laid-open No. 2011-221554, and Japanese Patent Application Laid-open No. 2011-175098. The zoom optical system disclosed in Japanese Patent Application Laid-open No. 2005-49843 includes, in order from the object side, a first lens unit having a negative refractive power, a second lens unit having a positive refractive power, a third lens unit having a negative refractive power, and a fourth lens unit having a positive refractive power.

The zoom optical systems disclosed in Japanese Patent Application Laid-open No. 2011-221554 and Japanese Patent Application Laid-open No. 2011-175098 include, in order from the object side, a first lens unit having a positive refractive power, a second lens unit having a negative refractive power, a third lens unit having a positive refractive power, a fourth lens unit having a negative refractive power, and a fifth lens unit having a positive refractive power.

SUMMARY OF THE INVENTION

A zoom optical system according to the present invention comprises:
a plurality of lens units, and an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to the image side among the two or more lens units having a positive refractive power,
when the plurality of lens units include two or more lens units having a negative refractive power, the object-side negative lens unit is disposed closest to the object side among one or two or more lens units having a negative refractive power,
the object-side negative lens unit is moved such that a space between the object-side negative lens unit and the positive lens unit at a time of focusing to an object at infinity is narrower at a telephoto end than that at a wide angle end, and
the aperture stop is disposed between a lens surface disposed closest to the image side in the object-side negative lens unit and a lens surface disposed closest to the image side in the positive lens unit, or adjacent to the lens surface disposed closest to the image side in the positive lens unit.

Moreover, an image pickup apparatus according to the present invention comprises:
an optical system; and
an image pickup element having an image pickup surface and converting an image formed on the image pickup surface with the optical system into an electrical signal, wherein
the optical system is the zoom optical system described above.

BRIEF DESCRIPTION OF THE DRAWINGS

FIG. 1A, FIG. 1B, and FIG. 10 are lens cross-sectional views of a zoom optical system of Example 1;
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams of the zoom optical system of Example 1;
FIG. 10A, FIG. 10B, FIG. 100, FIG. 10D, FIG. 10E, FIG. 10F, FIG. 100, FIG. 10H, FIG. 10I, FIG. 10J, FIG. 10K, and FIG. 10L are aberration diagrams of the zoom optical system of Example 2;
FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams of the zoom optical system of Example 3;
FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams of the zoom optical system of Example 4;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams of the zoom optical system of Example 5;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams of the zoom optical system of Example 6;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams of the zoom optical system of Example 7;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams of the zoom optical system of Example 8;

BRIEF DESCRIPTION OF THE DRAWING

Figure 1A:
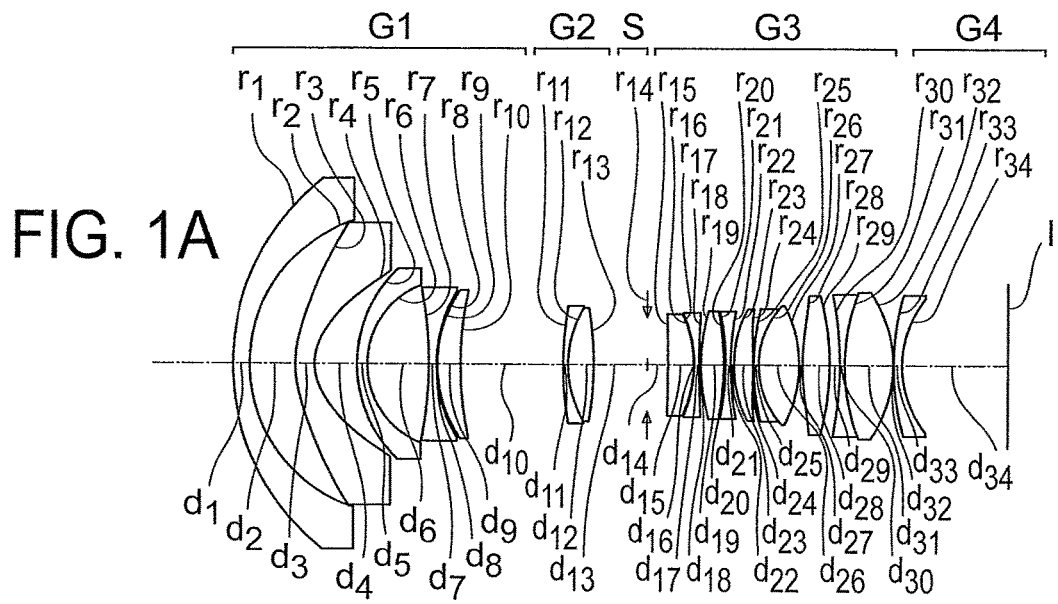
Figure 1B:
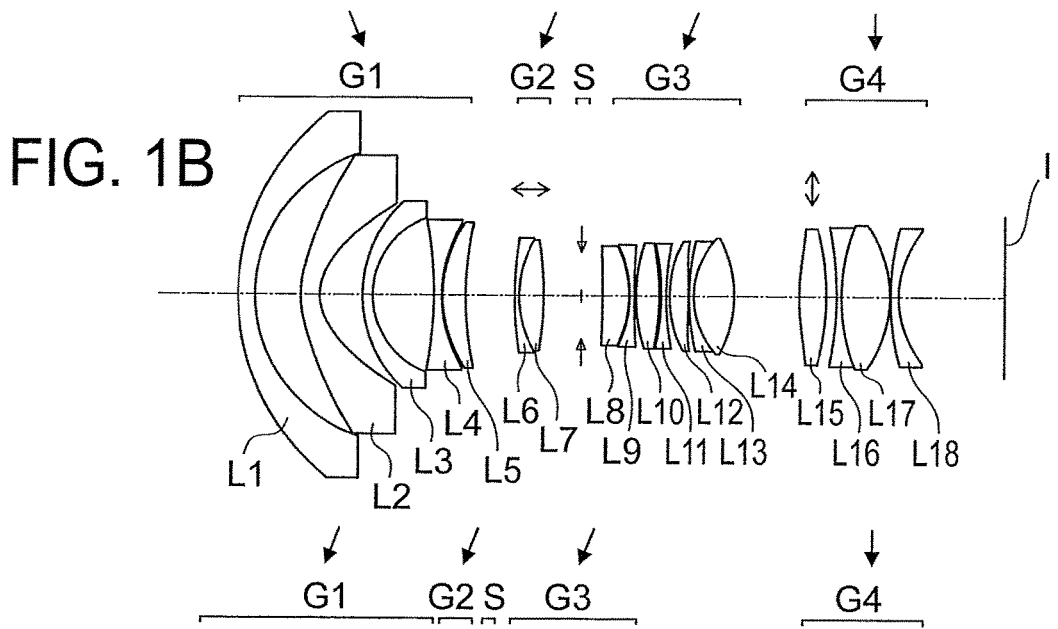
Figure 1C:
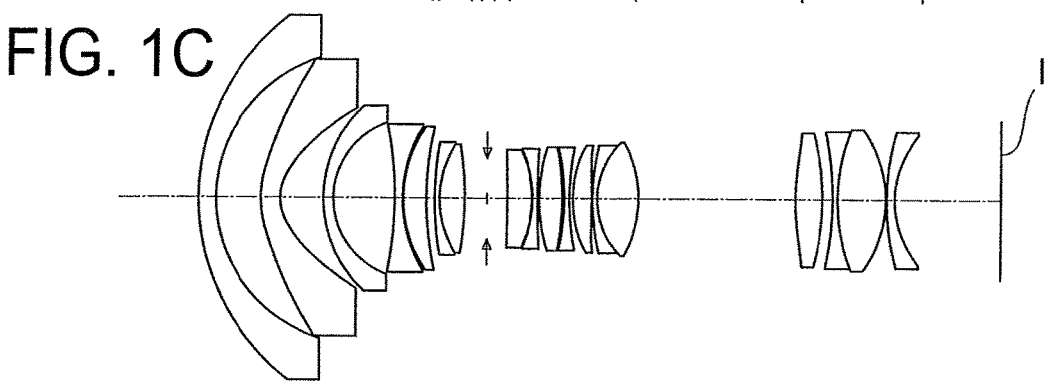
Figure 2A:
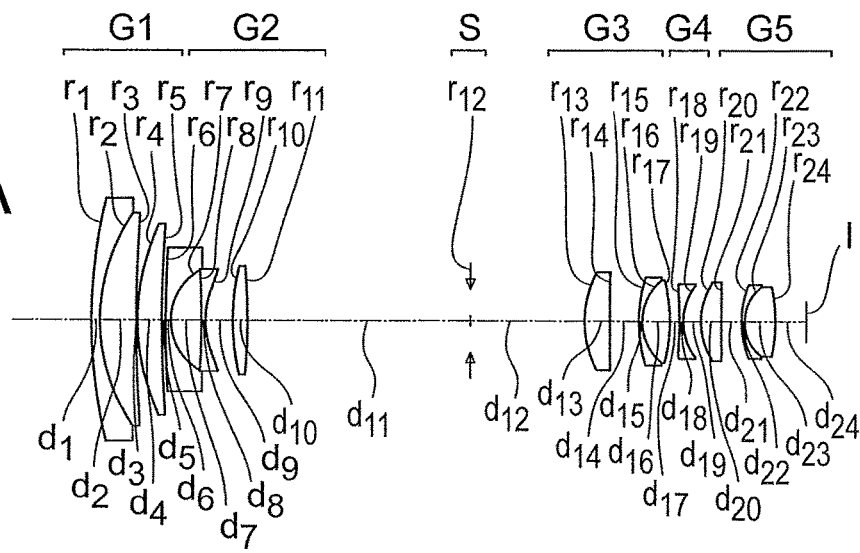
FIG. 2A, FIG. 2B, and FIG. 2C are lens cross-sectional views of a zoom optical system of Example 2.
Figure 2B:
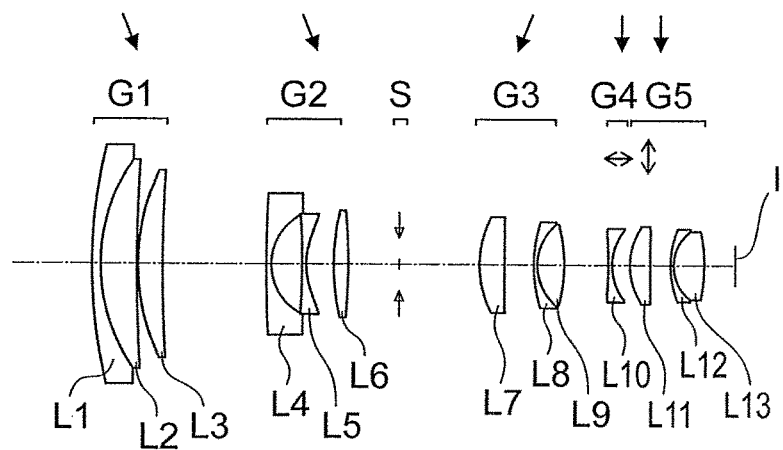
Figure 2C:
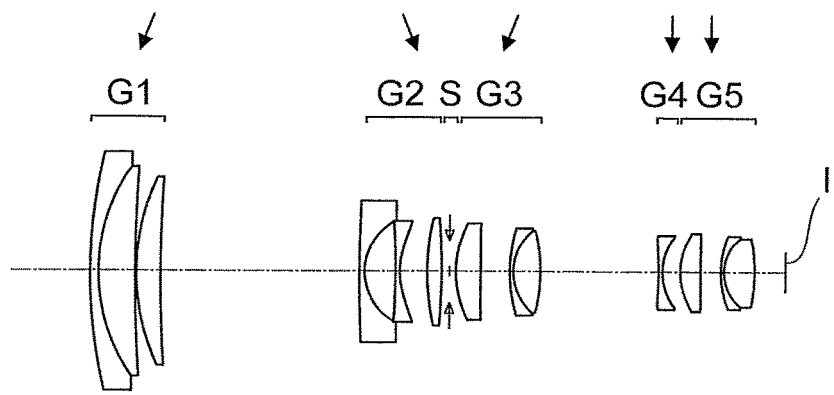
Figure 3A:
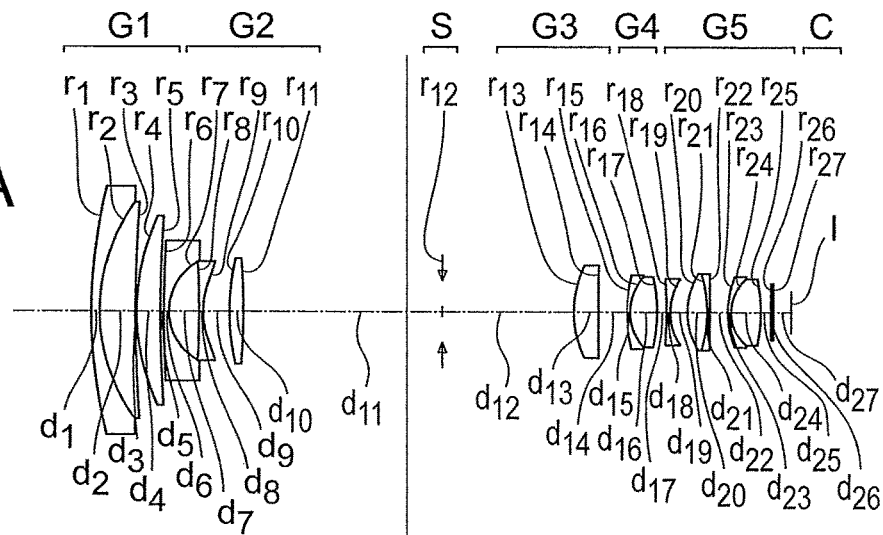
FIG. 3A, FIG. 3B, and FIG. 3C are lens cross-sectional views of a zoom optical system of Example 3.
Figure 3B:
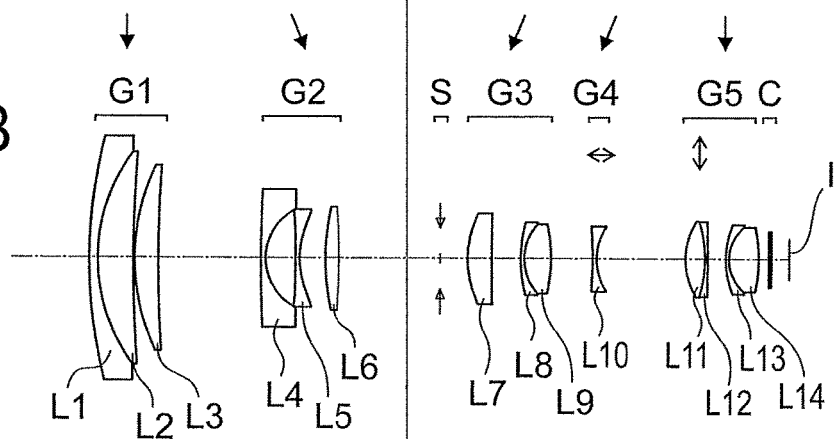
Figure 3C:
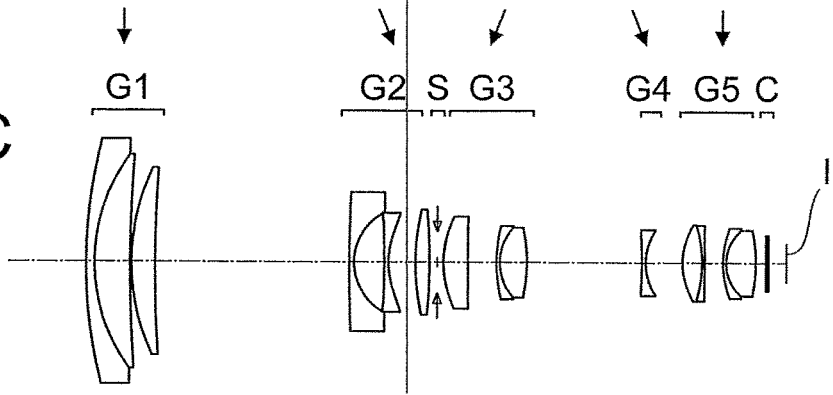
Figure 4A:
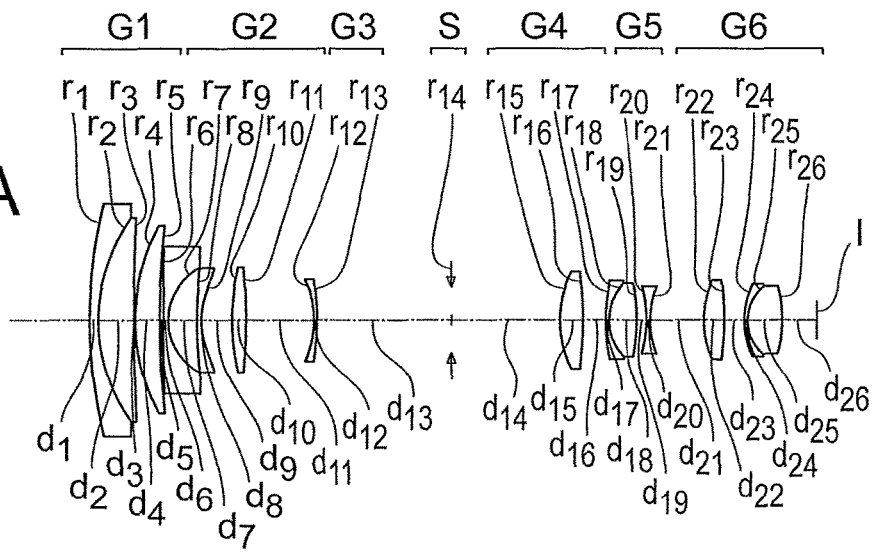
FIG. 4A, FIG. 4B, and FIG. 4C are lens cross-sectional views of a zoom optical system of Example 4.
Figure 4B:
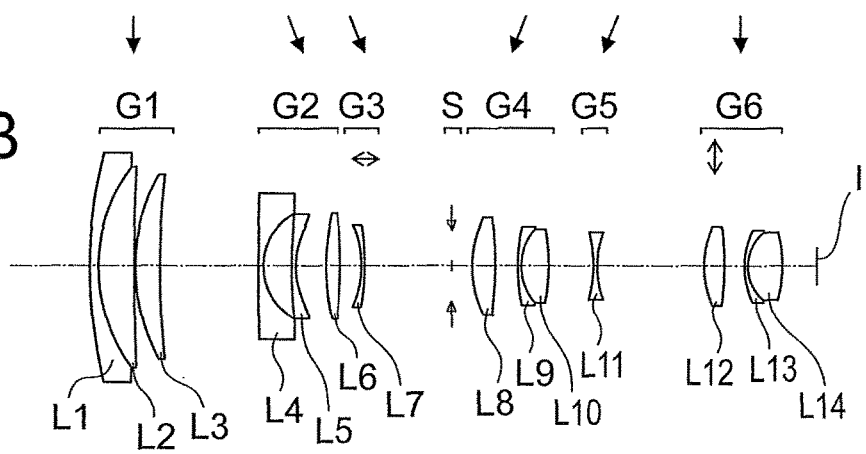
Figure 4C:
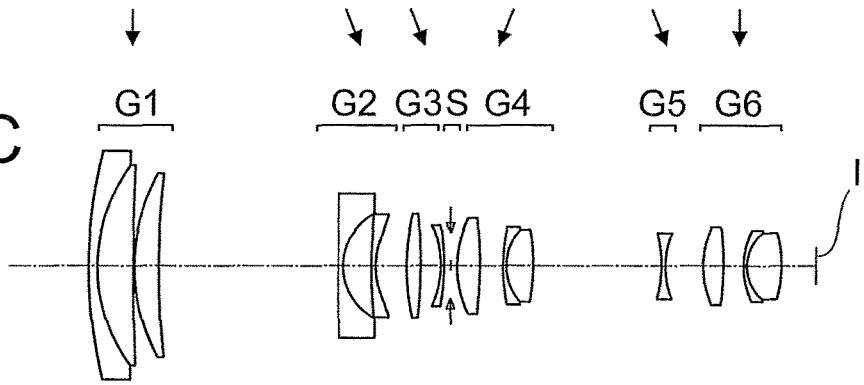
Figure 5A:
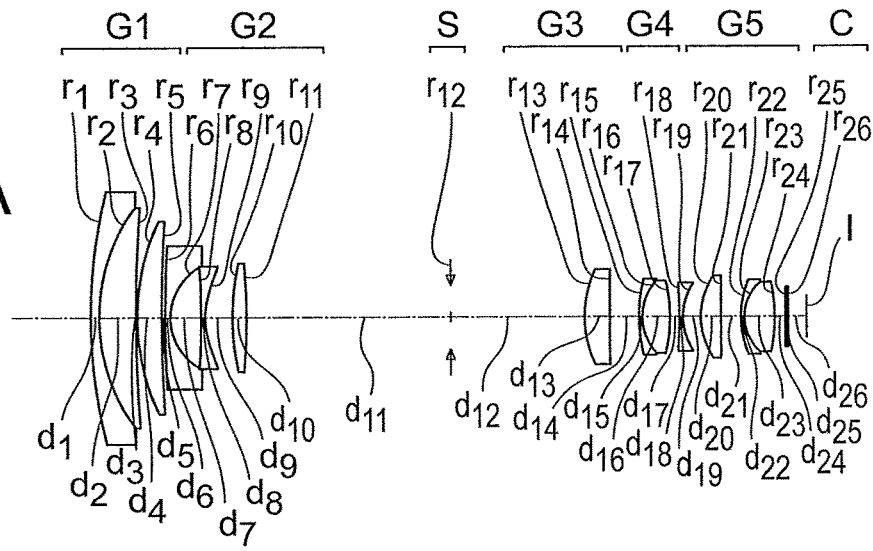
FIG. 5A, FIG. 5B, and FIG. 5C are lens cross-sectional views of a zoom optical system of Example 5.
Figure 5B:
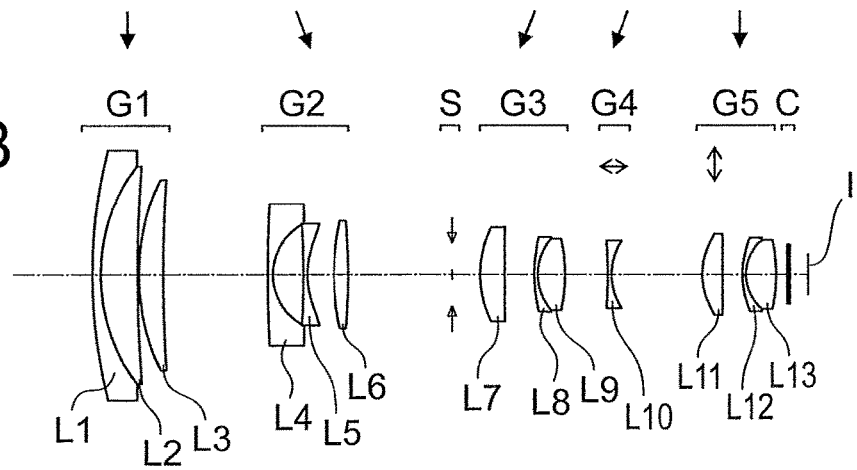
Figure 5C:
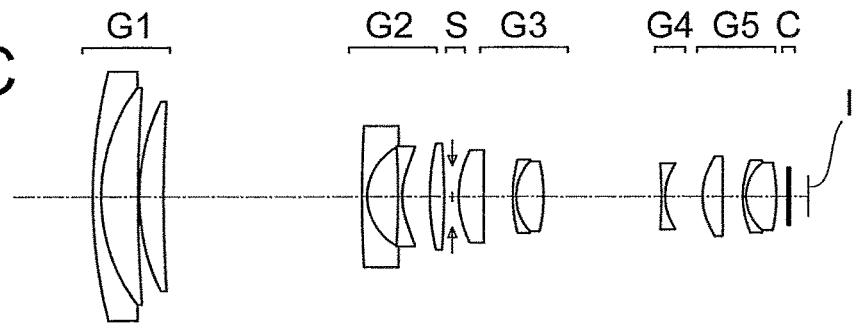
Figure 6A:
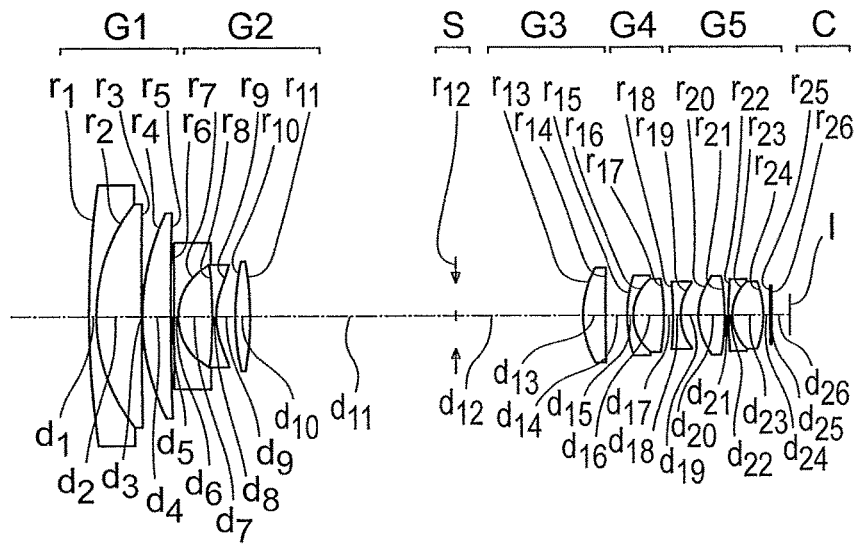
FIG. 6A, FIG. 6B, and FIG. 6C are lens cross-sectional views of a zoom optical system of Example 6.
Figure 6B:
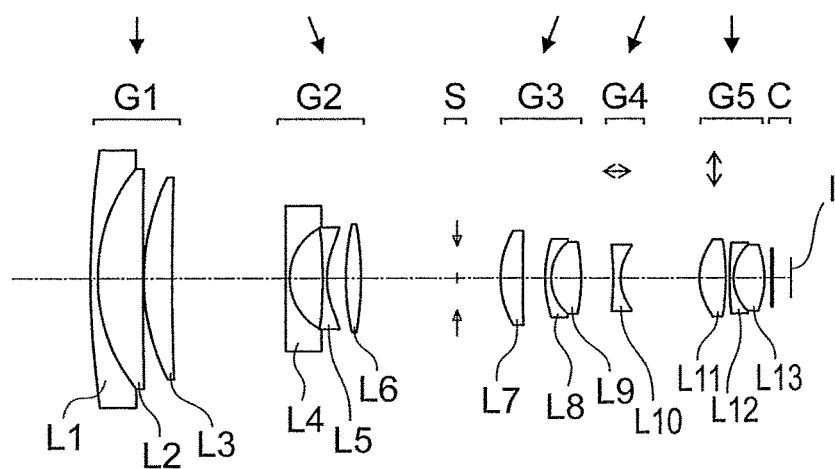
Figure 6C:
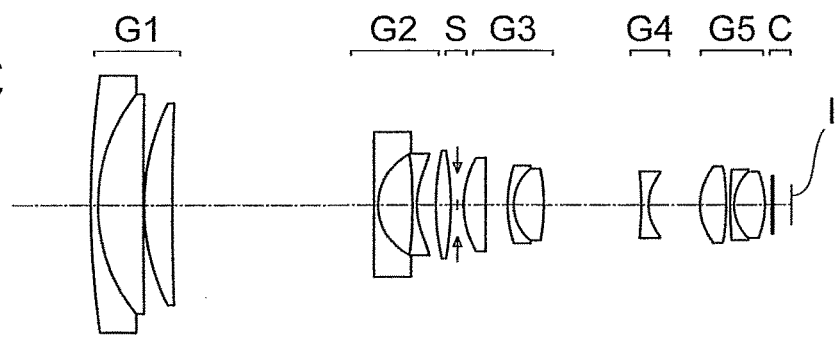
Figure 7A:
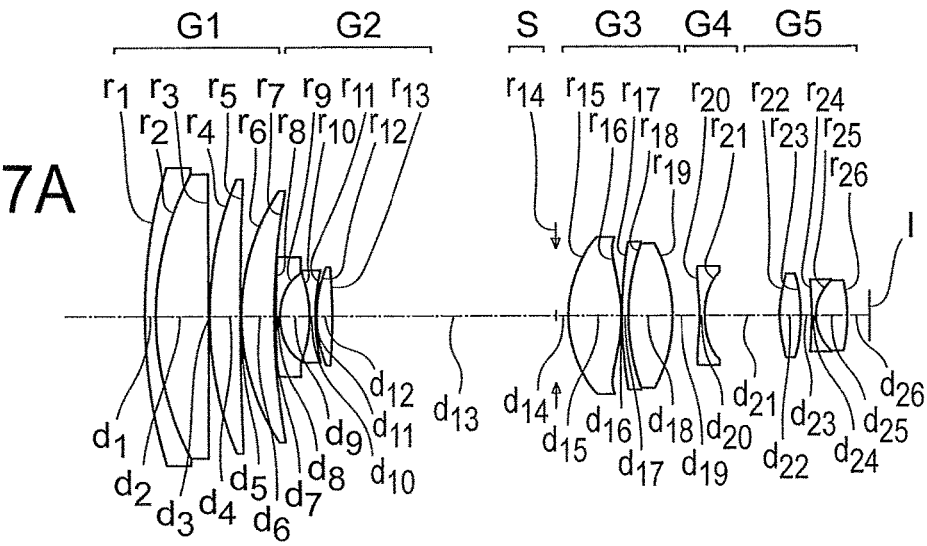
FIG. 7A, FIG. 7B, and FIG. 7C are lens cross-sectional views of a zoom optical system of Example 7.
Figure 7B:
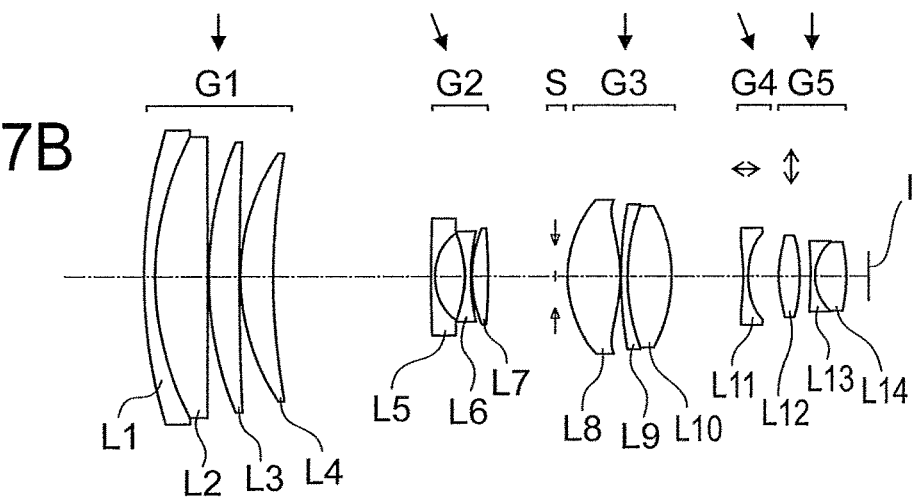
Figure 7C:
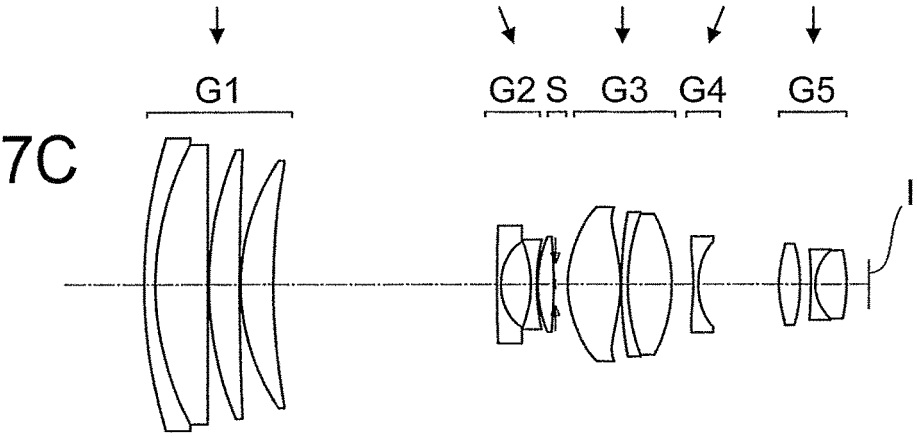
Figure 8A:
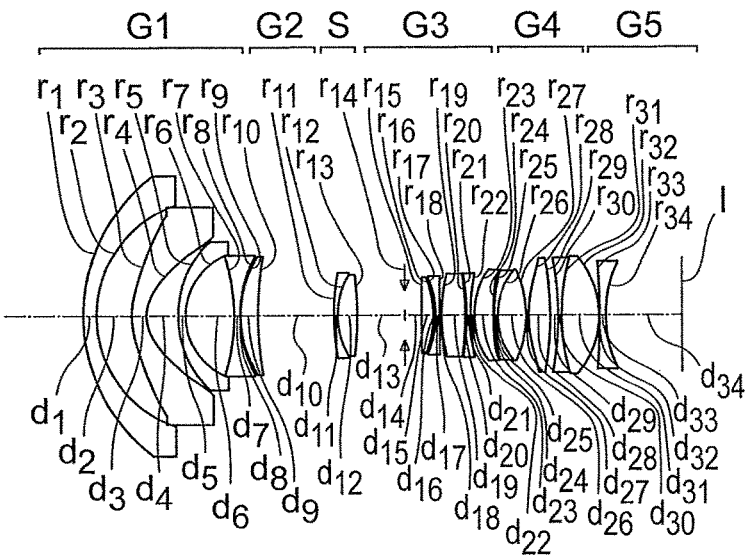
FIG. 8A, FIG. 8B, and FIG. 8C are lens cross-sectional views of a zoom optical system of Example 8.
Figure 8B:
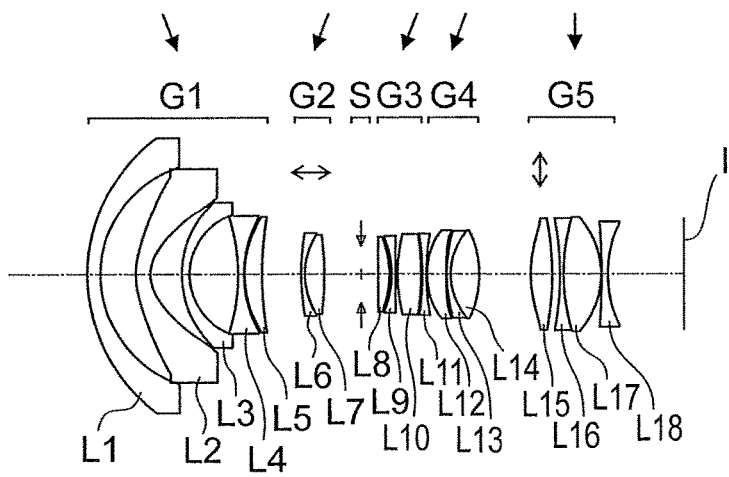
Figure 8C:
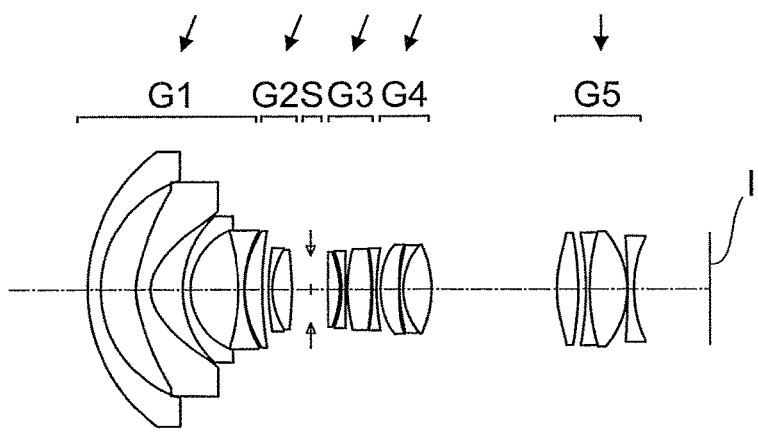

Prior to explanation of Examples, the following is explanation of operations and effects of an embodiment according to an aspect of the present invention. When the operations and effects of the present embodiment are specifically explained, they are explained with specific examples. However, in the same manner as Examples described later, the illustrated aspects are mere part of aspects included in the present invention, and many variations of the aspects exist. Accordingly, the present invention is not limited to the illustrated aspects.

In the following explanation, the term "corrected" means that the aberration amount is equal to or less than an allowable value, with respect to aberration correction. The term "corrected" means that an image blurring amount caused by camera shake is equal to or less than an allowable value, with respect to image stabilization.

The following is explanation of a basic structure of a zoom optical system according to a first embodiment to a zoom optical system according to a tenth embodiment (hereinafter referred to as "zoom optical system according to the present embodiment"). When the technical meaning of a similar structure has already been described, explanation thereof is omitted. In addition, with respect to the technical meaning of a conditional expression, for example, because the technical meaning of Conditional Expression (2) is the same as the technical meaning of Conditional Expression (2-*) (* means number), explanation of the technical meaning of Conditional Expression (2-*) is omitted. In the following explanation, the lens component means a single lens or a cemented lens.

The basic structure of the zoom optical system according to the present embodiment includes a plurality of lens units, and an aperture stop, wherein the plurality of lens units consist of two or more lens units having a positive refractive power, and one or two or more lens units having a negative refractive power, the two or more lens units having a positive refractive power include a positive lens unit having a positive refractive power, and an image-side positive lens unit, the one or two or more lens units having a negative refractive power include an object-side negative lens unit, the image-side positive lens unit is not moved along an optical axis at a time of zooming or at a time of focusing, in the plurality of lens units, a space between the lens units disposed adjacently is changed at a time of zooming, at a time of focusing, or at a time of zooming and at a time of focusing, the positive lens unit has the largest refractive power among the two or more lens units having a positive refractive power excluding the image-side positive lens unit, the image-side positive lens unit is disposed closest to the image side among the two or more lens units having a positive refractive power, when the plurality of lens units include two or more lens units having a negative refractive power, the object-side negative lens unit is disposed closest to the object side among one or two or more lens units having a negative refractive power, the object-side negative lens unit is moved such that a space between the object-side negative lens unit and the positive lens unit at a time of focusing to an object at infinity is narrower at a telephoto end than that at a wide angle end, and the aperture stop is disposed between a lens surface disposed closest to the image side in the object-side negative lens unit and a lens surface disposed closest to the image side in the positive lens unit, or adjacent to the lens surface disposed closest to the image side in the positive lens unit.

The basic structure includes a plurality of lens units, and an aperture stop. In the plurality of lens units, a space between the lens units disposed adjacently is changed at a time of zooming, at a time of focusing, or at a time of zooming and at a time of focusing.

The plurality of lens units consist of two or more lens units having a positive refractive power, and one or two or more lens units having a negative refractive power, the two or more lens units having a positive refractive power include a positive lens unit and an image-side positive lens unit, and the one or two or more lens units having a negative refractive power include an object-side negative lens unit.

In the basic structure, the object-side negative lens unit and the positive lens unit are included in the plurality of lens units. The plurality of lens units include a lens unit having a changing space from the adjacent lens unit. Accordingly, the object-side negative lens unit and the positive lens unit can be moved. By doing this, it is possible to secure a wide angle of view at a wide angle end. Moreover, it is also possible to shorten the whole length of the optical system in a wide range of the zooming area. In this explanation, for example, the wide angle of view means the case where a half angle of view exceeds 30°. However, the value of the half angle of view is not limited to this value.

In the basic structure, the image-side positive lens unit is disposed closest to the image side among the two or more lens units having a positive refractive power. In addition, the image-side positive lens unit can be disposed closest to the image side among all the lens units. When the refractive power of the lens unit disposed closest to the image side is set to a positive refractive power, the value of the F-number is reduced. In this explanation, for example, the small F-number means the case where the F-number at the wide angle end is 4.0 or less, or the F-number at the telephoto end is 5.1 or less. However, the value of F-number is not limited to this value.

The image-side positive lens unit is prevented from moving along an optical axis at a time of zooming or at a time of focusing. By doing this, it is possible to shorten the back focus. Consequently, it is possible to shorten the whole length of the optical system. Moreover, it is also possible to reduce change in F-number in a wide range of the zooming area.

The aperture stop can be disposed between a lens surface disposed closest to the image side in the object-side negative lens unit and a lens surface disposed closest to the image side in the positive lens unit. Otherwise, the aperture stop can be disposed adjacent to the lens surface disposed closest to the image side in the positive lens unit. By doing this, it is possible to prevent an increase in diameter of the positive lens unit even when the angle of view is widened. Consequently, it is possible to make the optical system small-sized.

An increase in refractive power of each of the lens units can increase the zooming function. An increase in zooming function can shorten the whole length of the optical system, and reduce the diameter of the optical system. However, an increase in zooming function causes difficulty in securing favorable imaging performance in a wide range of the zooming area, when a small F-number is secured.

The object-side negative lens unit is involved in securing a wide angle of view at the wide angle end. When the zooming function is increased, chromatic aberration of magnification easily occurs in the object-side negative lens unit. Even when chromatic aberration of magnification occurs in the object-side negative lens unit, when occurrence of chromatic aberration of magnification can be suppressed in the whole optical system, the angle of view at the wide angle end can be more broadened, and miniaturization of the optical system and small F-number can be secured.

A separation state between the axial light flux and the off-axis light flux at the wide angle end is similar between the object-side negative lens unit and the image-side positive lens unit. Accordingly, chromatic aberration of magnification easily occurs also in the image-side positive lens unit. In this state, the direction in which chromatic aberration of magnification occurs in the image-side positive lens unit can be set reverse to the direction in which chromatic aberration of magnification occurs in the object-side negative lens unit.

As described above, with the image-side positive lens unit provided with a function of correcting aberration of magnification, chromatic aberration of magnification occurring in the object-side negative lens unit can be corrected with the image-side positive lens unit.

When the image pickup apparatus is held with the hand, the image pickup apparatus may be shaken due to camera shake in some cases. When a shake is applied to the optical system due to camera shake, a clear image cannot be obtained due to influence of the shake. Image stabilization may be performed in the optical system, to obtain a clearer image with higher resolution.

For example, in the case where the image pickup apparatus is fixed on a tripod or the image pickup apparatus is fixed on the external wall of a building, when a shake occurs on the side on which the image pickup apparatus is fixed, the shake may be transmitted to the image pickup apparatus. Such a shake may be regarded as the same as a shake caused by camera shake. Accordingly, such a shake in the above case may be regarded as being included in a shake caused by camera shake.

The zoom optical system according to the first embodiment includes the above basic structure, and the following Conditional Expressions (23), (17-2), and (30) are satisfied:

$$0.6 \leq FNOw \leq 4.0 \quad (23),$$

$$49.0° \leq \Omega Hw/2 \leq 88.0° \quad (17\text{-}2), \text{ and}$$

$$3.15 \text{ mm} \leq Rimg \leq 40.0 \text{ mm} \quad (30)$$

where $FNOw$ is an F-number at the wide angle end, $\Omega Hw$ is a total angle of view in a horizontal direction at the wide angle end, and $Rimg$ is a radius of an image circle at the image pickup element.

In a case of exceeding a lower limit value of Conditional Expression (23), it is possible to suppress occurrence of spherical aberration and occurrence of astigmatism around the wide angle end, in each of the object-side negative lens unit and the positive lens unit. Moreover, it is possible to suppress occurrence of spherical aberration and occurrence of astigmatism around the wide angle end, also in a predetermined positive lens unit.

In a case of falling below an upper limit value of Conditional Expression (23), it is possible to secure sufficient brightness at the wide angle end. For this reason, for example, when the zoom optical system of the present embodiment is used for a monitoring camera, a favorable image can be obtained in monitoring in cloudy weather or at night.

In a case of exceeding a lower limit value of Conditional Expression (17-2), it is possible to perform image pickup in a wide range. For this reason, for example, even when the distance to the subject is a close distance of 2 m, a range with a width of approximately 3 m can be checked at a time.

For example, when the zoom optical system of the present embodiment is used for a monitoring camera, a blind spot can be reduced. A distance to the subject is difficult to secure in a place such as in the elevator and a place with a narrow road width. Even in such a place, a wide range can be monitored by using the zoom optical system according to the present embodiment for a monitoring camera.

Moreover, for example, when the zoom optical system of the present embodiment is used for a camera for television conference, a plurality of persons can be imaged at a time even in a small room. In a television conference, for example, when 1.5 m is secured as a distance to the subject, a range with a width of approximately 2.3 m can be checked at a time. When the range is converted into the number of persons, approximately 5 persons can be checked at a time. As described above, the zoom optical system according to the present embodiment is effective as zoom optical system for television conference in a place in which a wide space cannot be secured.

In a case of falling below an upper limit value of Conditional Expression (17-2), it is possible to reduce the diameter of the lens unit disposed closer to the object side than the aperture stop is, and to reduce the size of the optical system. In addition, since deformation in a circumferential portion of the image is reduced, it is possible to acquire an accurate image.

The optical system used for a monitoring camera can have high resolution to secure a sufficient information amount. The high resolution means, for example, resolution of a high-definition television, or resolution higher than the resolution of the high-definition television. To obtain such resolution, the number of pixels of the image pickup element is, for example, 2.5 million or more, 3 million or more, or 8 million.

In a case of exceeding a lower limit value of Conditional Expression (30), it is possible to prevent the pixel pitch from becoming too small, even when high resolution is secured. For this reason, it is possible to maintain high sensitivity of the image pickup element. In a case of falling below an upper limit value of Conditional Expression (30), it is possible to reduce the size of the image pickup apparatus.

The zoom optical system according to the second embodiment includes the basic structure as described above, and the following Conditional Expressions (23-1), (25-1), (17-3), and (30) are satisfied:

$$0.6 \leq FNOw \leq 3.9 \quad (23\text{-}1),$$

$$0.0 \leq ft/fw + 13.38 \times \tan(\Omega Hw/2) - 21.0 \leq 350 \quad (25\text{-}1),$$

$$35.5° \leq \Omega Hw/2 \leq 88.0° \quad (17\text{-}3), \text{ and}$$

$$3.15 \text{ mm} \leq Rimg \leq 40.0 \text{ mm} \quad (30)$$

where ft is a focal length of the zoom optical system at a telephoto end, and fw is a focal length of the zoom optical system at a wide angle end.

The technical meaning of Conditional Expression (17-3) is the same as the technical meaning of Conditional Expression (17-2).

For example, in a monitoring camera, there are cases where a visual field range at the wide angle end is checked, or a predetermined area is enlarged to check the predetermined area in detail. In view of acquisition of more detailed information, the zoom ratio may be increased.

In the zoom optical system, the imaging area can be proportional to f×tan ω (f is a focal length, and ω is an angle of view). For this reason, as the horizontal angle of view is narrowed at the wide angle end, the information amount in the imaging area may reduce in proportion to tan of the angle of view. Specifically, reduction rate of the information amount is equal to or higher than the change rate of the angle of view.

When the horizontal angle of view at the wide angle end is narrow, the information amount can be compensated by more increasing the zoom ratio and more narrowing the angle of view at the telephoto end than those in the case where the horizontal angle of view at the wide angle end is wide. In a monitoring camera, it is more preferable that more information amount is obtained by image pickup. In use for a monitoring camera, the information amount can be compensated by further narrowing the angle of view at the telephoto end.

In a case of exceeding a lower limit value of Conditional Expression (25-1), a sufficient information amount can be obtained. In a case of falling below an upper limit value of Conditional Expression (25-1), since the diameter of the object-side negative lens unit can be reduced, the optical system can be reduced in size. Otherwise, occurrence of astigmatism in the object-side negative lens unit can be reduced.

In the basic structure described above, the image-side positive lens unit can include a first sub-lens unit having a positive refractive power, and a second sub-lens unit including a positive lens and a negative lens. In the following explanation, the structure including the first sub-lens unit and the second sub-lens unit is referred to as "other basic structure".

The height of the ray made incident on the second sub-lens unit is changed at a time of zooming. When the image-side positive lens unit is fixed at the time of zooming, the second sub-lens unit is also fixed. When the second sub-lens unit is fixed at the time of zooming, it is possible to reduce both change in a central light flux diameter and a change in peripheral ray height made incident on the second sub-lens unit. Consequently, it is possible to suppress fluctuations in chromatic aberration of magnification from the wide angle end to the telephoto end, and to secure a small F-number.

The central light flux diameter indicates a diameter of the light flux imaged on the center of the image surface. The peripheral ray height indicates height of a ray imaged on the peripheral portion of the image surface.

When the lens unit is moved in the vicinity of the image surface, dust easily occurs due to movement of the lens unit. The image-side positive lens unit can be disposed close to the image surface. Occurrence of dust can be reduced by preventing the image-side positive lens unit from moving along the optical axis. Adhesion of dust onto the image pickup surface can be reduced when the image pickup element is disposed on the image surface.

A lens unit (hereinafter referred to as "focus lens unit") moving along the optical axis at a time of focusing can be disposed close to the second sub-lens unit. When the second sub-lens unit is fixed at a time of zooming, an actuator for zooming may not be disposed in the vicinity of the second sub-lens unit. Accordingly, an actuator for focusing can be disposed in the vicinity of the focus lens unit. As a result, the size of the focus unit can be reduced. The focus unit can be formed of, for example, a focusing lens unit and an actuator for focusing.

To provide the image-side positive lens unit with a function of correcting chromatic aberration of magnification, the second sub-lens unit is disposed in the image-side positive lens unit. In this state, when the second sub-lens unit is formed of a negative lens and a positive lens, the chromatic aberration of magnification generated in the object-side negative lens unit can be corrected with the image-side positive lens unit.

However, when the chromatic aberration of magnification is selectively corrected, astigmatism and/or coma may occur. Accordingly, when only the chromatic aberration of magnification is selectively suppressed, an adverse influence may occur on imaging performance. In this case, the first sub-lens unit having a positive refractive power can be disposed on the object side of the second sub-lens unit. By doing this, it is possible to enhance the aberration correction ability in the whole image-side positive lens unit. Consequently, it is possible to correct the chromatic aberration of magnification in the whole optical system, and to correct the astigmatism and/or the coma.

Disposing the first sub-lens unit and the second sub-lens unit in a separated state can enhance the aberration correction ability in the whole image-side positive lens unit. An air space with a certain width can be provided between the first sub-lens unit and the second sub-lens unit.

As described later, the first sub-lens unit can be moved in a direction orthogonal to the optical axis. By doing this, it is possible to perform image stabilization with the first sub-lens unit.

As described above, the lenses of the image-side positive lens unit can be classified into lenses forming the first sub-lens unit and lenses forming the second sub-lens unit. Adopting such a structure enables correction of chromatic aberration of magnification, astigmatism and/or coma, as described above. In addition, adopting such a structure enables separation of the second sub-lens unit from the image surface. For this reason, it is possible to enhance magnification of the first sub-lens unit.

Enhancing the magnification of the first sub-lens unit can enhance the ratio of the movement amount when the lens or the lens unit is moved in a perpendicular direction with respect to the optical axis to the movement amount of the image on the image surface (hereinafter referred to as "image stabilization sensitivity"), in the first sub-lens unit. For this reason, it is possible to perform image stabilization in the first sub-lens unit. As described above, adopting the structure of dividing the image-side positive lens unit into two sub-lens unit enables image stabilization with a small movement amount. In addition, the small movement amount enables image stabilization with higher followability.

In addition, when the lens unit moved at the time of zooming includes a lens performing image stabilization, an error may occur in the detected camera shake amount, due to change of the lens position caused by zooming. When the image-side positive lens unit is fixed at the time of zooming, the second sub-lens unit is also fixed. Fixing the second sub-lens unit at the time of zooming can reduce an error.

The zoom optical system according to a third embodiment includes the other basic structure described above, the positive lens unit includes a predetermined positive lens satisfying the following Conditional Expression (2), and the following Conditional Expression (1) is satisfied:

$$0.1 \leq fGBUN1/fGPM \leq 2.1 \quad (1), \text{ and}$$

$$60.8 \leq vdGPMP1 \leq 100.0 \quad (2)$$

where
fGBUN1 is a focal length of the first sub-lens unit,
fGPM is a focal length of the positive lens unit,
vdGPMP1 is an Abbe number of predetermined positive lens, and
the predetermined positive lens is a positive lens with the largest Abbe number among positive lenses of the positive lens unit.

In a case of exceeding a lower limit value of Conditional Expression (1), it is possible to suppress occurrence of aberration in the first sub-lens unit, mainly occurrence of coma and occurrence of astigmatism. Consequently, favorable imaging performance is obtained in the vicinity of the wide angle end. In a case of falling below an upper limit value of Conditional Expression (1), it is possible to increase the correction effect in the first sub-lens unit, mainly the effect of correcting coma and the effect of correcting astigmatism. Consequently, favorable imaging performance is obtained in the vicinity of the wide angle end.

In a case of exceeding a lower limit value of Conditional Expression (2), it is possible to suppress occurrence of longitudinal chromatic aberration in the positive lens unit. Consequently, it is possible to secure favorable imaging performance in a wide range of the zooming area. In a case of falling below an upper limit value of Conditional Expression (2), it is possible to correct chromatic aberration.

The zoom optical system according to the fourth embodiment includes the other basic structure described above, and the following Conditional Expressions (3) and (4) are satisfied:

$$0.02 \leq DGBUN12a/fGBUN1 \leq 4.0 \quad (3), \text{ and}$$

$$0.43 \leq |(MGGBUN1back) \times (MGGBUN1-1)| \leq 5.0 \quad (4)$$

where
DGBUN12a is an air space between the first sub-lens unit and the second sub-lens unit,
fGBUN1 is a focal length of the first sub-lens unit,
MGGBUN1 is a lateral magnification in the first sub-lens unit,
MGGBUN1back is lateral magnification in a predetermined optical system, the predetermined optical system is an optical system formed of all the lenses disposed closer to the image side than the first sub-lens unit is, and
the lateral magnification is lateral magnification at a time of focusing to an object at infinity.

In a case of exceeding a lower limit value of Conditional Expression (3), it is possible to suppress occurrence of astigmatism and occurrence of coma.

In a case of falling below an upper limit value of Conditional Expression (3), a thickness of the image-side positive lens unit in the optical axis direction is reduced. In this case, a movement space of a lens unit which moves at a time of zooming, and high zoom ratio can be obtained.

In a case of exceeding a lower limit value or in a case of falling below an upper limit value of Conditional Expression (4), it is possible to suppress occurrence of astigmatism and occurrence of coma.

As described later, the first sub-lens unit is movable in a direction orthogonal to the optical axis. By doing this, it is possible to perform image stabilization with the first sub-lens unit. By falling below a lower limit value of Conditional Expression (4), it is possible to improve the image stabilization sensitivity. In this case, because the movement amount of the first sub-lens unit can be reduced, it is possible to improve followability of the first sub-lens unit to camera shake.

The zoom optical system according to a fifth embodiment includes the other basic structure described above, the positive lens unit includes a predetermined positive lens satisfying the following Conditional Expression (2-1), and the following Conditional Expression (5) is satisfied:

$$64.8 \leq vdGPMP1 \leq 100.0 \quad (2\text{-}1), \text{ and}$$

$$-2.6 \leq SFGBUN1 \leq 0.95 \quad (5)$$

where
vdGPMP1 is an Abbe number of the predetermined positive lens,
the predetermined positive lens is a positive lens with the largest Abbe number among positive lenses of the positive lens unit,
SFGBUN1 is indicated with the following expression:

$$SFGBUN1 = (RGBUN1f + RGBUN1r)/(RGBUN1f - RGBUN1r),$$

RGBUN1f is a radius of curvature of a lens surface disposed closest to the object side in the first sub-lens unit, and
RGBUN1r is a radius of curvature of a lens surface disposed closest to the image side in the first sub-lens unit.

In a case of exceeding a lower limit value or in a case of falling below an upper limit value of Conditional Expression (5), it is possible to suppress occurrence of astigmatism and/or occurrence of coma in the first sub-lens unit.

As described later, image stabilization can be performed with the first sub-lens unit. In the case of exceeding the lower limit value or in the case of falling below the upper limit value of Conditional Expression (5), asymmetry of spherical aberration and asymmetry of astigmatism becomes small. For this reason, it is possible to perform favorable image stabilization.

The zoom optical system according to a sixth embodiment includes the other basic structure described above, a space between the image-side positive lens unit and the lens unit disposed adjacent to the image-side positive lens unit is changed at a time of zooming, the lens surface disposed closest to the image side in the first sub-lens unit is a surface convex on the image side, and the following Conditional Expressions (6), (7), and (8) are satisfied:

$$2.0 \le fGPM/fw \le 20.0 \quad (6),$$

$$2.3 \le fGBUN1/fw \le 9.7 \quad (7), \text{ and}$$

$$3.0 \le |LTLmax/fGN1| \le 16.3 \quad (8)$$

where fGPM is a focal length of the positive lens unit, fGBUN1 is a focal length of the first sub-lens unit, fw is a focal length of the zoom optical system at the wide angle end, LTLmax is the maximum whole length among the whole lengths of the zoom optical system, and fGN1 is a focal length of the object-side negative lens unit.

The space between the lens units disposed adjacent to the image-side positive lens unit can be changed at a time of zooming. By doing this, it is possible to change the incident angle of the ray made incident on the image-side positive lens unit. As a result, it is possible to enhance the effect of correcting chromatic aberration of magnification, the effect of correcting astigmatism, and the effect of correcting coma, in a wide range of the zooming area. Consequently, favorable imaging performance is obtained.

The lens surface disposed closest to the image side in the first sub-lens unit can be formed as a surface convex on the image side. By doing this, it is possible to reduce occurrence of coma chromatic aberration.

In a case of exceeding a lower limit value of Conditional Expression (6), it is possible to suppress mainly occurrence of spherical aberration in the positive lens unit. Consequently, a small F-number can be secured at the wide angle end. In a case of falling below an upper limit value of Conditional Expression (6), it is possible to improve a zooming function in the positive lens unit. Consequently, the optical system can be miniaturized.

By satisfying Conditional Expression (7), it is possible to suppress occurrence of aberration in the positive lens unit, mainly occurrence of coma and occurrence of astigmatism.

In a case of exceeding a lower limit value of Conditional Expression (8), the diameter of the object-side negative lens unit is reduced. Consequently, it is possible to reduce the diameter of an optical unit. In a case of falling below an upper limit value of Conditional Expression (8), the zooming function is enhanced in the positive lens unit. As a result, it is possible to reduce the diameter of the lens unit disposed closer to the image side than the object-side negative lens unit is. The optical unit is formed of, for example, the zoom optical system and a lens barrel.

The zoom optical system according to a seventh embodiment includes the other basic structure described above, the aperture stop is moved only in one direction along the optical axis or immovable at a time of zooming, and the following Conditional Expressions (17-1) and (5-1) are satisfied:

$$31.9° \le \Omega Hw/2 \le 88.0° \quad (17\text{-}1), \text{ and}$$

$$-2.0 \le SFGBUN1 \le 0.95 \quad (5\text{-}1)$$

where

ΩHw is the total angle of view at the wide angle end,

SFGBUN1 is indicated with the following expression:

$$SFGBUN1=(RGBUN1f)+(RGBUN1r)/(RGBUN1f-RGBUN1),$$

RGBUN1f is a radius of curvature of the lens surface disposed closest to the object side in the first sub-lens unit, and RGBUN1r is a radius of curvature of the lens surface disposed closest to the image side in the first sub-lens unit.

At a time of zooming, the aperture stop is movable along the optical axis. At the time of zooming, when the movement direction of the aperture stop is reversed in the middle, an error may occur in the position of the aperture stop with respect to the image surface. An error of the position is caused by backlash, for example, in the movement mechanism using a gear. The position of the aperture stop can be always stabilized by setting the movement direction of the aperture stop only in one direction at the time of zooming. The F-number is changed together with zooming. When the position of the aperture stop is stabilized, the position of the aperture stop can be made agree or substantially agree with the position at a time of design. Consequently, it is possible to reduce an error at a time when the F-number is changed.

When F-number is made small, flare easily occurs. At the time of zooming, when the position of the aperture stop can be fixed, an error caused when the F-number is changed can be further reduced. Consequently, occurrence of flare can be reduced.

When the aperture stop is fixed at the time of zooming, it is possible to reduce rapid change in F-number caused by zooming. Consequently, even with a small F-number, a stable light amount can be secured in a wide range of the zooming area.

Moreover, electrical means may be used for changing the aperture diameter of the aperture stop. Examples of the electrical means include an electrical wire transmitting an electrical signal. When the aperture stop is fixed at the time of zooming, since it is possible to reduce the movement amount of the aperture stop, it is possible to reduce change in length of the electrical wire. Consequently, it is possible to achieve electrical means with a structure with high durability.

The technical meaning of Conditional Expression (17-1) is the same as the technical meaning of Conditional Expression (17-2).

The zoom optical system according to an eighth embodiment includes the other basic structure described above, the positive lens unit includes a predetermined positive lens satisfying the following Conditional Expression (2-2), and the following Conditional Expressions (17-1) and (5-2) are satisfied:

$$60 \le vdGPMP1 \le 100.0 \quad (2\text{-}2),$$

$$31.9° \le Mw/2 \le 88.0° \quad (17\text{-}1), \text{ and}$$

$$-1.91 \le SFGBUN1 \le 0.95 \quad (5\text{-}2)$$

where vdGPMP1 is an Abbe number of the predetermined positive lens, and the predetermined positive lens is a positive lens with the largest Abbe number among positive lenses of the positive lens unit.

The zoom optical system according to a ninth embodiment includes the other basic structure described above, and the following Conditional Expressions (17-1) and (1) are satisfied:

$$31.9° \le \Omega Hw/2 \le 88.0° \quad (17\text{-}1), \text{ and}$$

$$0.1 \le fGBUN1/fGPM \le 2.1 \quad (1)$$

where fGBUN1 is a focal length of the first sub-lens unit, and fGPM is a focal length of the positive lens unit.

The zoom optical system according to a tenth embodiment includes the other basic structure described above, the aperture stop is moved only in one direction along the optical axis or immovable at a time of zooming, and the following Conditional Expressions (17-1) and (8-1) are satisfied:

$$31.9°≤ΩHw≤88.0°  \quad (17\text{-}1), \text{ and}$$

$$1.0≤|LTLmax/fGN1|≤19.0 \quad (8\text{-}1)$$

where

LTLmax is the maximum whole length among the whole lengths of the zoom optical system, and fGN1 is a focal length of the object-side negative lens unit.

In the zoom optical system according to the first embodiment and the zoom optical system according to the second embodiment, the image-side positive lens unit may include a first sub-lens unit having a positive refractive power, and a second sub-lens unit including a positive lens and a negative lens.

In the zoom optical system according to the first embodiment to the zoom optical system according to the fifth embodiment, and in the zoom optical system according to the seventh embodiment to the zoom optical system according to the tenth embodiment, the lens surface disposed closest to the image side in the first sub-lens unit can be set to a surface convex on the image side.

By doing this, it is possible to reduce occurrence of coma chromatic aberration.

In the zoom optical system according to the first embodiment to the zoom optical system according to the fifth embodiment, and in the zoom optical system according to the seventh embodiment to the zoom optical system according to the tenth embodiment, the space between the image-side positive lens unit and the lens unit disposed adjacent to the image-side positive lens unit may be changed at a time of zooming.

In the zoom optical system according to the first embodiment, the zoom optical system according to the second embodiment, the zoom optical system according to the fourth embodiment to the zoom optical system according to the eighth embodiment, and the zoom optical system according to the tenth embodiment, the following Conditional Expression (1) can be satisfied:

$$0.1≤fGBUN1/fGPM≤2.1 \quad (1)$$

where fGBUN1 is a focal length of the first sub-lens unit, and fGPM is a focal length of the positive lens unit.

In the zoom optical system according to the first embodiment, the zoom optical system according to the second embodiment, the zoom optical system according to the fourth embodiment, and the zoom optical system according to the sixth embodiment to the zoom optical system according to the tenth embodiment, the positive lens unit can include a predetermined positive lens satisfying the following Conditional Expression (2-2):

$$60≤vdGPMP1≤100.0 \quad (2\text{-}2)$$

where vdGPMP1 is an Abbe number of the predetermined positive lens, and the predetermined positive lens is a positive lens with the largest Abbe number among positive lenses of the positive lens unit.

In the zoom optical system according to the first embodiment to the zoom optical system according to the third embodiment, and the zoom optical system according to the fifth embodiment to the zoom optical system according to the tenth embodiment, the following Conditional Expression (3) can be satisfied:

$$0.02≤DGBUN12a/fGBUN1≤4.0 \quad (3)$$

where

DGBUN12a is an air space between the first sub-lens unit and the second sub-lens unit, and fGBUN1 is a focal length of the first sub-lens unit.

In the zoom optical system according to the first embodiment to the zoom optical system according to the third embodiment, and the zoom optical system according to the fifth embodiment to the zoom optical system according to the tenth embodiment, the following Conditional Expression (4) can be satisfied:

$$0.43≤|(MGGBUN1back)×(MGGBUN1-1)|≤5.0 \quad (4)$$

where

MGGBUN1 is a lateral magnification in the first sub-lens unit,

MGGBUN1back is lateral magnification in a predetermined optical system, the predetermined optical system is an optical system formed of all the lenses disposed closer to the image side than the first sub-lens unit is, and the lateral magnification is lateral magnification at a time of focusing to an object at infinity.

In the zoom optical system according to the first embodiment to the zoom optical system according to the fourth embodiment, the zoom optical system according to the sixth embodiment, the zoom optical system according to the ninth embodiment, and the zoom optical system according to the tenth embodiment, the following Conditional Expression (5) can be satisfied:

$$-2.6≤SFGBUN1≤0.95 \quad (5)$$

where

SFGBUN1 is indicated with the following expression:

$$SFGBUN1=(RGBUN1f+RGBUN1r)/(RGBUN1f-RGBUN1r),$$

RGBUN1f is a radius of curvature of the lens surface disposed closest to the object side in the first sub-lens unit, and RGBUN1r is a radius of curvature of the lens surface disposed closest to the image side in the first sub-lens unit.

In the zoom optical system according to the first embodiment to the zoom optical system according to the fifth embodiment, and the zoom optical system according to the seventh embodiment to the zoom optical system according to the tenth embodiment, the following Conditional Expression (6) can be satisfied:

$$2.0≤fGPM/fw≤20.0 \quad (6)$$

where fGPM is a focal length of the positive lens unit, and fw is a focal length of the zoom optical system at the wide angle end.

In the zoom optical system according to the first embodiment to the zoom optical system according to the fifth embodiment, and the zoom optical system according to the seventh embodiment to the zoom optical system according to the tenth embodiment, the following Conditional Expression (7) can be satisfied:

$$2.3 \leq fGBUN1/fw \leq 9.7 \quad (7)$$

where fGBUN1 is a focal length of the first sub-lens unit, and fw is a focal length of the zoom optical system at a wide angle end.

In the zoom optical system according to the first embodiment to the zoom optical system according to the fifth embodiment, and the zoom optical system according to the seventh embodiment to the zoom optical system according to the ninth embodiment, the following Conditional Expression (8-1) can be satisfied:

$$1.0 \leq |LTLmax/fGN1| \leq 19.0 \quad (8\text{-}1)$$

where

LTLmax is the maximum whole length among the whole lengths of the zoom optical system, and fGN1 is a focal length of the object-side negative lens unit.

In the zoom optical system according to the present embodiment, the lens surface disposed closest to the object side in the first sub-lens unit can be formed as a surface convex on the object side.

By doing this, it is possible to reduce occurrence of spherical aberration.

In the zoom optical system according to the present embodiment, the positive lens unit is movable to be disposed closer to the object side at the telephoto end than that at the wide angle end, at a time of focusing to an object at infinity.

By doing this, it is possible to enhance the zooming function. As a result, it is possible to make the optical system small-sized.

In the zoom optical system according to the present embodiment, the following Conditional Expression (9) can be satisfied:

$$0.25 \leq |fGN1/fGPM| \leq 2.0 \quad (9)$$

where fGN1 is a focal length of the object-side negative lens unit, and fGPM is a focal length of the positive lens unit.

In a case of exceeding a lower limit value of Conditional Expression (9), it is possible to suppress occurrence of chromatic aberration of magnification in the object-side negative lens unit. In a case of falling below an upper limit value of Conditional Expression (9), it is possible to suppress occurrence of spherical aberration in the positive lens unit. Consequently, a small F-number can be secured.

In the zoom optical system according to the present embodiment, the following Conditional Expression (10) can be satisfied:

$$1.05 \leq |fGN1/fw| \leq 5.5 \quad (10)$$

where fGN1 is a focal length of the object-side negative lens unit, and fw is a focal length of the zoom optical system at a wide angle end.

In a case of exceeding a lower limit value of Conditional Expression (10), it is possible to suppress occurrence of chromatic aberration of magnification in the object-side negative lens unit. In a case of falling below an upper limit value of Conditional Expression (10), the diameter in the object-side negative lens unit is reduced. Consequently, the diameter of the optical unit can be reduced. In addition, the movement amount of the object-side negative lens unit at a time of zooming is reduced. Consequently, it is possible to perform zooming at high speed.

In the zoom optical system according to the present embodiment, the following Conditional Expression (11) can be satisfied:

$$2.0 \leq fGB/fw \leq 23 \quad (11)$$

where fGB is a focal length of the image-side optical lens unit, and fw is a focal length of the zoom optical system at the wide angle end.

In a case of exceeding a lower limit value of Conditional Expression (11), it is possible to reduce the diameter of the image-side positive lens unit. Consequently, the diameter of the optical unit can be reduced. Also, occurrence of chromatic aberration of magnification can be suppressed. In a case of falling below an upper limit value of Conditional Expression (11), it is possible to secure both a wide angle of view and a small F-number.

In the zoom optical system according to the present embodiment, the following Conditional Expression (12) can be satisfied:

$$3.5 \leq fGBUN1/IHw35 \leq 14.0 \quad (12)$$

where fGBUN1 is a focal length of the first sub-lens unit, IHw35 is indicated with the following expression:

$$IHw35 = fw \times \tan 35°, \text{ and}$$

fw is a focal length of the zoom optical system at a wide angle end.

IHw35 is a distance from a position in which the principal ray made incident on the zoom optical system at an angle of 35° crosses a paraxial image surface to the optical axis. The principal ray is a principal ray at a time when the angle of view is 35°.

In a case of exceeding a lower limit value or in a case of falling below an upper limit value of Conditional Expression (12), it is possible to suppress occurrence of aberration in the first sub-lens unit, mainly occurrence of coma and occurrence of astigmatism.

In the zoom optical system according to the present embodiment, the following Conditional Expression (13) can be satisfied:

$$1.8 \leq |fGN1/IHw35| \leq 8.0 \quad (13)$$

where fGN1 is a focal length of the object-side negative lens unit,

IHw35 is indicated with the following expression:

$$IHw35 = fw \times \tan 35°, \text{ and}$$

fw is a focal length of the zoom optical system at a wide angle end.

In a case of exceeding a lower limit value of Conditional Expression (13), it is possible to suppress occurrence of chromatic aberration of magnification in the object-side negative lens unit. In a case of falling below an upper limit value of Conditional Expression (13), the diameter of the object-side negative lens unit is reduced. Consequently, it is possible to reduce the diameter of an optical unit. In addition, the movement amount of the object-side negative lens unit at a time of zooming is reduced. Consequently, it is possible to perform zooming at high speed.

In the zoom optical system according to the present embodiment, the following Conditional Expression (14) can be satisfied:

$$0.1 \leq DGBUN12a/fw \leq 2.0 \quad (14)$$

where

DGBUN12a is an air space between the first sub-lens unit and the second sub-lens unit, and fw is a focal length of the zoom optical system at a wide angle end.

In a case of exceeding a lower limit value of Conditional Expression (14), it is possible to suppress occurrence of coma and occurrence of astigmatism. In a case of falling below an upper limit value of Conditional Expression (14), the thickness of the image-side positive lens unit in the optical axis direction reduces. In this case, it is possible to increase the space on the object side of the image-side positive lens unit. When the lens unit disposed on the object side of the image-side positive lens unit is moved along the optical axis, the movement space can be increased. Consequently, it is possible to obtain high zoom ratio.

In the zoom optical system according to the present embodiment, the first sub-lens unit can be formed of a lens component without air space.

By doing this, it is possible to reduce the thickness of the image-side positive lens unit in the optical axis direction. In this case, it is possible to increase the space on the object side of the image-side positive lens unit. When the lens unit disposed on the object side of the image-side positive lens unit is moved along the optical axis, the movement space can be increased. Moreover, it is possible to suppress occurrence of chromatic aberration of magnification of a high order.

In the zoom optical system according to the present embodiment, the first sub-lens unit consists of one positive lens, and the following Conditional Expression (15) can be satisfied:

$$52 \leq vdGBUN1P \leq 100.0 \quad (15)$$

where vdGBUN1P is an Abbe number of the positive lens of the first sub-lens unit.

In a case of exceeding a lower limit value of Conditional Expression (15), it is possible to suppress occurrence of chromatic aberration of magnification. In addition, as described later, image stabilization can be performed with the first sub-lens unit. When the first sub-lens unit is moved, it is possible to reduce occurrence of chromatic aberration.

In the zoom optical system according to the present embodiment, the second sub-lens unit can be formed of a negative lens and a positive lens.

By doing this, it is possible to reduce the thickness of the image-side positive lens unit in the optical axis direction. In this case, it is possible to increase the space on the object side of the image-side positive lens unit. When the lens unit disposed on the object side of the image-side positive lens unit is moved along the optical axis, the movement space can be increased. Consequently, it is possible to make zoom ratio high.

In the zoom optical system according to the present embodiment, the first sub-lens unit consists of one positive lens, and the second sub-lens unit can be formed of one negative lens and one positive lens.

By doing this, it is possible to reduce the thickness of the image-side positive lens unit in the optical axis direction. In this case, it is possible to increase the space on the object side of the image-side positive lens unit. When the lens unit disposed on the object side of the image-side positive lens unit is moved along the optical axis, the movement space can be increased. Consequently, it is possible to make the optical system small-sized and to secure high zoom ratio.

In the zoom optical system according to the present embodiment, the second sub-lens unit can be formed of a negative lens, a positive lens, and a negative lens disposed closest to the image side.

By doing this, it is possible to correct chromatic aberration of magnification in the image-side positive lens unit.

In the zoom optical system according to the present embodiment, the positive lens and the negative lens of the second sub-lens unit can be cemented.

By doing this, it is possible to suppress occurrence of coma of a high order, and occurrence of astigmatism of a high order.

In the zoom optical system according to the present embodiment, the second sub-lens unit can be fixed at a time of zooming.

The height of the ray made incident on the second sub-lens unit is changed at a time of zooming. When the second sub-lens unit is fixed at the time of zooming, it is possible to reduce both change in a central light flux diameter and a change in peripheral ray height made incident on the second sub-lens unit. Consequently, it is possible to suppress fluctuations in chromatic aberration of magnification from the wide angle end to the telephoto end, and to secure a small F-number.

When the lens unit is moved in the vicinity of the image surface, dust easily occurs due to movement of the lens unit. The second sub-lens unit is disposed close to the image surface. Therefore, it is possible to reduce the occurrence of dust by fixing the second sub-lens unit. Adhesion of dust onto the image pickup surface can be reduced when the image pickup element is disposed on the image surface.

A lens unit (hereinafter referred to as "focus lens unit") moving along the optical axis at a time of focusing can be disposed close to the second sub-lens unit. When the second sub-lens unit is fixed at a time of zooming, an actuator for zooming may not be disposed in the vicinity of the second sub-lens unit. Accordingly, an actuator for focusing can be disposed in the vicinity of the focus lens unit. As a result, the size of the focus unit can be reduced.

In the zoom optical system according to the present embodiment, the second sub-lens unit can include a negative lens satisfying the following Conditional Expression (16)

$$18.5 \leq vdGBUN2N \leq 55.0 \quad (16)$$

where vdGBUN2N is an Abbe number of the negative lens of the second sub-lens unit.

In a case of exceeding a lower limit value of Conditional Expression (16), it is possible to suppress occurrence of secondary spectrum and occurrence of chromatic aberration of magnification.

In the zoom optical system according to the present embodiment, the aperture stop can be disposed closer to the object side than the positive lens unit is.

By doing this, it is possible to make small the diameter of the lens unit disposed closer to the object side than the positive lens unit is.

In the zoom optical system according to the present embodiment, a moving lens unit is disposed on the object side of the image-side positive lens unit, and the moving lens unit is movable along the optical axis at a time of zooming.

By doing this, it is possible to change the incident angle of the ray made incident on the image-side positive lens unit.

As a result, it is possible to enhance the effect of correcting chromatic aberration of magnification, the effect of correcting astigmatism, and the effect of correcting coma, in a wide range of the zooming area. Consequently, favorable imaging performance is obtained.

In the zoom optical system according to the present embodiment, the first sub-lens unit is movable in a direction orthogonal to the optical axis.

As explained in the basic structure, when the image pickup apparatus is held with the hand, the image pickup apparatus may be shaken due to camera shake in some cases. When a shake is applied to the optical system due to camera shake, a clear image cannot be obtained due to influence of the shake. Image stabilization may be performed in the optical system, to obtain a clearer image with higher resolution.

The first sub-lens unit has relatively small influence on spherical aberration in comparison with the other lens units. For this reason, image stabilization can be performed with the first sub-lens unit. By doing this, it is possible to reduce deterioration of imaging performance in the center of the image, even when the lens is moved. It is also possible to enhance image stabilization sensitivity.

The chromatic aberration of magnification occurring in the first sub-lens unit can be corrected with the second sub-lens unit. Accordingly, it is also possible to reduce deterioration in imaging performance in the peripheral portion of the image.

In the zoom optical system according to the present embodiment, an intermediate lens unit is disposed between the object-side negative lens unit and the positive lens unit, and in comparison of the absolute values of the refractive powers, a refractive power of the intermediate lens unit can be smaller than the refractive power of the object-side negative lens unit, and smaller than the refractive power of the positive lens unit.

With the intermediate lens unit provided with a negative refractive power, the negative refractive power can be shared between the intermediate lens unit and the object-side negative lens unit. With the intermediate lens unit provided with a positive refractive power, the positive refractive power can be shared between the intermediate lens unit and the positive lens unit. In either case, it is possible to improve the astigmatism correction ability and the spherical aberration correction ability.

In addition, at a time of zooming, it is possible to change the space between the intermediate lens unit and the object-side negative lens unit, and change the space between the intermediate lens unit and the positive lens unit. By doing this, it is possible to correct curvature of field. As a result, it is possible to obtain favorable imaging performance from the center to the periphery of the image, in a wide range from the telephoto end to the wide angle end.

The aperture stop can be disposed between the intermediate lens unit and the positive lens unit. By doing this, it is possible to further improve the imaging performance in the periphery of the image.

In the zoom optical system according to the present embodiment, the intermediate lens unit can be used as the moving lens unit, and the intermediate lens unit is movable along the optical axis at a time of focusing.

By doing this, it is possible to reduce fluctuations in spherical aberration and fluctuations in astigmatism at a time of focusing. Consequently, it is possible to obtain favorable imaging performance.

In the zoom optical system according to the present embodiment, the object-side negative lens unit and the positive lens unit can be disposed adjacent to each other.

In this case, no lens unit is disposed between the object-side negative lens unit and the positive lens unit. For this reason, it is possible to make the object-side negative lens unit and the positive lens unit to be disposed closer to each other in the vicinity of the telephoto end. By doing this, it is possible to make zoom ratio further high.

In the zoom optical system according to the present embodiment, an image-side negative lens unit having a negative refractive power can be disposed between the positive lens unit and the image-side positive lens unit.

By doing this, it is possible to change the space between the image-side negative lens unit and the positive lens unit, by moving the image-side negative lens unit along the optical axis. As a result, it is possible to obtain favorable imaging performance in a wide range of the zooming area.

The structure in which the object-side negative lens unit is adjacent to the positive lens unit easily causes fluctuations in astigmatism and fluctuations in curvature of field at a time of zooming. Fluctuations in astigmatism and fluctuations in curvature of field caused at a time of zooming can be suppressed by changing the space between the image-side negative lens unit and the positive lens unit. Consequently, favorable imaging performance is obtained in a wide range of the zooming range, even in the structure in which the object-side negative lens unit is adjacent to the positive lens unit.

In the zoom optical system according to the present embodiment, the image-side negative lens unit is the moving lens unit, and is movable along the optical axis at a time of focusing.

The image-side negative lens unit having a negative refractive power is disposed between the positive lens unit having a positive refractive power and the image-side positive lens unit having a positive refractive power. In this position, the light flux diameter is small. For this reason, it is possible to make small the diameter of the image-side negative lens unit. In addition, it is possible to enhance the magnification of the image-side negative lens unit. For this reason, it is possible to form a light-weight focus lens unit with a small movement amount at a time of focusing. As a result, it is possible to achieve high-speed focusing.

In the zoom optical system according to the present embodiment, the image-side negative lens unit can be set immovable along the optical axis at a time of zooming.

The image-side negative lens unit can be fixed at a time of zooming. By doing this, it is possible to reduce number of lens units moved at a time of zooming, and to simplify the zooming mechanism.

In the zoom optical system according to the present embodiment, the image-side negative lens unit is the moving lens unit, and movable along the optical axis at a time of zooming.

By doing this, it is possible to change the space between the positive lens unit and the image-side negative lens unit, and the space between the image-side negative lens unit and the image-side positive lens unit, at a time of zooming. Consequently, it is possible to suppress fluctuations in astigmatism and fluctuations in curvature of field at a time of zooming. Moreover, it is also possible to make zoom ratio high.

In the zoom optical system according to the first embodiment and the zoom optical system according to the second embodiment, the following Conditional Expression (17) or (17-4) can be satisfied:

$$31.9° \leq \Omega Hw/2 \leq 75.0° \tag{17}, \text{or}$$

$$31.9° \leq \Omega Hw/2 \leq 88.0° \tag{17-4}$$

where

ΩHw is the total angle of view in a horizontal direction at the wide angle end.

In the zoom optical system according to the third embodiment to the zoom optical system according to the sixth embodiment, the following Conditional Expression (17) or (17-1) can be satisfied:

$$31.9° \leq \Omega Hw/2 \leq 75.0° \tag{17}, \text{or}$$

$$31.9° \leq \Omega Hw/2 \leq 88.0° \tag{17-1}$$

where

ΩHw is the total angle of view in a horizontal direction at the wide angle end.

In the zoom optical system according to the seventh embodiment to the zoom optical system according to the tenth embodiment, the following Conditional Expression (17) can be satisfied:

$$31.9° \leq \Omega Hw/2 \leq 75.0° \tag{17}$$

where

ΩHw is the total angle of view in a horizontal direction at the wide angle end.

The technical meaning of Conditional Expressions (17) and (17-4) is the same as the technical meaning of Conditional Expression (17-2).

In the zoom optical system according to the present embodiment, the positive lens unit can include a positive lens and a negative lens.

To enhance the zoom ratio and reduce the F-number, it is preferable to correct spherical aberration in a wide range of the wavelength area contributing to imaging. The third lens unit disposed close to the aperture stop can greatly be involved in spherical aberration. Spherical aberration can be corrected by using at least a positive lens and a negative lens for the positive lens unit. Correction of spherical aberration enables image stabilization as described later.

In the zoom optical system according to the present embodiment, the positive lens unit includes a first positive lens disposed closest to the object side, and a second positive lens disposed closest to the image side, and a lens surface on the image side of the second positive lens can be a convex surface.

By doing this, it is possible to share the refractive power of the positive lens unit between two positive lenses. Therefore, it is possible to increase the refractive power of the positive lens unit, while suppressing deterioration of aberration. As a result, it is possible to shorten the whole length of the optical system, and to make the F-number small.

By increasing the refractive power of the first positive lens, it is possible to make large the zooming function in the positive lens unit. By making an image side lens surface of the second positive lens to be a convex surface, it is possible to enhance the effect of correcting spherical aberration and the effect of correcting coma.

In the zoom optical system according to the present embodiment, the whole length of the zoom optical system can be fixed at a time of zooming.

When the lens unit disposed closest to the object side is moved at a time of zooming, the position of the center of gravity of the whole optical system may be changed. When the position of the center of gravity of the whole optical system is changed, the posture in imaging may be changed from the posture before zooming. As described above, when the lens unit disposed closest to the object side is moved at a time of zooming, imaging at a fixed posture may become difficult.

Fixing the whole length of the zoom optical system at a time of zooming immobilizes the lens unit disposed closest to the object side at a time of zooming. When the lens unit disposed closest to the object side at a time of zooming can be immobilized, zooming is enabled with reduced change in posture in imaging.

In addition, in the external appearance, no movable portion exists in the lens barrel. Accordingly, when the optical unit is formed using the zoom optical system of the present embodiment and the lens barrel, it is possible to form an optical unit with higher durability, higher dust resistance, and higher waterproof property. For example, when the optical unit is used for a monitoring camera, the monitoring camera can be installed outdoors for a long period of time.

In the zoom optical system according to the present embodiment, the aperture stop is moved only in one direction along the optical axis, or can be immobilized, at a time of zooming.

The technical meaning relating to movement of the aperture stop is as explained with respect to the zoom optical system according to the seventh embodiment.

In the zoom optical system according to the present embodiment, the aperture stop can be immobilized at a time of zooming.

The technical meaning relating to movement of the aperture stop is as explained with respect to the zoom optical system according to the fifth embodiment.

In the zoom optical system according to the present embodiment, a predetermined positive lens unit having a positive refractive power can be disposed on the object side of the object-side negative lens unit.

In this case, the zoom optical system has the structure in which a lens unit (the predetermined positive lens unit and the image-side positive lens unit) having a positive refractive power is disposed on each of the object side and the image side of the positive lens unit. For this reason, an optically symmetrical structure can be easily formed, with the positive lens unit serving as the center, in a wide range of the zooming area, and the whole zooming area. As a result, it is possible to secure a wide angle of view and a high zoom ratio at the wide angle end. In addition, it is possible to shorten the whole length of the optical system, and to correct mainly curvature of field and coma favorably, in a wide range of the zooming area. The optical symmetrical structure is, for example, arrangement of the refractive power.

A telephoto-type optical system can be formed of the predetermined positive lens unit and the object-side negative lens unit. In this case, the space between the predetermined positive lens unit and the object-side negative lens unit can be set wider at the telephoto end than that at the wide angle end. By doing this, it is possible to enhance the function of the telephoto type. Consequently, it is possible to shorten the whole length of the optical system and the zoom ratio.

The predetermined positive lens unit can be disposed closest to the object side. By doing this, it is possible to enhance the function of the telephoto type. Consequently, it is possible to shorten the whole length of the optical system and the zoom ratio.

Because the diameter of the luminous flux made incident on the positive lens unit can be reduced, the diameter of the positive lens unit can be reduced even when the F-number is reduced in the vicinity of the telephoto end.

As described above, a small-sized optical system securing favorable imaging performance can be obtained, in a zoom optical system having a wide angle of view and a high zoom ratio.

In the zoom optical system according to the present embodiment, the following Conditional Expression (18) can be satisfied:

$$2.3 \leq fGP1/fGPM \leq 7 \tag{18}$$

where fGP1 is a focal length of the predetermined positive lens unit, and fGPM is a focal length of the positive lens unit.

In a case of exceeding a lower limit value of Conditional Expression (18), it is possible to enhance the zooming function in the positive lens unit. As a result, it is possible to obtain high zoom ratio. In a case of falling below an upper limit value of Conditional Expression (18), it is possible to suppress occurrence of spherical aberration and occurrence of coma in the positive lens unit. Consequently, a small F-number can be obtained.

In the zoom optical system according to the present embodiment, the predetermined positive lens unit includes a negative lens and a positive lens, the positive lens of the predetermined positive lens unit is a meniscus lens, and a lens surface of the meniscus lens on the object side can be formed as a surface convex on the object side.

The predetermined positive lens unit can include a negative lens and a positive lens. By doing this, it is possible to achieve a high zoom ratio, and to reduce occurrence of chromatic aberration in a wide range of the zooming area.

The positive lens of the predetermined positive lens unit can be formed as a meniscus lens. A lens surface of the meniscus lens on the object side can be formed as a surface convex on the object side. By doing this, it is possible to reduce fluctuations in astigmatism at a time of zooming. As a result, stable imaging performance is obtained in a wide range of the zooming area.

In the zoom optical system according to the present embodiment, the predetermined positive lens unit can be formed of a negative lens and two positive lenses.

In the predetermined positive lens unit, spherical aberration easily occurs in the vicinity of the telephoto end. By doing this, it is possible to suppress occurrence of spherical aberration in the vicinity of the telephoto end. Consequently, it is possible to obtain high zoom ratio.

Among the two positive lenses, at least one positive lens can be formed as a positive meniscus lens with a convex surface facing the object side. By doing this, it is possible to reduce fluctuations in spherical aberration and fluctuations in astigmatism at a time of zooming. Consequently, stable imaging performance can be obtained in a wide range of the zooming area.

In the zoom optical system according to the present embodiment, the two positive lenses of the predetermined positive lens unit are meniscus lenses, and a lens surface of each of the meniscus lenses on the object side can be a surface convex on the object side.

By doing this, it is possible to achieve a high zoom ratio, and to reduce occurrence of chromatic aberration in a wide range of the zooming area. Moreover, it is possible to reduce fluctuations in astigmatism at a time of zooming. Consequently, stable imaging performance can be obtained in a wide range of the zooming area.

In the zoom optical system according to the present embodiment, the predetermined positive lens unit can further include another positive lens.

By doing this, it is possible to increase the positive refractive power in the predetermined positive lens unit. Consequently, it is possible to shorten the whole length of the optical system.

In the zoom optical system according to the present embodiment, the following Conditional Expression (19) can be satisfied:

$$0.5 \leq |fGPM/fGNB| \leq 2.0 \tag{19}$$

where fGPM is a focal length of the positive lens unit, and fGNB is a focal length of the image-side negative lens unit.

In a case of exceeding a lower limit value of Conditional Expression (19), it is possible to suppress occurrence of curvature of field in the image-side negative lens unit. In a case of falling below an upper limit value of Conditional Expression (19), it is possible to suppress occurrence of astigmatism in the image-side negative lens unit. Consequently, it is possible to suppress a biased blur state of the image due to an assembly error.

In the zoom optical system according to the present embodiment, the following Conditional Expression (20) can be satisfied:

$$0.25 \leq fGN1/fGNB \leq 1.5 \tag{20}$$

where fGN1 is a focal length of the object-side negative lens unit, and fGNB is a focal length of the image-side negative lens unit.

In a case of exceeding a lower limit value of Conditional Expression (20), it is possible to suppress occurrence of chromatic aberration of magnification in the image-side negative lens unit. In a case of falling below an upper limit value of Conditional Expression (20), it is possible to enhance the zooming function in the object-side negative lens unit.

In the zoom optical system according to the present embodiment, the following Conditional Expression (21) can be satisfied:

$$0.03 \leq \Delta GPMM \leq LTLw \leq 0.3 \tag{21}$$

where

ΔGPMM is a movement amount of the positive lens unit when moved from the wide angle end to the telephoto end, and LTLw is the whole length of the zoom optical system at the wide angle end.

In a case of exceeding a lower limit value of Conditional Expression (21), it is possible to disperse the zooming function of the lens unit to the object-side negative lens unit. Consequently, it is possible to suppress fluctuations in chromatic aberration of magnification, even when the angle of view is wide at the wide angle end of the wide angle of view.

In a case of falling below an upper limit value of Conditional Expression (21), it is possible to reduce the movement amount of the positive lens unit. Consequently, the zooming speed is improved. In addition, it is also possible to make small the diameter of the positive lens unit, and to suppress occurrence of spherical aberration, even when the F-number is reduced in the vicinity of the telephoto end.

In the zoom optical system according to the present embodiment, the positive lens unit can be prevented from moving along the optical axis at a time of zooming.

When the lens unit is moved, the position when the lens unit is stopped may fluctuate, due to backlash of the movement mechanism. The positive lens unit can be involved in occurrence of spherical aberration and occurrence of coma. For this reason, the positive lens unit is fixed at a time of zooming. By doing this, it is possible to suppress displacement of the position of the positive lens unit from the position in design, in a wide range of the zooming area. Consequently, it is possible to obtain favorable imaging performance in a wide range of the zooming area.

The occurrence amount of spherical aberration and the occurrence amount of coma easily increase in the vicinity of the telephoto end. In an optical system in which a half angle of view at the telephoto end is 4° or less, fixing the positive lens unit at a time of zooming is effective for suppressing occurrence of these aberrations.

In the zoom optical system according to the present embodiment, the object-side negative lens unit can be disposed closest to the object side.

By doing this, it is possible to secure a wider angle of view.

In the zoom optical system according to the present embodiment, the object-side negative lens unit includes a first negative meniscus lens, a second negative meniscus lens, and one positive lens, the first negative meniscus lens is disposed closest to the object side, the second negative meniscus lens is disposed on the image side of the first negative meniscus lens, and each of a lens surface of the first negative meniscus lens on the object side and a lens surface of the second negative meniscus lens on the object side can be a surface concave on the image side.

The negative refractive power of the object-side negative lens is greatly involved in reduction in diameter of the optical system. The diameter of the optical system can be reduced by increasing the negative refractive power of the object-side negative lens unit. Moreover, it is possible to increase the angle of view.

When the negative refractive power of the object-side negative lens unit is made large, the occurrence amount of curvature of field and the occurrence amount of astigmatism increase easily. In the lens unit disposed closest to the object side, the height with which the off-axis principal ray passes through the lens unit is highest.

For this reason, the first negative meniscus lens is disposed closest to the object side in the object-side negative lens unit. In addition, the second negative meniscus lens is disposed on the image side of the first negative meniscus lens. Each of a lens surface of the first negative meniscus lens on the object side and a lens surface of the second negative meniscus lens on the object side is formed as a surface concave on the image side. By doing this, it is possible to reduce abrupt refraction of rays, while increasing the negative refractive power of the object-side negative lens unit. Consequently, it is possible to reduce occurrence of curvature of field and occurrence of astigmatism. In addition, by disposing a positive lens, it is possible to reduce occurrence of longitudinal chromatic aberration and occurrence of chromatic aberration of magnification.

In the zoom optical system according to the present embodiment, the intermediate lens unit has a positive refractive power, and can be disposed closer to the object side than the aperture stop is.

By doing this, it is possible to increase the negative refractive power of the object-side negative lens unit, and to secure a wide angle of view, and simultaneously to correct chromatic aberration of magnification easily by increasing the angle of view.

In the zoom optical system according to the present embodiment, the following Conditional Expression (22) can be satisfied:

$$7.0 \le ft/fw \le 120 \tag{22}$$

where
ft is a focal length of the zoom optical system at a telephoto end, and
fw is a focal length of the zoom optical system at a wide angle end.

In a case of exceeding a lower limit value of the Conditional Expression (22), it is possible to obtain a high-definition image. For this reason, for example, when the zoom optical system of the present embodiment is used for a monitoring camera, it is possible to photograph a license plate of an automobile and/or a face of a person clearly. In a case of falling below an upper limit value of the Conditional Expression (22), it is possible to shorten the whole length of the optical system. Consequently, it is possible to make the optical system small-sized.

In the zoom optical system according to the present embodiment the following Conditional Expression (23) can be satisfied:

$$0.6 \le FNOw \le 4.0 \tag{23}$$

where
FNOw is an F-number at the wide angle end.

In the zoom optical system according to the present embodiment, the following Conditional Expression (24) can be satisfied:

$$0.7 \le FNOt \le 5.1 \tag{24}$$

where
FNOt is an F-number at the telephoto end.

In a case of exceeding a lower limit value of Conditional Expression (24), it is possible to suppress occurrence of spherical aberration and occurrence of astigmatism around the telephoto end, in each of the object-side negative lens unit and the positive lens unit. Moreover, it is possible to suppress occurrence of spherical aberration and occurrence of astigmatism around the telephoto end, also in a predetermined positive lens unit.

In a case of falling below an upper limit value of Conditional Expression (23), it is possible to secure sufficient brightness at the telephoto end. For this reason, for example, when the zoom optical system of the present embodiment is used for a monitoring camera, a favorable image can be obtained in monitoring in cloudy weather or at night.

In the zoom optical system according to the first embodiment to the zoom optical system according to the sixth embodiment, the following Conditional Expression (25) or (25-1) can be satisfied:

$$0.0 \le ft/fw + 13.38 \times \tan(\Omega Hw/2) - 21.0 \le 80 \tag{25, or}$$

$$0.0 \le ft/fw + 13.38 \times \tan(\Omega Hw/2) - 21.0 \le 350 \tag{25-1}$$

where
fw is a focal length of the zoom optical system at a wide angle end,
ft is a focal length of the zoom optical system at a telephoto end, and
ΩHw is a total angle of view in a horizontal direction at the wide angle end.

The technical meaning of Conditional Expression (25) is the same as the technical meaning of Conditional Expression (15-1).

In the zoom optical system according to the seventh embodiment to the zoom optical system according to the tenth embodiment, the following Conditional Expression (25-1) can be satisfied:

$$0.0 \leq ft/fw + 13.38 \times \tan(\Omega Hw/2) - 21.0 \leq 350 \quad (25\text{-}1)$$

where fw is a focal length of the zoom optical system at the wide angle end, ft is a focal length of the zoom optical system at the telephoto end, and ΩHw is a total angle of view in the horizontal direction at the wide angle end.

In the zoom optical system according to the present embodiment, the following Conditional Expression (26) can be satisfied:

$$0.04 \leq \Sigma GP1/LTLw \leq 0.35 \quad (26)$$

where

ΣGP1 is a thickness of the predetermined positive lens unit, and

LTLw is the whole length of the zoom optical system at the wide angle end.

In a case of exceeding a lower limit value of Conditional Expression (26), it is possible to make large the refractive power of the predetermined positive lens unit. Consequently, it is possible to shorten the whole length of the optical system. A value lower than the upper limit value of Conditional Expression (26), it is possible to secure a space in which the lens unit disposed adjacent to the predetermined positive lens unit is moved at a time of zooming. For this reason, it is also possible to secure high zoom ratio, while securing a wide angle of view on the wide angle side.

In the zoom optical system according to the present embodiment, the following Conditional Expression (27) can be satisfied:

$$-2.3 < fw \times FNOw/fGN1 < -0.4 \quad (27)$$

where fw is a focal length of the zoom optical system at a wide angle end,

FNOw is an F-number at the wide angle end, and fGN1 is a focal length of the object-side negative lens unit.

In a case of exceeding a lower limit value of Conditional Expression (27), it is possible to obtain a wide angle of view even when a small F-number is obtained, while making the diameter of the optical system small. In a case of falling below an upper limit value of Conditional Expression (27), it is possible to make the diameter of the optical system small.

In the zoom optical system according to the present embodiment, the following Conditional Expression (28) can be satisfied:

$$1.9 < SPGN1Ln1 < 6.5 \quad (28)$$

where

SPGN1Ln1 is indicated with the following expression:

$$SPGN1Ln1 = (RGN1Ln1f + RGN1Ln1r)/(RGN1Ln1f - RGN1Ln1r),$$

RGN1Ln1f is a radius of curvature of a lens surface of the first negative meniscus lens on the object side, and RGN1Ln1r is a radius of curvature of a lens surface of the first negative meniscus lens on the image side.

In a case of falling below a lower limit value of Conditional Expression (28), a difference of curvature between the lens surface on the object side and the lens surface on the image side becomes too large. For this reason, astigmatism occurs.

In a case exceeding of an upper limit value of Conditional Expression (28), a difference of curvature between the lens surface on the object side and the lens surface on the image side becomes too small. For this reason, the refractive power of the object-side negative lens unit becomes small. In this case, the incident height of the ray made incident on the lens unit disposed closer to the image side becomes higher than the object-side negative lens unit is. Consequently, the diameter of the lens unit disposed closer to the image side becomes larger than the object-side negative lens unit is.

In a state of exceeding of an upper limit value of Conditional Expression (28), when the negative refractive power of the object-side negative lens unit is made large forcibly to make the diameter of the optical system small, the curvature of the lens surface of the first negative meniscus lens becomes too small. In this case, because the surface top of the side surface of the object projects to the object side, the whole length of the optical system increases, and the diameter including the lens frame increases.

In the zoom optical system according to the present embodiment, the following Conditional Expression (29) can be satisfied:

$$-25\% < DTw < 5\% \quad (29)$$

where

DTw is a distortion amount at the maximum angle of view at the wide angle end, and indicated with the following expression:

$$DTw = (IHw1 - IHw2)/IHw2 \times 100(\%),$$

IHw1 is a real image height when light flux including the ray of the maximum angle of view is imaged on the image surface, IHw2 is a paraxial image height when light flux including the ray of the maximum angle of view is imaged on the image surface, and each of them is an image height at a time of focusing to an object at infinity.

In a case of falling below a lower limit value of Conditional Expression (29), distortion of the image becomes too large. For this reason, accurate recognition of the subject becomes difficult. Otherwise, when an image acquired by the image pickup apparatus is subjected to electrical distortion correction, because the peripheral portion of the image is greatly enlarged, deterioration of image markedly occurs in the peripheral portion.

In a case of exceeding an upper limit value of Conditional Expression (29), the angle of view becomes too narrower than the angle of view in a state without aberration. For this reason, sufficient information amount can not be acquired at the wide angle end.

The image pickup apparatus according to the present embodiment includes an optical system, and an image pickup element having an image pickup surface and converting an image formed on the image pickup surface with the optical system into an electrical signal, wherein the optical system is the zoom optical systems according to the present embodiment.

It is possible to provide an image pickup apparatus capable of acquiring an image of high image quality.

In the image pickup apparatus according to the present embodiment, the following Conditional Expression (30) can be satisfied:

$$3.15 \text{ mm} \leq Rimg \leq 40.0 \text{ mm} \quad (30)$$

where

Rimg is a radius of an image circle at the image pickup element.

Examples of the image pickup apparatus are a digital camera, a video camera, a monitoring camera, and a camera for a television conference system.

Imaging needs in digital cameras and video cameras include, for example, two imaging needs. The first one is a demand for imaging a large building, and a demand for shooting a commemorative picture with a vast background. The second one is a demand for imaging with one imaging lens from imaging of a wide range to enlarged imaging of a subject.

In order not to miss an imaging chance, it is desirable that a high-definition image can be stably obtained. To achieve it, it is desirable to enhance the imaging performance of the optical system, and stabilize the imaging performance. By doing this, it is possible to form a high definition image stably.

An image is blurred due to shake caused by camera shake, or vibration other than camera shake. When blurring of an image occurs, it becomes difficult to acquire a high-definition image stably. To achieve stable acquisition of a high-definition image, blurring of an image caused by vibration should be suppressed to the minimum.

Blurring of an image due to vibration can be suppressed by reducing the open F-number. In addition, moving part of the optical system enables correction of blurring of an image due to vibration.

A prompt zooming is required to prevent missing of an imaging change.

Examples of needs in a monitoring camera include monitoring in a wider range, and monitoring with a higher magnification. For example, monitoring with a higher magnification enables easy identification of the numbers of the license plate, and identification of the person.

Moreover, there are cases where mobility is important in digital cameras and video cameras. Herein, the mobility indicates, for example, easy portability, stability in hand-held shooting, and high focus speed. To achieve excellent mobility of the apparatus, the optical system may have a small size and light weight. Moreover, in a monitoring camera, the optical system may be required to achieve reduction in size and reduction in diameter, because the place in which the monitoring camera is installed may be limited.

The zoom optical system according to the present embodiment can mainly be used for an optical system of an image pickup apparatus using an electronic image pickup element. In this case, the half angle of view can be set to 36° or more. The half angle of view may be set to 40° or more, or 42° or more. The following is correspondence between the half angle of view and the focal length.

| Half Angle of View | Focal Length |
| --- | --- |
| 36° or more | 29 mm or less |
| 40° or more | 26 mm or less |
| 42° or more | 24 mm or less |

The zoom optical system according to the present embodiment can secure a wide angle of view at the wide angle end and a small F-number, and enables favorable correction of aberrations. In addition, the zoom optical system according to the present embodiment achieves excellent mobility and excellent degree of freedom of installment, and includes an optical system with a small size and a small diameter. The zoom optical system according to the present embodiment can provide an image pickup optical system effective for stable imaging and rapid imaging without missing an imaging chance.

The zoom optical system and the optical apparatus described above can satisfy a plurality of structures simultaneously. In this manner, a favorable zoom optical system and a favorable optical apparatus can be obtained. Any combination of the structure may be adopted. For each of the conditional expressions, only the upper limit value or the lower limit value of the numerical value range of a more limited conditional expression can be limited.

At least one of Conditional Expressions (9) to (30) can be used in combination with the basic structure of the zoom optical system of the present embodiment. The combination can exclude Conditional Expressions (1), (2), (2-1), and (3) to (8).

For each of the conditional expressions, the lower limit value or the upper limit value can be changed as follows.

The following are possible changes of Conditional Expression (1).

The lower limit value can be changed to any one of 0.26, 0.3, 0.4, 0.42, 0.5, 0.58, 0.6, and 0.75.

The upper limit value can be changed to any one of 2.0, 1.8, 1.7, 1.6, 1.56, and 1.4.

The following are possible changes of Conditional Expressions (2), (2-1), and (2-2).

The lower limit value can be changed to any one of 61, 63, 64, 65, 66, 69, 70, 71, 73, 74, 76, 77, and 80.

The upper limit value can be changed to any one of 95, 91, and 86.

The following are possible changes of Conditional Expression (3).

The lower limit value can be changed to any one of 0.025, 0.03, 0.035, and 0.04.

The upper limit value can be changed to any one of 3.0, 2.1, 1.1, 0.5, 0.4, 0.3, 0.2 and 0.17.

The following are possible changes of Conditional Expression (4).

The lower limit value can be changed to any one of 0.44, 0.45, 0.47, 0.5, 0.52, 0.55, 0.56, 0.6, and 0.61.

The upper limit value can be changed to any one of 4.0, 3.0, 2.9, 2.0, 1.9, 1.5, 1.2, 1.0, and 0.80.

The following are possible changes of Conditional Expressions (5), (5-1), and (5-2).

The lower limit value can be changed to any one of −2.2, −2.0, −1.8, −1.5, −1.4, −1.0, −0.97, −0.8, and −0.7.

The upper limit value can be changed to any one of 0.8, 0.70, 0.5, 0.44, 0.3, 0.19, 0.0, −0.07, and −0.3.

The following are possible changes of Conditional Expression (6).

The lower limit value can be changed to any one of 2.2, 2.3, 2.4, 2.5, 2.6, 2.7, 2.9, 3.4, and 3.6.

The upper limit value can be changed to any one of 16.4, 12.7, 10.0, 9.1, 9.0, 8.0, 7.0, and 5.5.

The following are possible changes of Conditional Expression (7).

The lower limit value can be changed to any one of 2.5, 2.6, 2.8, 2.9, 3.5, 4.0, and 4.5.

The upper limit value can be changed to any one of 9.0, 8.7, 8.5, 8.0, 7.8, 7.0, 6.8, 6.5, and 5.9.

The following are possible changes of Conditional Expressions (8) and (8-1).

The lower limit value can be changed to any one of 2.0, 3.2, 4.0, 4.7, 5.0, 5.4, 6.0, 6.4, 7.0, 7.5, 7.7, 8.0, 8.2, 8.5, 9.0 and 9.9.

The upper limit value can be changed to any one of 18.1, 18.0, 17.5, 17.2, 17.0, 16.5, 16.3, 16.1, 16.0, 15.8, 15.6, 15.5, 15.3, 15.0, 14.5, and 14.0.

The following are possible changes of Conditional Expression (9).

The lower limit value can be changed to any one of 0.26, 0.27, 0.28, 0.29, 0.30, 0.4, and 0.45.

The upper limit value can be changed to any one of 1.7, 1.5, 1.4, 1.3, 1.2, 1.0, and 0.70.

The following are possible changes of Conditional Expression (10).

The lower limit value can be changed to any one of 1.1, 1.15, 1.2, 1.3, 1.4, 1.5, 2.1, and 2.5.

The upper limit value can be changed to any one of 5.0, 4.7, 4.5, 4.3, 4.1, 4.0, and 3.5.

The following are possible changes of Conditional Expression (11).

The lower limit value can be changed to any one of 2.2, 2.3, 2.4, 2.5, 2.6, 2.7, 2.8, and 3.05.

The upper limit value can be changed to any one of 21.5, 20.9, 20, 19, 18.8, 18, 16.7, and 14.56.

The following are possible changes of Conditional Expression (12).

The lower limit value can be changed to any one of 3.7, 3.8, 4.0, 4.2, 4.5, and 5.0.

The upper limit value can be changed to any one of 13.0, 12.6, 12.0, 11.2, 10.0, 9.8, and 8.4.

The following are possible changes of Conditional Expression (13).

The lower limit value can be changed to any one of 1.8, 1.9, 2.1, 3.0, and 3.5.

The upper limit value can be changed to any one of 7.3, 7.0, 6.7, 6.5, 6.0, 5.8, and 5.1.

The following are possible changes of Conditional Expression (14).

The lower limit value can be changed to any one of 0.12, 0.13, 0.14, 0.15, 0.16, and 0.18.

The upper limit value can be changed to any one of 1.7, 1.5, 1.2, and 0.97.

The following are possible changes of Conditional Expression (15).

The lower limit value can be changed to any one of 52, 53, 55, 59, 63, and 67.

The upper limit value can be changed to any one of 95, 91, 86, and 82.

The following are possible changes of Conditional Expression (16).

The lower limit value can be changed to any one of 20, 21, 23, 24, 25, 26, 27, 28, and 29.

The upper limit value can be changed to any one of 55, 54, 53, 53.5, 50, and 45.

The following are possible changes of Conditional Expressions (17), (17-1), (17-2), (17-3), and (17-4) (the unit is "° (degree)".

The lower limit value can be changed to any one of 32, 33, 36, 37, 39, 41, and 48.

The upper limit value can be changed to any one of 85, 80, 75, 70, 66, 65, 61, and 56.

The following are possible changes of Conditional Expression (18).

The lower limit value can be changed to any one of 2.5, 2.6, 2.7, 2.8, 2.9, 3.0, and 3.2.

The upper limit value can be changed to any one of 6.5, 6.2, 6.0, 5.5, 5.3, 5.0, 4.5, 4.0, and 3.6.

The following are possible changes of Conditional Expression (19).

The lower limit value can be changed to any one of 0.63, 0.7, 0.76, 0.85, 0.89, and 1.0.

The upper limit value can be changed to any one of 1.8, 1.7, 1.6, 1.5, 1.4, and 1.3.

The following are possible changes of Conditional Expression (20).

The lower limit value can be changed to any one of 0.31, 0.35, 0.37, 0.4, 0.42, 0.45, and 0.48.

The upper limit value can be changed to any one of 1.34, 1.2, 1.1, 1.0, and 0.84.

The following are possible changes of Conditional Expression (21).

The lower limit value can be changed to any one of 0.05, 0.06, 0.09, 0.1, 0.11, 0.13, and 0.14.

The upper limit value can be changed to any one of 0.28, 0.25, 0.23, 0.22, and 0.20.

The following are possible changes of Conditional Expression (22).

The lower limit value can be changed to any one of 8.7, 9.5, 10.4, 12, 12.1, 13.5, 13.7, 14, and 20.

The upper limit value can be changed to any one of 100, 81, 80, 63, 60, 45, 44, and 25.

The following are possible changes of Conditional Expressions (23) and (23-1).

The lower limit value can be changed to any one of 0.77, 0.8, 0.85, 0.9, 1.0, 1.1, 1.2, and 1.3.

The upper limit value can be changed to any one of 3.7, 3.5, 3.4, 3.2, 3.0, 2.9, 2.6, 2.5, 2.4, 2.2, 2.0, 1.84, and 1.8.

The following are possible changes of Conditional Expression (24).

The lower limit value can be changed to any one of 1.2, 1.25, 1.5, 1.7, 1.79, 2.0, 2.2, 2.34, and 2.88.

The upper limit value can be changed to any one of 5.0, 4.80, 4.7, 4.51, 4.5, 4.3, 4.21, 4.2, 4.0, 3.91, 3.5, and 2.95.

The following are possible changes of Conditional Expressions (25) and (25-1).

The lower limit value can be changed to any one of 0.13, 0.2, 0.26, 0.3, 0.39, 0.45, 0.52, 1.0, and 3.5.

The upper limit value can be changed to any one of 300, 150, 80, 70, 63, 60, 50, 46, 45, 40, 35, 30, 25, 20, and 13.

The following are possible changes of Conditional Expression (26).

The lower limit value can be changed to any one of 0.05, 0.07, 0.08, and 0.10.

The upper limit value can be changed to any one of 0.31, 0.26, 0.22, and 0.18.

The following are possible changes of Conditional Expression (27).

The lower limit value can be changed to any one of −2.2, −2.1, −1.9, −1.8, −1.7, −1.6, and −1.55.

The upper limit value can be changed to any one of −0.42, −0.43, −0.45, −0.46, −0.5, −0.6, −0.8, and −1.0.

The following are possible changes of Conditional Expression (28).

The lower limit value can be changed to any one of 2.5, 2.6, 3.0, 3.2, 3.9, 4.0, and 4.5.

The upper limit value can be changed to any one of 6.1, 6.0, 5.8, 5.7, 5.5, 5.4, and 5.0.

The following are possible changes of Conditional Expression (29) (the unit is "%").

The lower limit value can be changed to any one of −23, −22.0, −21, −20.0, −18, −17.0, −16.5, −16, and −15.0.

The upper limit value can be changed to any one of 4.5, 4.0, 3.0, 2.8, 2.5, 0.68, 0, −1.5, −3.0, −3.5, and −3.6.

The following are possible changes of Conditional Expression (30) (the unit is "mm").

The lower limit value can be changed to any one of 3.2, 3.25, 3.3, 3.4, 3.5, 3.6, 3.8, 4.0, 4.1, and 5.0.

The upper limit value can be changed to any one of 38, 35, 33, 26, 19, and 12.

The following is detailed explanation of examples of the zoom optical system based on drawings. The examples do not limit the present invention.

The following is explanation of lens cross-sectional views of each of the examples.

FIG. 1A, FIG. 2A, FIG. 3A, FIG. 4A, FIG. 5A, FIG. 6A, FIG. 7A and FIG. 8A show a cross-sectional view at a wide angle end.

FIG. 1B, FIG. 2B, FIG. 3B, FIG. 4B, FIG. 5B, FIG. 6B, FIG. 7B and FIG. 8B show a cross-sectional view at an intermediate focal length state.

FIG. 1C, FIG. 2C, FIG. 3C, FIG. 4C, FIG. 5C, FIG. 6C, FIG. 7C and FIG. 8C show a cross-sectional view at a telephoto end The following is explanation of aberration diagrams of each of the examples.

FIG. 9A, FIG. 10A, FIG. 11A, FIG. 12A, FIG. 13A, FIG. 14A, FIG. 15R and FIG. 16A show a spherical aberration (SA) at a wide angle end.

FIG. 9B, FIG. 10B, FIG. 11B, FIG. 12B, FIG. 13BB, FIG. 14B, FIG. 15B and FIG. 16B show an astigmatism (AS) at a wide angle end.

FIG. 9C, FIG. 100, FIG. 11C, FIG. 12C, FIG. 13C, FIG. 14C, FIG. 15C and FIG. 16C show a distortion (DT) at a wide angle end.

FIG. 9D, FIG. 10D, FIG. 11D, FIG. 12D, FIG. 13D, FIG. 14D, FIG. 15D and FIG. 16D show a chromatic aberration of magnification (CC) at a wide angle end.

In addition, FIG. 9E, FIG. 10E, FIG. 11E, FIG. 12E, FIG. 13E, FIG. 14E, FIG. 15E and FIG. 16E show a spherical aberration (SA) at an intermediate focal length state.

FIG. 9F, FIG. 10F, FIG. 11F, FIG. 12F, FIG. 13F, FIG. 14F, FIG. 15F and FIG. 16F shows an astigmatism (AS) at an intermediate focal length state.

FIG. 9G, FIG. 10G, FIG. 11G, FIG. 12G, FIG. 13G, FIG. 14G, FIG. 15G and FIG. 16G show a distortion (DT) at an intermediate focal length state.

FIG. 9H, FIG. 10H, FIG. 11H, FIG. 12H, FIG. 13H, FIG. 14H, FIG. 15H and FIG. 16H show a chromatic aberration of magnification (CC) at an intermediate focal length state.

In addition, FIG. 9I, FIG. 10I, FIG. 11I, FIG. 12I, FIG. 13I, FIG. 14I, FIG. 15I and FIG. 16I show a spherical aberration (SA) at a telephoto end.

FIG. 9J, FIG. 10J, FIG. 11J, FIG. 12J, FIG. 13J, FIG. 14J, FIG. 15J and FIG. 16J show an astigmatism (AS) at a telephoto end.

FIG. 9K, FIG. 10K, FIG. 11K, FIG. 12K, FIG. 13K, FIG. 14K, FIG. 15K and FIG. 16K show a distortion (DT) at a telephoto end.

FIG. 9L, FIG. 10L, FIG. 11L, FIG. 12L, FIG. 13L, FIG. 14L, FIG. 15L and FIG. 16L show a chromatic aberration of magnification (CC) at a telephoto end.

Both the lens cross-sectional views and the aberration diagrams are diagrams at a time of focusing to an object at infinity.

The first lens unit is indicated with G1, the second lens unit is indicated with G2, the third lens unit is indicated with G3, the fourth lens unit is indicated with G4, the fifth lens unit is indicated with G5, the sixth lens unit is indicated with G6, the aperture stop (aperture diaphragm) is indicated with S, and the image surface (image pickup surface) is indicated with I. Moreover, a cover glass C of the image pickup element can be disposed between the lens unit disposed closest to the image side and the image surface I.

Table 1A, Table 1B, Table 10 and Table 1D illustrate relation between the "predetermined positive lens unit", "object-side negative lens unit", "intermediate lens unit", "positive lens unit", "image-side negative lens unit", and "image-side positive lens unit" described above and the first lens unit G1 to the sixth lens unit G6 in each of the examples.

TABLE 1A

|  | Example 1 | Example 2 |
|---|---|---|
| predetermined positive lens unit | none | first lens unit G1 |
| object-side negative lens unit | first lens unit G1 | second lens unit G2 |
| intermediate lens unit | second lens unit G2 | none |
| positive lens unit | third lens unit G3 | third lens unit G3 |
| image-side negative lens unit | none | fourth lens unit G4 |
| image-side positive lens unit | fourth lens unit G4 | fifth lens unit G5 |

TABLE 1B

|  | Example 3 | Example 4 |
|---|---|---|
| predetermined positive lens unit | first lens unit G1 | first lens unit G1 |
| object-side negative lens unit | second lens unit G2 | second lens unit G2 |
| intermediate lens unit | none | third lens unit G3 |
| positive lens unit | third lens unit G3 | fourth lens unit G4 |
| image-side negative lens unit | fourth lens unit G4 | fifth lens unit G5 |
| image-side positive lens unit | fifth lens unit G5 | sixth lens unit G6 |

TABLE 1C

|  | Example 5 | Example 6 |
|---|---|---|
| predetermined positive lens unit | first lens unit G1 | first lens unit G1 |
| object-side negative lens unit | second lens unit G2 | second lens unit G2 |
| intermediate lens unit | none | none |
| positive lens unit | third lens unit G3 | third lens unit G3 |
| image-side negative lens unit | fourth lens unit G4 | fourth lens unit G4 |
| image-side positive lens unit | fifth lens unit G5 | fifth lens unit G5 |

TABLE 1D

|  | Example 7 | Example 8 |
|---|---|---|
| predetermined positive lens unit | first lens unit G1 | none |
| object-side negative lens unit | second lens unit G2 | first lens unit G1 |
| intermediate lens unit | none | second lens unit G2 third lens unit G3 |

TABLE 1D-continued

|  | Example 7 | Example 8 |
| --- | --- | --- |
| positive lens unit | third lens unit G3 | fourth lens unit G4 |
| image-side negative lens unit | fourth lens unit G4 | none |
| image-side positive lens unit | fifth lens unit G5 | fifth lens unit G5 |

The zoom optical system according to Example 1 includes, in order from the object side, a first lens unit G1 having a negative refractive power, a second lens unit G2 having a positive refractive power, a third lens unit G3 having a positive refractive power, and a fourth lens unit G4 having a positive refractive power. The aperture stop S is disposed between the second lens unit G2 and the third lens unit G3.

The first lens unit G1 includes a negative meniscus lens L1 having a convex surface facing the object side, a negative meniscus lens L2 having a convex surface facing the object side, a negative meniscus lens L3 having a convex surface facing the object side, a biconcave negative lens L4, and a positive meniscus lens L5 having a convex surface facing the object side.

The second lens unit G2 includes a negative meniscus lens L6 having a convex surface facing the object side, and a biconvex positive lens L7. Herein, the negative meniscus lens L6 and the biconvex positive lens L7 are cemented.

The third lens unit G3 includes a positive meniscus lens L8 having a convex surface facing the image side, a biconcave negative lens L9, a biconvex positive lens L10, a biconcave negative lens L11, a biconvex positive lens L12, a negative meniscus lens L13 having a convex surface facing the object side, and a biconvex negative lens L14. Herein, the negative meniscus lens L13 and the biconvex positive lens L14 are cemented.

The fourth lens unit G4 includes of a biconvex positive lens L15, a biconcave negative lens L16, a biconvex positive lens L17, and a negative meniscus lens L18 having a convex surface facing the object side. Herein, the biconcave negative lens L16 and the biconvex positive lens L17 are cemented.

The first sub-lens unit includes the biconvex positive lens L15. The second sub-lens unit includes the biconcave negative lens L16, the biconvex positive lens L17, and the negative meniscus lens L18.

At a time of zooming, the first lens unit G1 is moved to the image side, and thereafter moved to the object side, the second lens unit G2 is moved to the object side, the third lens unit G3 is moved to the object side, and the fourth lens unit G4 is fixed. The aperture stop S is moved to the object side.

At a time of focusing, the second lens unit G2 is moved along the optical axis, and, at a time of image stabilization, the biconvex positive lens L15 is moved in a direction perpendicular to the optical axis.

An aspherical surface is provided on each of six surfaces in total, that is, both side surfaces of the negative meniscus lens L2, both side surfaces of the biconvex positive lens L12, the object-side surface of the biconvex positive lens L15, and the image-side surface of the negative meniscus lens L18.

The zoom optical system according to Example 2 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Herein, the negative meniscus lens L12 and the biconvex positive lens L13 are cemented.

The first sub-lens unit includes the biconvex positive lens L11. The second sub-lens unit includes the negative meniscus lens L12 and the biconvex positive lens L13.

At a time of zooming, the first lens unit G1 is moved to the image side, and thereafter moved to the object side, the second lens unit G2 is moved to the object side, the third lens unit G3 is moved to the object side, and the fourth lens unit G4 and the fifth lens unit G5 are fixed. The aperture stop S is fixed.

At a time of focusing, the fourth lens unit G4 is moved along the optical axis, and, at a time of image stabilization, the biconvex positive lens L11 is moved in a direction perpendicular to the optical axis.

An aspherical surface is provided on each of eight surfaces in total, that is, both side surfaces of the biconcave negative lens L5, both side surfaces of the biconvex positive lens L7, both side surfaces of the biconcave negative lens L10, and both side surfaces of the biconvex positive lens L11.

The zoom optical system according to Example 3 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11, a negative meniscus lens L12 having a convex surface facing the image side, a negative meniscus lens L13 having a convex surface facing the object side, and a biconvex positive lens L14. Herein, the biconvex positive lens L11 and the negative meniscus lens L12 are cemented. The negative meniscus lens L13 and the biconvex positive lens L14 are cemented.

The first sub-lens unit includes the biconvex positive lens L11 and the negative meniscus lens L12. The second sub-lens unit includes the negative meniscus lens L13 and the biconvex positive lens L14.

At a time of zooming, the first lens unit G1 is fixed, the second lens unit G2 is moved to the image side, the third lens unit G3 is moved to the object side, the fourth lens unit G4 is moved to the object side, and thereafter moved to the image side, and the fifth lens unit G5 is fixed. The aperture stop S is fixed.

At a time of focusing, the fourth lens unit G4 is moved along the optical axis, and, at a time of image stabilization, the biconvex positive lens L11 and the negative meniscus lens L12 are moved in a direction perpendicular to the optical axis.

An aspherical surface is provided on each of seven surfaces in total, that is, both side surfaces of the biconcave negative lens L5, both side surfaces of the biconvex positive lens L7, both side surfaces of the biconcave negative lens L10, and the object-side surface of the biconvex positive lens L11.

The zoom optical system according to Example 4 includes, in order from the object side, a first lens unit G1 having a positive refractive power, a second lens unit G2 having a negative refractive power, a third lens unit G3 having a negative refractive power, a fourth lens unit G4 having a positive refractive power, a fifth lens unit G5 having a negative refractive power, and a sixth lens unit G6 having a positive refractive power. The aperture stop S is disposed between the third lens unit G3 and the fourth lens unit G4.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a negative meniscus lens L5 having a convex surface facing the object side, and a biconvex positive lens L6.

The third lens unit G3 includes a negative meniscus lens L7 having a convex surface facing the image side.

The fourth lens unit G4 includes a biconvex positive lens L8, a negative meniscus lens L9 having a convex surface facing the object side, and a biconvex positive lens L10. Herein, the negative meniscus lens L9 and the biconvex positive lens L10 are cemented.

The fifth lens unit G5 includes a biconcave negative lens L11.

The sixth lens unit G6 includes a biconvex positive lens L12, a negative meniscus lens L13 having a convex surface facing the object side, and a biconvex positive lens L14. Herein, the negative meniscus lens L13 and the biconvex positive lens L14 are cemented.

The first sub-lens unit includes the biconvex positive lens L12. The second sub-lens unit includes the negative meniscus lens L13 and the biconvex positive lens L14.

At a time of zooming, the first lens unit G1 is fixed, the second lens unit G2 is moved to the image side, the third lens unit G3 is moved to the image side, the fourth lens unit G4 is moved to the object side, the fifth lens unit G5 is moved to the object side, and thereafter moved to the image side, and the sixth lens unit G6 is fixed. The aperture stop S is fixed.

At a time of focusing, the third lens unit G3 is moved along the optical axis, and, at a time of image stabilization, the biconvex positive lens L12 is moved in a direction perpendicular to the optical axis.

An aspherical surface is provided on each of eight surfaces in total, that is, both side surfaces of the negative meniscus lens L5, both side surfaces of the biconvex positive lens L8, both side surfaces of the biconcave negative lens L11, and both side surfaces of the biconvex positive lens L12.

The zoom optical system according to Example 5 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Herein, the negative meniscus lens L12 and the biconvex positive lens L13 are cemented.

The first sub-lens unit includes the biconvex positive lens L11. The second sub-lens unit includes the negative meniscus lens L12 and the biconvex positive lens L13.

At a time of zooming, the first lens unit G1 is fixed, the second lens unit G2 is moved to the image side, the third lens unit G3 is moved to the object side, the fourth lens unit G4 is moved to the object side, and thereafter moved to the image side, and the fifth lens unit G5 is fixed. The aperture stop S is fixed.

At a time of focusing, the fourth lens unit G4 is moved along the optical axis, and, at a time of image stabilization, the biconvex positive lens L11 is moved in a direction perpendicular to the optical axis.

An aspherical surface is provided on each of eight surfaces in total, that is, both side surfaces of the biconcave negative lens L5, both side surfaces of the biconvex positive lens L7, both side surfaces of the biconcave negative lens L10, and both side surfaces of the biconvex positive lens L11.

The zoom optical system according to Example 6 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a positive meniscus lens L7 having a convex surface facing the object side, a negative meniscus lens L8 having a convex surface facing the object side, and a biconvex positive lens L9. The negative meniscus lens L8 and the biconvex positive lens L9 are cemented.

The fourth lens unit G4 includes a biconcave negative lens L10.

The fifth lens unit G5 includes a biconvex positive lens L11, a negative meniscus lens L12 having a convex surface facing the object side, and a biconvex positive lens L13. Herein, the negative meniscus lens L12 and the biconvex positive lens L13 are cemented.

The first sub-lens unit includes the biconvex positive lens L11. The second sub-lens unit includes the negative meniscus lens L12 and the biconvex positive lens L13.

At a time of zooming, the first lens unit G1 is fixed, the second lens unit G2 is moved to the image side, the third lens unit G3 is moved to the object side, the fourth lens unit G4 is moved to the object side, and thereafter moved to the image side, and the fifth lens unit G5 is fixed. The aperture stop S is fixed.

At a time of focusing, the fourth lens unit G4 is moved along the optical axis, and, at a time of image stabilization, the biconvex positive lens L11 is moved in a direction perpendicular to the optical axis.

An aspherical surface is provided on each of eight surfaces in total, that is, both side surfaces of the biconcave negative lens L5, both side surfaces of the positive meniscus lens L7, both side surfaces of the biconcave negative lens L10, and both side surfaces of the biconvex positive lens L11.

The zoom optical system according to Example 7 includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The aperture stop S is disposed between the second lens unit G2 and the third lens unit G3.

The first lens unit G1 includes a negative meniscus lens L1 having a convex surface facing the object side, a biconvex positive lens L2, a positive meniscus lens L3 having a convex surface facing the object side, and a positive meniscus lens L4 having a convex surface facing the object side. Herein, the negative meniscus lens L1 and the biconvex positive lens L2 are cemented.

The second lens unit G2 includes a negative meniscus lens L5 having a convex surface facing the object side, a biconcave negative lens L6, and a biconvex positive lens L7.

The third lens unit G3 includes a biconvex positive lens L8, a negative meniscus lens L9 having a convex surface facing the object side, and a biconvex positive lens L10. Herein, the negative meniscus lens L9 and the biconvex positive lens L10 are cemented.

The fourth lens unit G4 includes a biconcave negative lens L11.

The fifth lens unit G5 includes a biconvex positive lens L12, a biconcave negative lens L13, and a biconvex positive lens L14. Herein, the biconcave negative lens L13 and the biconvex positive lens L14 are cemented.

The first sub-lens unit includes the biconvex positive lens L12. The second sub-lens unit includes the biconcave negative lens L13 and the biconvex positive lens L14.

At a time of zooming, the first lens unit G1 is fixed, the second lens unit G2 is moved to the image side, the third lens unit G3 is fixed, the fourth lens unit G4 is moved to the image side, and thereafter moved to the object side, and the fifth lens unit G5 is fixed. The aperture stop S is fixed.

At a time of focusing, the fourth lens unit G4 is moved along the optical axis, and, at a time of image stabilization, the biconvex positive lens L12 is moved in a direction perpendicular to the optical axis.

An aspherical surface is provided on each of eight surfaces in total, that is, both side surfaces of the negative meniscus lens L5, both side surfaces of the biconvex positive lens L8, both side surfaces of the biconcave negative lens L11, and both side surfaces of the biconvex positive lens L12.

The zoom optical system according to Example 8 includes, in order from the object side, a first lens unit G1 having a negative refractive power, a second lens unit G2 having a positive refractive power, a third lens unit G3 having a negative refractive power, a fourth lens unit G4 having a positive refractive power, and a fifth lens unit G5 having a positive refractive power. The aperture stop S is disposed between the second lens unit G2 and the third lens unit G3.

The first lens unit G1 includes a negative meniscus lens L1 having a convex surface facing the object side, a negative meniscus lens L2 having a convex surface facing the object side, a negative meniscus lens L3 having a convex surface facing the object side, a biconcave negative lens L4, and a positive meniscus lens L5 having a convex surface facing the object side.

The second lens unit G2 includes a negative meniscus lens L6 having a convex surface facing the object side, and a biconvex positive lens L7. Herein, the negative meniscus lens L6 and the biconvex positive lens L7 are cemented.

The third lens unit G3 includes a biconvex positive lens L8, a biconcave negative lens L9, a biconvex positive lens L10, and a biconcave negative lens L11.

The fourth lens unit G4 includes a positive meniscus lens L12 having a convex surface facing the object side, a negative meniscus lens L13 having a convex surface facing the object side, and a biconvex positive lens L14. Herein, the negative meniscus lens L13 and the biconvex positive lens L14 are cemented.

The fifth lens unit G5 includes a biconvex positive lens L15, a biconcave negative lens L16, a biconvex positive lens L17, and a biconcave negative lens L18. Herein, the biconcave negative lens L16 and the biconvex positive lens L17 are cemented.

The first sub-lens unit includes the biconvex positive lens L15. The second sub-lens unit includes the biconcave negative lens L16, the biconvex positive lens L17, and the biconcave negative lens L18.

At a time of zooming, the first lens unit G1 is moved to the image side, and thereafter moved to the object side, the second lens unit G2 is moved to the object side, the third lens unit G3 is moved to the object side, the fourth lens unit G4 is moved to the object side, and the fifth lens unit G5 is fixed. The aperture stop S is moved to the object side.

At a time of focusing, the second lens unit G2 is moved along the optical axis, and, at a time of image stabilization, the biconvex positive lens L15 is moved in a direction perpendicular to the optical axis.

An aspherical surface is provided on each of six surfaces in total, that is, both side surfaces of the negative meniscus lens L2, both side surfaces of the positive meniscus lens L12, the object-side surface of the biconvex positive lens L15, and the image-side surface of the biconcave negative lens L18.

Table 2A, Table 2B, Table 2C and Table 2D illustrate a result of classification of the lens units based on two criteria. The lens unit can be classified, based on whether the space from the adjacent lens is changed. The space from the adjacent lens is changed at a time of zooming and at a time of focusing. Classification of the lens units differs between the case where the lens units are classified based on change in space at a time of zooming and the case where the lens units are classified based on change in space at a time of focusing.

For example, in Example 2, the following is classification in the case where the lens units are classified based on change in space at a time of zooming.

First lens unit: L1, L2, and L3
Second lens unit: L4, L5, and L6
Third lens unit: L7, L8, and L9
Fourth lens unit: L10, L11, L12, and L13

The following is classification in the case where the lens units are classified based on change in space at a time of focusing.

First lens unit: L1, L2, L3, L4, L5, L6, L7, L8, and L9
Second lens unit: L10
Third lens unit: L11, L12, and L13

As described above, the number of lens units and the number of lenses included in one lens unit differ between the case where the lens units are classified based on change in space at a time of zooming, and the case where the lens units are classified based on change in space at a time of focusing.

When a group of lenses formed of the smallest number of lenses is regarded as one lens unit, the following is the lens units in the case where the lens units are classified based on change in space at a time of zooming and change in space at a time of focusing.

First lens unit: L1, L2, and L3
Second lens unit: L4, L5, and L6
Third lens unit: L7, L8, and L9
Fourth lens unit: L10
Fifth lens unit: L11, L12, and L13

Table 2A to Table 2D illustrate the case where the lens units are classified based on change in space only at a time of zooming as "Classification 1", and the case where the lens units are classified based on change in space at a time of zooming and change in space at a time of focusing as "Classification 2".

TABLE 2A

|  | Example 1 | Example 2 |
| --- | --- | --- |
| Classification 1 | four lens units | four lens units |
| Classification 2 | four lens units | five lens units |

TABLE 2B

|  | Example 3 | Example 4 |
| --- | --- | --- |
| Classification 1 | five lens units | six lens units |
| Classification 2 | five lens units | six lens units |

TABLE 2C

|  | Example 5 | Example 6 |
| --- | --- | --- |
| Classification 1 | five lens units | five lens units |
| Classification 2 | five lens units | five lens units |

TABLE 2D

|  | Example 7 | Example 8 |
| --- | --- | --- |
| Classification 1 | five lens units | five lens units |
| Classification 2 | five lens units | five lens units |

Numerical data of each example described above is shown below. In Surface data, r denotes radius of curvature of each lens surface, d denotes a distance between respective lens surfaces, nd denotes a refractive index of each lens for a d-line, νd denotes an Abbe number for each lens and * denotes an aspheric surface.

Further, in Zoom data, f denotes a focal length of the zoom optical system, FNO. denotes an F number, ω denotes a half angle of view, IH denotes an image height, LTL denotes a lens total length of the optical system, and BF denotes a back focus. Further, back focus is a distance from a rearmost lens surface to a paraxial image surface. The lens total length is a distance from a frontmost lens surface to the rearmost lens surface plus back focus. WE denotes a wide angle end, ST denotes a intermediate focal length state, TE denotes a telephoto end.

Further, in Unit focal length, each of f1, f2 . . . is a focal length of each lens unit.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

Example 1

Unit mm

Surface data

| Surface no. | r | d | nd | vd |
|---|---|---|---|---|
| Object plane | ∞ | ∞ | | |
| 1 | 34.469 | 2.500 | 1.72916 | 54.68 |
| 2 | 22.000 | 6.582 | | |
| 3* | 14.379 | 2.800 | 1.49700 | 81.54 |
| 4* | 6.982 | 6.318 | | |
| 5 | 18.956 | 1.500 | 1.88300 | 40.76 |
| 6 | 12.192 | 9.033 | | |
| 7 | −57.928 | 1.150 | 1.49700 | 81.54 |
| 8 | 20.683 | 0.100 | | |
| 9 | 18.969 | 3.398 | 1.90366 | 31.32 |
| 10 | 47.795 | Variable | | |
| 11 | 49.077 | 0.700 | 1.90366 | 31.32 |
| 12 | 15.623 | 3.721 | 1.76200 | 40.10 |
| 13 | −50.213 | Variable | | |
| 14(Stop) | ∞ | 3.033 | | |
| 15 | −268.899 | 3.776 | 1.49700 | 81.54 |
| 16 | −17.125 | 0.100 | | |
| 17 | −17.544 | 0.700 | 1.90366 | 31.32 |
| 18 | 121.455 | 0.260 | | |
| 19 | 26.173 | 3.386 | 1.80810 | 22.76 |
| 20 | −40.802 | 0.306 | | |
| 21 | −34.402 | 0.700 | 1.88300 | 40.76 |
| 22 | 40.587 | 0.500 | | |
| 23* | 19.315 | 2.754 | 1.49700 | 81.54 |
| 24* | −106.534 | 0.100 | | |
| 25 | 34.261 | 0.700 | 1.88300 | 40.76 |
| 26 | 12.578 | 5.939 | 1.49700 | 81.54 |
| 27 | −18.203 | Variable | | |
| 28* | 33.750 | 4.000 | 1.49700 | 81.54 |
| 29 | −38.814 | 1.500 | | |
| 30 | −50.000 | 0.700 | 1.69680 | 55.53 |
| 31 | 29.032 | 7.000 | 1.49700 | 81.54 |
| 32 | −18.880 | 0.100 | | |
| 33 | 37.523 | 1.200 | 1.69350 | 53.18 |
| 34* | 15.442 | | | |
| Image plane | ∞ | | | |

Aspherical surface data

3rd surface k = −5.1452
A4 = −1.9119e−005, A6 = 1.7142e−007, A8 = −5.4830e−010,
A10 = 9.1544e−013, A12 = −6.5441e−016, A14 = 0.0000e+000

4th surface k = −1.5491
A4 = 1.7766e−005, A6 = 6.3967e−007, A8 = −4.2627e−009,
A10 = 1.7518e−011, A12 = −4.1823e−014, A14 = 0.0000e+000

23th surface k = 0.0000
A4 = 4.1558e−005, A6 = 1.7862e−007, A8 = −2.8046e−009,
A10 = 7.1475e−011, A12 = 0.0000e+000, A14 = 0.0000e+000

24th surface k = 0.0000
A4 = 8.5865e−005, A6 = 3.8320e−007, A8 = −6.5118e−009,
A10 = 9.7933e−011, A12 = 0.0000e+000, A14 = 0.0000e+000

28th surface k = 0.0000
A4 = −4.2991e−005, A6 = −1.9973e−007, A8 = 7.5589e−010,
A10 = −2.0666e−012, A12−0.0000e+000, A14 = 0.0000e+000

34th surface k = 0.0000
A4 = 1.5891e−005, A6 = −1.9482e−007, A8 = 5.3162e−011,
A10 = −1.1083e−012, A12 = −3.1247e−014, A14 = 0.0000e+000

Unit mm

Zoom data

| | WE | ST | TE |
|---|---|---|---|
| f | 7.300 | 9.900 | 14.031 |
| FNO. | 1.967 | 2.382 | 2.986 |
| 2ω | 127.4 | 105.0 | 80.8 |
| IH | 11.85 | 11.85 | 11.85 |
| LTL | 113.582 | 112.346 | 117.513 |
| BF | 15.430 | 15.430 | 15.430 |
| d10 | 15.370 | 7.338 | 1.240 |
| d13 | 7.724 | 5.520 | 3.352 |
| d27 | 0.500 | 9.500 | 22.934 |

Unit focal length f1 = −11.5429 f2 = 41.3593 f3 = 37.8827
f4 = 106.32

Example 2

Unit mm

Surface data

| Surface no. | r | d | nd | vd |
|---|---|---|---|---|
| Object plane | ∞ | ∞ | | |
| 1 | 96.913 | 1.600 | 1.92119 | 23.96 |
| 2 | 35.025 | 6.931 | 1.51633 | 64.14 |
| 3 | 275.273 | 0.250 | | |
| 4 | 42.405 | 4.600 | 1.91082 | 35.25 |
| 5 | 264.575 | Variable | | |
| 6 | 264.575 | 0.950 | 1.78800 | 47.37 |
| 7 | 10.900 | 5.812 | | |
| 8* | −120.313 | 0.800 | 1.85135 | 40.10 |
| 9* | 15.518 | 5.151 | | |
| 10 | 45.483 | 2.700 | 1.92286 | 20.88 |
| 11 | −120.498 | Variable | | |
| 12(Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | 3.300 | | |
| 20* | 13.004 | 3.800 | 1.58313 | 59.38 |
| 21* | −850.000 | 3.800 | | |
| 22 | 18.320 | 0.600 | 2.00100 | 29.13 |
| 23 | 8.400 | 5.727 | 1.61800 | 63.40 |
| 24 | −31.484 | | | |
| Image plane | ∞ | | | |

Aspherical surface data

8th surface k = 0.0000
A4 = 1.5897e−004, A6 = −4.6243e−006, A8 = 6.0294e−008,
A10 = −4.3744e−010, A12 = 1.4215e−012, A14 = 0.0000e+000

9th surface k = 0.0000
A4 = 5.4622e−005, A6 = −4.8681e−006, A8 = 6.2006e−008,
A10 = −4.3749e−010, A12 = 1.3677e−012, A14 = 0.0000e+000

13th surface k = 0.0000
A4 = −8.0152e−007, A6 = −3.4395e−007, A8 = 9.0517e−009,
A10 = −1.4953e−010, A12 = 9.3464e−013, A14 = 0.0000e+000

-continued

Unit mm

14th surface k = 0.0000
A4 = 2.4705e−005, A6 = −4.0759e−007, A8 = 1.0962e−008,
A10 = −2.0152e−010, A12 = 1.4434e−012, A14 = 0.0000e+000
18th surface k = 0.0000
A4 = 1.5541e−004, A6 = −6.7393e−006, A8 = 2.3846e−007,
A10 = −5.0744e−009, A12 = 5.5675e−011, A14 = 0.0000e+000
19th surface k = 0.0000
A4 = 1.4156e−004, A6 = −9.5105e−006, A8 = 3.6964e−007,
A10 = −8.9290e−009, A12 = 1.0492e−010, A14 = 0.0000e+000
20th surface k = 0.0000
A4 = 2.1326e−005, A6 = −1.5883e−006, A8 = 2.2701e−008,
A10 = −3.9311e−010, A12 = 1.3883e−012, A14 = 0.0000e+000
21th surface k = 0.0000
A4 = 8.9785e−005, A6 = −2.2240e−006, A8 = 4.2912e−008,
A10 = −8.1741e−010, A12 = 4.8550e−012, A14 = 0.0000e+000

Zoom data

|   | WE | ST | TE |
|---|---|---|---|
| f | 3.920 | 12.513 | 53.868 |
| FNO. | 1.731 | 2.334 | 3.694 |
| 2ω | 88.0 | 30.9 | 7.4 |
| IH | 3.86 | 3.86 | 3.86 |
| LTL | 135.267 | 121.686 | 131.638 |
| BF | 5.868 | 5.868 | 5.868 |
| d5 | 0.700 | 19.944 | 37.993 |
| d11 | 42.422 | 9.597 | 1.500 |
| d12 | 21.682 | 15.217 | 1.201 |
| d17 | 1.809 | 8.274 | 22.290 |

Unit focal length f1 = 69.5426  f2 = −10.6613  f3 = 21.0955
f4 = −16.7221  f5 = 15.85838

Example 3

Unit mm

Surface data

| Surface no. | r | d | nd | vd |
|---|---|---|---|---|
| Object plane | ∞ | ∞ | | |
| 1 | 96.913 | 1.600 | 1.92119 | 23.96 |
| 2 | 35.025 | 6.931 | 1.51633 | 64.14 |
| 3 | 275.273 | 0.250 | | |
| 4 | 42.405 | 4.600 | 1.91082 | 35.25 |
| 5 | 264.575 | Variable | | |
| 6 | 264.575 | 0.950 | 1.78800 | 47.37 |
| 7 | 10.900 | 5.812 | | |
| 8* | −120.313 | 0.800 | 1.85135 | 40.10 |
| 9* | 15.518 | 5.151 | | |
| 10 | 45.483 | 2.700 | 1.92286 | 20.88 |
| 11 | −120.498 | Variable | | |
| 12(Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | Variable | | |
| 20* | 13.004 | 3.800 | 1.58313 | 59.38 |
| 21 | −25.125 | 0.500 | 1.60562 | 43.70 |
| 22 | −850.000 | 3.500 | | |
| 23 | 18.320 | 0.600 | 2.00100 | 29.13 |
| 24 | 8.400 | 5.727 | 1.63854 | 55.38 |
| 25 | −31.484 | 1.986 | | |
| 26 | ∞ | 0.500 | 1.51633 | 64.14 |
| 27 | ∞ | | | |
| Image plane | ∞ | | | |

Aspherical surface data

8th surface k = 0.0000
A4 = 1.5897e−004, A6 = −4.6243e−006, A8 = 6.0294e−008,
A10 = −4.3744e−010, A12 = 1.4215e−012, A14 = 0.0000e+000
9th surface k = 0.0000
A4 = 5.4622e−005, A6 = −4.8681e−006, A8 = 6.2006e−008,
A10 = −4.3749e−010, A12 = 1.3677e−012, A14 = 0.0000e+000
13th surface k = 0.0000
A4 = −8.0152e−007, A6 = −3.4395e−007, A8 = 9.0517e−009,
A10 = −1.4953e−010, A12 = 9.3464e−013, A14 = 0.0000e+000
14th surface k = 0.0000
A4 = 2.4705e−005, A6 = −4.0759e−007, A8 = 1.0962e−008,
A10 = −2.0152e−010, A12 = 1.4434e−012, A14 = 0.0000e+000
18th surface k = 0.0000
A4 = 1.5541e−004, A6 = −6.7393e−006, A8 = 2.3846e−007,
A10 = −5.0744e−009, A12 = 5.5675e−011, A14 = 0.0000e+000
19th surface k = 0.0000
A4 = 1.4156e−004, A6 = −9.5105e−006, A8 = 3.6964e−007,
A10 = −8.9290e−009, A12 = 1.0492e−010, A14 = 0.0000e+000
20th surface k = 0.0000
A4 = −4.0000e−005, A6 = −8.0000e−007, A8 = 2.4500e−008,
A10 = −4.0300e−010, A12 = 1.6334e−012, A14 = 9.5550e−015

Zoom data

|   | WE | ST | TE |
|---|---|---|---|
| f | 3.858 | 13.681 | 54.586 |
| FNO. | 1.616 | 2.718 | 3.743 |
| 2ω | 93.6 | 31.6 | 8.1 |
| IH | 3.90 | 3.90 | 3.90 |
| LTL | 135.4113 | 135.4113 | 135.4113 |
| BF | 3.500 | 3.500 | 3.500 |
| d5 | 0.701 | 19.946 | 37.993 |
| d11 | 38.792 | 19.547 | 1.500 |
| d12 | 25.310 | 5.263 | 1.201 |
| d17 | 1.806 | 8.048 | 22.220 |
| d19 | 3.300 | 17.105 | 6.995 |

Unit focal length f1 = 69.5426  f2 = −10.6613  f3 = 21.0955
f4 = −16.7221  f5 = 15.5369

Example 4

Unit mm

Surface data

| Surface no. | r | d | nd | vd |
|---|---|---|---|---|
| Object plane | ∞ | ∞ | | |
| 1 | 92.120 | 1.600 | 1.92119 | 23.96 |
| 2 | 32.500 | 6.800 | 1.51633 | 64.14 |
| 3 | 433.690 | 0.250 | | |
| 4 | 37.024 | 4.600 | 1.91082 | 35.25 |
| 5 | 159.340 | Variable | | |
| 6 | 800.000 | 0.950 | 1.78800 | 47.37 |
| 7 | 11.344 | 5.429 | | |
| 8* | 179.882 | 0.800 | 1.85135 | 40.10 |
| 9* | 15.233 | 5.797 | | |
| 10 | 42.969 | 2.700 | 1.92286 | 20.88 |
| 11 | −104.967 | Variable | | |
| 12 | −19.693 | 0.600 | 1.49700 | 81.54 |
| 13 | −50.402 | Variable | | |
| 14(Stop) | ∞ | Variable | | |
| 15* | 20.587 | 4.304 | 1.80610 | 40.88 |
| 16* | −65.944 | 4.329 | | |
| 17 | 35.216 | 0.650 | 1.85478 | 24.80 |
| 18 | 10.461 | 5.150 | 1.49700 | 81.54 |
| 19 | −39.681 | Variable | | |
| 20* | −21.773 | 0.700 | 1.58313 | 59.38 |
| 21* | 17.472 | Variable | | |
| 22* | 17.764 | 3.800 | 1.58313 | 59.38 |
| 23* | −50.000 | 3.800 | | |
| 24 | 16.092 | 0.600 | 2.00100 | 29.13 |
| 25 | 8.400 | 6.464 | 1.55332 | 71.68 |
| 26 | −24.899 | | | |
| Image plane | ∞ | | | |

Aspherical surface data

8th surface k = 0.0000
A4 = 1.9204e−004, A6 = −4.6001e−006, A8 = 5.9027e−008,
A10 = −4.6276e−010, A12 = 1.6492e−012, A14 = 0.0000e+000

9th surface k = 0.0000
A4 = 9.2635e−005, A6 = −5.0300e−006, A8 = 5.7997e−008,
A10 = −4.2610e−010, A12 = 1.4426e−012, A14 = 0.0000e+000

15th surface k = 0.0000
A4 = −3.3191e−006, A6 = −2.7346e−007, A8 = 9.1363e−009,
A10 = −1.5390e−010, A12 = 9.5150e−013, A14 = 0.0000e+000

16th surface k = 0.0000
A4 = 2.7388e−005, A6 = −3.7164e−007, A8 = 1.1596e−008,
A10 = −1.9852e−010, A12 = 1.2889e−012, A14 = 0.0000e+000

20th surface k = 0.0000
A4 = 1.4804e−004, A6 = −6.9716e−006, A8 = 2.5556e−007,
A10 = −5.1495e−009, A12 = 5.3645e−011, A14 = 0.0000e+000

21th surface k = 0.0000
A4 = 9.5164e−005, A6 = −9.0906e−006, A8 = 3.6881e−007,
A10 = −8.4439e−009, A12 = 9.3371e−011, A14 = 0.0000e+000

22th surface k = 0.0000
A4 = 4.7318e−005, A6 = −1.5859e−006, A8 = 2.8805e−008,
A10 = −4.3652e−010, A12 = 1.2135e−013, A14 = 0.0000e+000

23th surface k = 0.0000
A4 = 1.1433e−004, A6 = −2.1168e−006, A8 = 4.6215e−008,
A10 = −8.8917e−010, A12 = 3.9636e−012, A14 = 0.0000e+000

-continued

Unit mm

Zoom data

| | WE | ST | TE |
|---|---|---|---|
| f | 3.920 | 13.901 | 55.482 |
| FNO. | 1.632 | 2.500 | 3.750 |
| 2ω | 88.3 | 28.1 | 7.3 |
| IH | 3.60 | 3.60 | 3.60 |
| LTL | 137.265 | 137.265 | 137.265 |
| BF | 6.581 | 6.581 | 6.581 |
| d5 | 0.700 | 18.594 | 34.123 |
| d11 | 12.834 | 4.127 | 3.688 |
| d13 | 25.577 | 16.390 | 1.300 |
| d14 | 20.450 | 3.847 | 1.196 |
| d19 | 1.800 | 8.403 | 24.049 |
| d21 | 10.000 | 20.000 | 7.005 |

Unit focal length f1 = 63.7451 f2 = −13.8805 f3 = −65.4593
f4 = 19.7499 f5 = −16.5148 f6 = 15.8345

Example 5

Unit mm

Surface data

| Surface no. | r | d | nd | vd |
|---|---|---|---|---|
| Object plane | ∞ | ∞ | | |
| 1 | 96.913 | 1.600 | 1.92119 | 23.96 |
| 2 | 35.025 | 6.931 | 1.51633 | 64.14 |
| 3 | 275.273 | 0.250 | | |
| 4 | 42.405 | 4.600 | 1.91082 | 35.25 |
| 5 | 264.575 | Variable | | |
| 6 | 264.575 | 0.950 | 1.78800 | 47.37 |
| 7 | 10.900 | 5.812 | | |
| 8* | −120.313 | 0.800 | 1.85135 | 40.10 |
| 9* | 15.518 | 5.151 | | |
| 10 | 45.483 | 2.700 | 1.92286 | 20.88 |
| 11 | −120.498 | Variable | | |
| 12(Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | Variable | | |
| 20* | 13.004 | 3.800 | 1.58313 | 59.38 |
| 21* | −850.000 | 3.800 | | |
| 22 | 18.320 | 0.600 | 2.00100 | 29.13 |
| 23 | 8.400 | 5.727 | 1.61800 | 63.40 |
| 24 | −31.484 | 2.042 | | |
| 25 | ∞ | 0.500 | 1.51633 | 64.14 |
| 26 | ∞ | | | |
| Image plane | ∞ | | | |

Aspherical surface data

8th surface k = 0.0000
A4 = 1.5897e−004, A6 = −4.6243e−006, A8 = 6.0294e−008,
A10 = −4.3744e−010, A12 = 1.4215e−012, A14 = 0.0000e+000

9th surface k = 0.0000
A4 = 5.4622e−005, A6 = −4.8681e−006, A8 = 6.2006e−008,
A10 = −4.3749e−010, A12 = 1.3677e−012, A14 = 0.0000e+000

-continued

| Unit mm |
|---|
| 13th surface | k = 0.0000
A4 = −8.0152e−007, A6 = −3.4395e−007, A8 = 9.0517e−009,
A10 = −1.4953e−010, A12 = 9.3464e−013, A14 = 0.0000e+000
14th surface k = 0.0000
A4 = 2.4705e−005, A6 = −4.0759e−007, A8 = 1.0962e−008,
A10 = −2.0152e−010, A12 = 1.4434e−012, A14 = 0.0000e+000
18th surface k = 0.0000
A4 = 1.5541e−004, A6 = −6.7393e−006, A8 = 2.3846e−007,
A10 = −5.0744e−009, A12 = 5.5675e−011, A14 = 0.0000e+000
19th surface k = 0.0000
A4 = 1.4156e−004, A6 = −9.5105e−006, A8 = 3.6964e−007,
A10 = −8.9290e−009, A12 = 1.0492e−010, A14 = 0.0000e+0000
20th surface k = 0.0000
A4 = 2.1326e−005, A6 = −1.5883e−006, A8 = 2.2701e−008,
A10 = −3.9311e−010, A12 = 1.3883e−012, A14 = 0.0000e+000
21th surface k = 0.0000
A4 = 8.9785e−005, A6 = −2.2240e−006, A8 = 4.2912e−008,
A10 = −8.1741e−010, A12 = 4.8550e−012, A14 = 0.0000e+000

| Zoom data | | | |
|---|---|---|---|
| | WE | ST | TE |
| f | 3.920 | 13.900 | 55.458 |
| FNO. | 1.642 | 2.762 | 3.803 |
| 2ω | 93.9 | 31.9 | 8.1 |
| IH | 4.00 | 4.00 | 4.00 |
| LTL | 135.267 | 135.267 | 135.267 |
| BF | 3.500 | 3.500 | 3.500 |
| d5 | 0.701 | 19.946 | 37.993 |
| d11 | 38.792 | 19.547 | 1.500 |
| d12 | 25.310 | 5.263 | 1.201 |
| d17 | 1.806 | 8.048 | 22.220 |
| d19 | 3.300 | 17.105 | 6.995 |

| Unit focal length |
|---|
| f1 = 69.5426  f2 = −10.6613  f3 = 21.0955 |
| f4 = −16.7221  f5 = 15.8584 |

Example 6

| Unit mm | | | | |
|---|---|---|---|---|
| Surface data | | | | |
| Surface no. | r | d | nd | νd |
| Object plane | ∞ | ∞ | | |
| 1 | 172.259 | 1.400 | 1.80000 | 29.84 |
| 2 | 34.197 | 8.700 | 1.49700 | 81.54 |
| 3 | 1460.498 | 0.142 | | |
| 4 | 44.219 | 5.350 | 1.88300 | 40.76 |
| 5 | 512.943 | Variable | | |
| 6 | 2423.461 | 0.800 | 1.75500 | 52.32 |
| 7 | 10.943 | 6.466 | | |
| 8* | −60.609 | 0.800 | 1.85135 | 40.10 |
| 9* | 15.318 | 3.626 | | |
| 10 | 46.981 | 2.850 | 2.00069 | 25.46 |
| 11 | −60.777 | Variable | | |
| 12(Stop) | ∞ | Variable | | |
| 13* | 17.473 | 4.255 | 1.80610 | 40.88 |
| 14* | 5183.259 | 4.168 | | |
| 15 | 24.073 | 1.156 | 1.85478 | 24.80 |
| 16 | 9.050 | 5.689 | 1.49700 | 81.54 |
| 17 | −38.695 | Variable | | |
| 18* | −39.794 | 1.380 | 1.51633 | 64.14 |
| 19* | 10.215 | Variable | | |
| 20* | 10.888 | 5.000 | 1.59201 | 67.02 |
| 21* | −34.693 | 0.700 | | |
| 22 | 84.518 | 0.679 | 1.91082 | 35.25 |
| 23 | 8.600 | 5.937 | 1.59282 | 68.63 |
| 24 | −17.000 | 1.223 | | |
| 25 | ∞ | 0.300 | 1.51633 | 64.14 |
| 26 | ∞ | | | |
| Image plane | ∞ | | | |

| Aspherical surface data |
|---|
| 8th surface | k = 0.0000
A4 = 2.4982e−004, A6 = −6.3097e−006, A8 = 7.4826e−008,
A10 = −4.8887e−010, A12 = 1.3090e−012, A14 = 0.0000e+000
9th surface k = 0.0000
A4 = 1.1296e−004, A6 = −6.5158e−006, A8 = 7.8796e−008,
A10 = −5.1308e−010, A12 = 1.3875e−012, A14 = 0.0000e+000
13th surface k = 0.0000
A4 = −1.3869e−005, A6 = 3.6314e−008, A8 = −1.0447e−009,
A10 = 1.2984e−011, A12 = −1.9446e−013, A14 = 0.0000e+000
14th surface k = 0.0000
A4 = 1.5375e−005, A6 = −1.8471e−008, A8 = 7.7633e−010,
A10 = −1.9570e−011, A12 = −4.4054e−014, A14 = 0.0000e+000
18th surface k = 0.0000
A4 = 3.8084e−004, A6 = −1.1061e−005, A8 = 1.5509e−007,
A10 = −5.1645e−010, A12 = −8.3679e−012, A14 = 0.0000e+000
19th surface k = 0.0000
A4 = 3.7263e−004, A6 = −1.0803e−005, A8 = 4.6473e−008,
A10 = 2.7164e−009, A12 = −4.6246e−011, A14 = 0.0000e+000
20th surface k = 0.0000
A4 = −8.0337e−006, A6 = −9.6749e−007, A8 = −3.4950e−008,
A10 = 1.1473e−009, A12 = −1.6740e−011, A14 = 0.0000e+000
21th surface k = 0.0000
A4 = 2.2738e−004, A6 = −4.8854e−006, A8 = 8.1344e−008,
A10 = −1.0966e−009, A12 = 8.6599e−013, A14 = 0.0000e+000

| Zoom data | | | |
|---|---|---|---|
| | WE | ST | TE |
| f | 3.880 | 13.900 | 54.911 |
| FNO. | 1.535 | 2.448 | 3.615 |
| 2ω | 94.2 | 30.7 | 8.0 |
| IH | 3.90 | 3.90 | 3.90 |
| LTL | 133.266 | 133.266 | 133.266 |
| BF | 3.500 | 3.500 | 3.500 |
| d5 | 0.652 | 21.730 | 38.666 |
| d11 | 39.284 | 18.206 | 1.270 |
| d12 | 24.209 | 8.359 | 1.200 |
| d17 | 1.800 | 6.158 | 18.490 |
| d19 | 3.300 | 14.792 | 9.619 |

-continued

Unit mm

Unit focal length f1 = 70.5085  f2 = −11.245  f3 = 19.5499
f4 = −15.5968  f5 = 14.4976

Example 7

Unit mm

Surface data

| Surface no. | r | d | nd | vd |
|---|---|---|---|---|
| Object plane | ∞ | ∞ | | |
| 1 | 66.004 | 1.400 | 2.00330 | 28.27 |
| 2 | 38.845 | 6.600 | 1.43700 | 95.10 |
| 3 | 5121.326 | 0.150 | | |
| 4 | 45.472 | 3.850 | 1.49700 | 81.61 |
| 5 | 390.188 | 0.150 | | |
| 6 | 28.589 | 4.112 | 1.59282 | 68.63 |
| 7 | 86.592 | Variable | | |
| 8* | 250.431 | 0.700 | 1.88202 | 37.22 |
| 9* | 5.800 | 3.217 | | |
| 10 | −15.216 | 0.700 | 1.88300 | 40.76 |
| 11 | 25.038 | 0.158 | | |
| 12 | 15.612 | 2.000 | 1.95906 | 17.47 |
| 13 | −77.613 | Variable | | |
| 14(Stop) | ∞ | 1.600 | | |
| 15* | 14.305 | 6.618 | 1.49700 | 81.54 |
| 16* | −18.618 | 0.100 | | |
| 17 | 55.444 | 0.800 | 1.95906 | 17.47 |
| 18 | 26.621 | 5.500 | 1.59282 | 68.63 |
| 19 | −19.566 | Variable | | |
| 20* | −21.828 | 0.600 | 1.61881 | 63.85 |
| 21* | 11.866 | Variable | | |
| 22* | 13.609 | 2.600 | 1.69350 | 53.18 |
| 23* | −23.632 | 1.400 | | |
| 24 | −50.000 | 0.500 | 1.67270 | 32.10 |
| 25 | 5.832 | 4.000 | 1.61800 | 63.40 |
| 26 | −19.455 | | | |
| Image plane | ∞ | | | |

Aspherical surface data

8th surface k = 0.0000
A4 = 1.1657e−004, A6 = −4.7771e−006, A8 = 1.0266e−007,
A10 = −1.2292e−009, A12 = 6.8533e−012, A14 = 0.0000e+000

9th surface k = 0.0000
A4 = 2.8399e−005, A6 = −5.0316e−006, A8 = 7.6629e−008,
A10 = −5.6198e−009, A12 = 7.3385e−015, A14 = 0.0000e+000

15th surface k = 0.0000
A4 = −6.7271e−005, A6 = −5.6952e−008, A8 = 4.3217e−009,
A10 = 0.0000e+000, A12 = 0.0000e+000, A14 = 0.0000e+000

16th surface k = 0.0000
A4 = 1.5796e−004, A6 = −3.0143e−007, A8 = 9.1071e−009,
A10 = 0.0000e+000, A12 = 0.0000e+000, A14 = 0.0000e+000

20th surface k = 0.0000
A4 = 4.3078e−004, A6 = 8.3968e−008, A8 = 5.8477e−008,
A10 = −2.0285e−009, A12 = 1.1271e−011, A14 = −9.0058e−016

21th surface k = 0.0000
A4 = 2.5317e−004, A6 = 7.9304e−006, A8 = 1.0323e−007,
A10 = −7.7729e−011, A12 = 1.4809e−012, A14 = −9.2727e−014

-continued

Unit mm

22th surface k = 0.0000
A4 = −2.1886e−004, A6 = −2.7224e−006, A8 = −4.4772e−008,
A10 = 0.0000e+000, A12 = 0.0000e+000, A14 = 0.0000e+000

23th surface k = 0.0000
A4 = −5.7837e−005, A6 = −5.0381e−006, A8 = 1.2328e−008,
A10 = 0.0000e+000, A12 = 0.0000e+000, A14 = 0.0000e+000

Zoom data

| | WE | ST | TE |
|---|---|---|---|
| f | 4.400 | 24.502 | 110.303 |
| FNO. | 1.284 | 2.708 | 3.912 |
| 2ω | 74.1 | 14.5 | 3.2 |
| IH | 3.20 | 3.20 | 3.20 |
| LTL | 91.334 | 91.334 | 91.334 |
| BF | 2.794 | 2.794 | 2.794 |
| d7 | 0.600 | 20.511 | 28.740 |
| d13 | 28.361 | 8.450 | 0.221 |
| d19 | 3.500 | 9.017 | 2.821 |
| d21 | 9.324 | 3.807 | 10.003 |

Unit focal length f1 = 41.3141  f2 = −5.95179  f3 = 12.667
f4 = −12.3386  f5 = 12.4793

Example 8

Unit mm

Surface data

| Surface no. | r | d | nd | vd |
|---|---|---|---|---|
| Object plane | ∞ | ∞ | | |
| 1 | 32.958 | 2.500 | 1.72916 | 54.68 |
| 2 | 22.000 | 6.718 | | |
| 3* | 14.650 | 2.800 | 1.49700 | 81.54 |
| 4* | 6.982 | 6.128 | | |
| 5 | 18.885 | 1.500 | 1.88300 | 40.76 |
| 6 | 12.192 | 9.331 | | |
| 7 | −37.493 | 1.150 | 1.49700 | 81.54 |
| 8 | 23.368 | 0.100 | | |
| 9 | 20.920 | 3.295 | 1.90366 | 31.32 |
| 10 | 65.843 | Variable | | |
| 11 | 45.610 | 0.700 | 1.90366 | 31.32 |
| 12 | 14.567 | 3.710 | 1.76200 | 40.10 |
| 13 | −61.117 | Variable | | |
| 14(Stop) | ∞ | 3.233 | | |
| 15 | 558.614 | 2.201 | 1.49700 | 81.54 |
| 16 | −18.807 | 0.398 | | |
| 17 | −19.200 | 0.700 | 1.90366 | 31.32 |
| 18 | 676.224 | 0.422 | | |
| 19 | 31.028 | 4.500 | 1.80810 | 22.76 |
| 20 | −51.532 | 0.280 | | |
| 21 | −43.996 | 0.700 | 1.88300 | 40.76 |
| 22 | 43.492 | Variable | | |
| 23* | 17.431 | 3.576 | 1.49700 | 81.54 |
| 24* | 123.888 | 0.100 | | |
| 25 | 32.396 | 0.700 | 1.88300 | 40.76 |
| 26 | 12.894 | 5.405 | 1.49700 | 81.54 |
| 27 | −20.350 | Variable | | |
| 28* | 25.139 | 4.000 | 1.49700 | 81.54 |
| 29 | −60.137 | 1.500 | | |
| 30 | −55.825 | 0.700 | 1.73400 | 51.47 |
| 31 | 40.354 | 7.000 | 1.49700 | 81.54 |
| 32 | −17.122 | 0.100 | | |

-continued

Unit mm

| | | | | |
|---|---|---|---|---|
| 33 | −127.773 | 1.200 | 1.69350 | 53.18 |
| 34* | 29.469 | | | |
| Image plane | ∞ | | | |

Aspherical surface data

3rd surface k = −5.1578
A4 = −2.6367e−005, A6 = 1.9350e−007, A8 = −5.5344e−010,
A10 = 8.6354e−013, A12 = −5.9596e−016, A14 = 0.0000e+000

4th surface k = −1.4638
A4 = −6.3458e−006, A6 = 6.5895e−007, A8 = −4.0609e−009,
A10 = 1.8497e−011, A12 = −4.6613e−014, A14 = 0.0000e+000

23th surface k = 0.0000
A4 = 5.3550e−005, A6 = 2.5268e−007, A8 = −1.1773e−009,
A10 = 6.9280e−011, A12 = 0.0000e+000, A14 = 0.0000e+000

24th surface k = 0.0000
A4 = 9.7341e−005, A6 = 5.2429e−007, A8 = −6.3742e−009,
A10 = 1.3623e−010, A12 = 0.0000e+000, A14 = 0.0000e+000

28th surface k = 0.0000
A4 = −1.8653e−005, A6 = −1.7106e−007, A8 = −1.7490e−010,
A10 = −2.7884e−012, A12 = 0.0000e+000, A14 = 0.0000e+000

34th surface k = 0.0000
A4 = 4.9646e−005, A6 = 2.0461e−007, A8 = −4.7353e−009,
A10 = 6.4260e−011, A12 = −3.6929e−013, A14 = 0.0000e+000

Zoom data

| | WE | ST | TE |
|---|---|---|---|
| f | 7.299 | 9.899 | 14.026 |
| FNO. | 2.880 | 2.880 | 2.880 |
| 2ω | 119.9 | 98.8 | 75.6 |
| IH | 10.80 | 10.80 | 10.80 |
| LTL | 113.574 | 113.212 | 118.104 |
| BF | 14.367 | 14.367 | 14.367 |
| d10 | 14.271 | 7.305 | 1.246 |
| d13 | 9.057 | 6.973 | 3.474 |
| d22 | 0.733 | 0.171 | 0.739 |
| d27 | 0.500 | 9.750 | 23.631 |

Unit focal length f1 = −11.4848 f2 = 44.9051 f3 = −53.7943
f4 = 23.2175 f5 = 90.307

Next, the following is values of the conditional expressions in each of the examples. The values described in the following item (2) correspond to the value of Conditional Expression (2-1) and the value of Conditional Expression (2-2). The values described in the following item (2) correspond to the value of Conditional Expression (5-1) and the value of Conditional Expression (5-2). The values described in the following item (8) correspond to the value of Conditional Expression (8-1). The values described in the following item (17) correspond to the values of Conditional Expressions (17-1), (17-2), (17-3), and (17-4). The values described in the following item (23) correspond to the value of Conditional Expression (23-1). The values described in the following item (25) correspond to the value of Conditional Expression (25-1). The mark "hyphen (-)" means that the value cannot be calculated.

| | Example1 | Example2 | Example3 | Example4 |
|---|---|---|---|---|
| (1)fGBUN1/fGPM | 0.977 | 1.043 | 1.061 | 1.162 |
| (2)vdGPMP1 | 81.54 | 81.54 | 81.54 | 81.54 |
| (3)DGBUN12a/fGBUN1 | 0.041 | 0.173 | 0.156 | 0.166 |
| (4)|(MGGBUN1back) × (MGGBUN1 − 1)| | 0.696 | 0.646 | 0.625 | 0.640 |
| (5)SFGBUN1 | −0.070 | −0.970 | −0.970 | −0.476 |
| (6)fGPM/fw | 5.190 | 5.382 | 5.468 | 5.038 |
| (7)fGBUN1/fw | 5.069 | 5.612 | 5.803 | 5.855 |
| (8)|LTLmax/fGN1| | 10.181 | 12.688 | 12.701 | 9.889 |
| (9)|fGN1/fGPM| | 0.305 | 0.505 | 0.505 | 0.703 |
| (10)|fGN1/fw| | 1.581 | 2.720 | 2.763 | 3.541 |
| (11)fGB/fw | 14.565 | 4.046 | 4.027 | 4.039 |
| (12)fGBUN1/IHw35 | 7.239 | 8.015 | 8.287 | 8.362 |
| (13)|fGN1/IHw35| | 2.258 | 3.884 | 3.946 | 5.057 |
| (14)DGBUN12a/fw | 0.205 | 0.969 | 0.907 | 0.969 |
| (15)vdGBUN1P | 81.54 | 59.38 | 59.38 | 59.38 |
| (16)vdGBUN2N | 53.18 | 29.13 | 29.13 | 29.13 |
| (17)ΩHw/2 | 56.256 | 40.118 | 42.887 | 39.998 |
| (18)fGP1/fGPM | — | 3.297 | 3.297 | 3.228 |
| (19)|fGPM/fGNB| | — | 1.262 | 1.262 | 1.196 |
| (20)fGN1/fGNB | — | 0.638 | 0.638 | 0.840 |
| (21)ΔGPMM/LTLw | 0.198 | 0.151 | 0.178 | 0.140 |
| (22)ft/fw | 1.922 | 13.742 | 14.148 | 14.153 |
| (23)FNOw | 2.986 | 1.731 | 1.616 | 1.632 |
| (24)FNOt | 1.967 | 3.694 | 3.743 | 3.750 |
| (25)ft/fw + 13.38 × tan(ΩHw/2) − 21.0 | 0.95 | 4.02 | 5.58 | 4.38 |
| (26)ΣGP1/LTLw | — | 0.099 | 0.099 | 0.097 |
| (27)fw × FNOw/fGN1 | −1.244 | −0.636 | −0.585 | −0.461 |
| (28)SPGN1Ln1 | 4.529 | — | — | — |
| (29)DTw | −16.2307 | −5.77414 | −5.12255 | −5.37673 |
| (30)Rimg | 11.85 | 3.57 | 3.9 | 3.6 |

| | Example5 | Example6 | Example7 | Example8 |
|---|---|---|---|---|
| (1)fGBUN1/fGPM | 1.043 | 0.746 | 1.01 | 1.561 |
| (2)vdGPMP1 | 81.54 | 81.54 | 81.54 | 81.54 |
| (3)DGBUN12a/fGBUN1 | 0.173 | 0.048 | 0.109 | 0.041 |
| (4)|(MGGBUN1back) × (MGGBUN1 − 1)| | 0.646 | 0.802 | 0.609 | 0.692 |
| (5)SFGBUN1 | −0.970 | −0.522 | −0.269 | −0.410 |
| (6)fGPM/fw | 5.382 | 5.039 | 2.879 | 3.181 |
| (7)fGBUN1/fw | 5.613 | 3.761 | 2.913 | 4.964 |
| (8)|LTLmax/fGN1| | 12.688 | 11.860 | 15.346 | 10.284 |
| (9)|fGN1/fGPM| | 0.505 | 0.575 | 0.470 | 0.495 |
| (10)|fGN1/fw| | 2.720 | 2.898 | 1.353 | 1.573 |
| (11)fGB/fw | 4.046 | 3.736 | 2.836 | 12.372 |
| (12)fGBUN1/IHw35 | 8.016 | 5.372 | 4.161 | 7.090 |
| (13)|fGN1/IHw35| | 3.884 | 4.139 | 1.932 | 2.247 |
| (14)DGBUN12a/fw | 0.969 | 0.180 | 0.318 | 0.206 |
| (15)vdGBUN1P | 59.38 | 67.02 | 53.18 | 81.54 |
| (16)vdGBUN2N | 29.13 | 35.25 | 32.1 | 51.47 |
| (17)ΩHw/2 | 43.045 | 43.180 | 33.343 | 55.680 |
| (18)fGP1/fGPM | 3.297 | 3.607 | 3.262 | — |
| (19)|fGPM/fGNB| | 1.262 | 1.253 | 1.027 | — |
| (20)fGN1/fGNB | 0.638 | 0.721 | 0.482 | — |
| (21)ΔGPMM/LTLw | 0.178 | 0.173 | — | 0.204 |
| (22)ft/fw | 14.148 | 14.152 | 25.068 | 1.922 |
| (23)FNOw | 1.642 | 1.535 | 1.284 | 2.880 |
| (24)FNOt | 3.803 | 3.615 | 3.912 | 2.880 |
| (25)ft/fw + 13.38 × tan(ΩHw/2) − 21.0 | 5.64 | 5.71 | 12.87 | 0.52 |
| (26)ΣGP1/LTLw | 0.099 | 0.117 | 0.178 | — |
| (27)fw × FNOw/fGN1 | −0.604 | −0.530 | −0.949 | −1.830 |
| (28)SPGN1Ln1 | — | — | — | 5.015 |
| (29)DTw | −4.74879 | −6.62018 | −3.63712 | −14.3949 |
| (30)Rimg | 4 | 3.9 | 3.2 | 10.8 |

Figure 17:
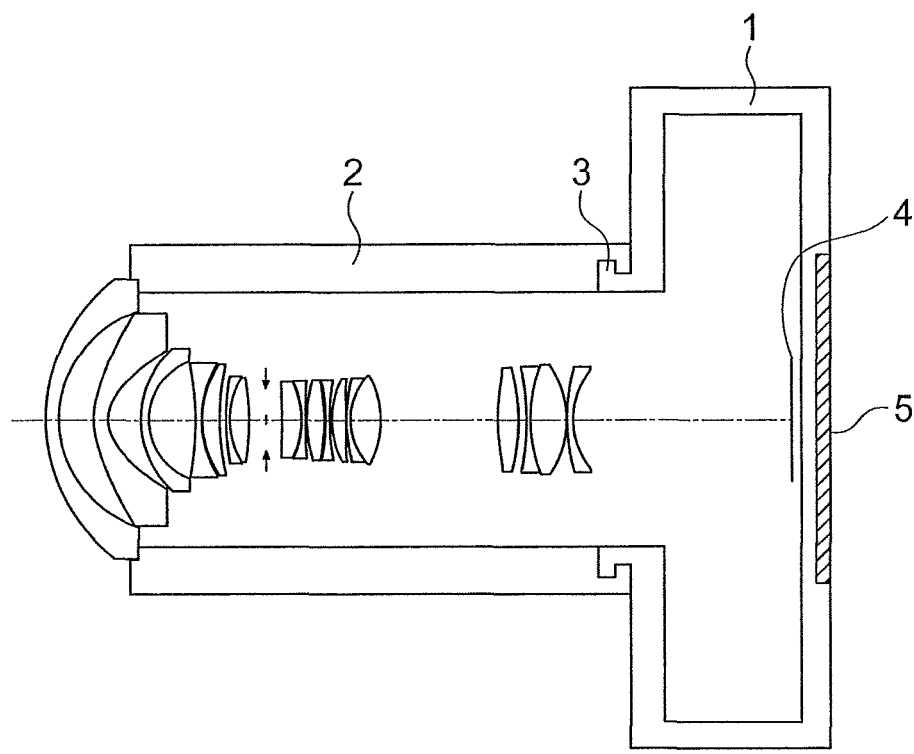
FIG. 17 is a cross-sectional view of an image pickup apparatus.

FIG. 17 is a cross-sectional view of a single-lens mirrorless camera as an electronic image pickup apparatus. In FIG. 17, a photographic optical system 2 cab be disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount can be used. In this example, a bayonet-type mount is used. Moreover, an image pickup element surface 4 and a back monitor 5 can be disposed in the body of the single-lens mirrorless camera 1. As an image pickup element, an element such as a small-size CCD (charge coupled device) or a CMOS (complementary metal-oxide semiconductor) can be used.

Moreover, as the photographic optical system 2 of the single-lens mirrorless camera 1, the zoom optical system described in any one of the examples from the first example to the eighth example can be used.

Figure 18:
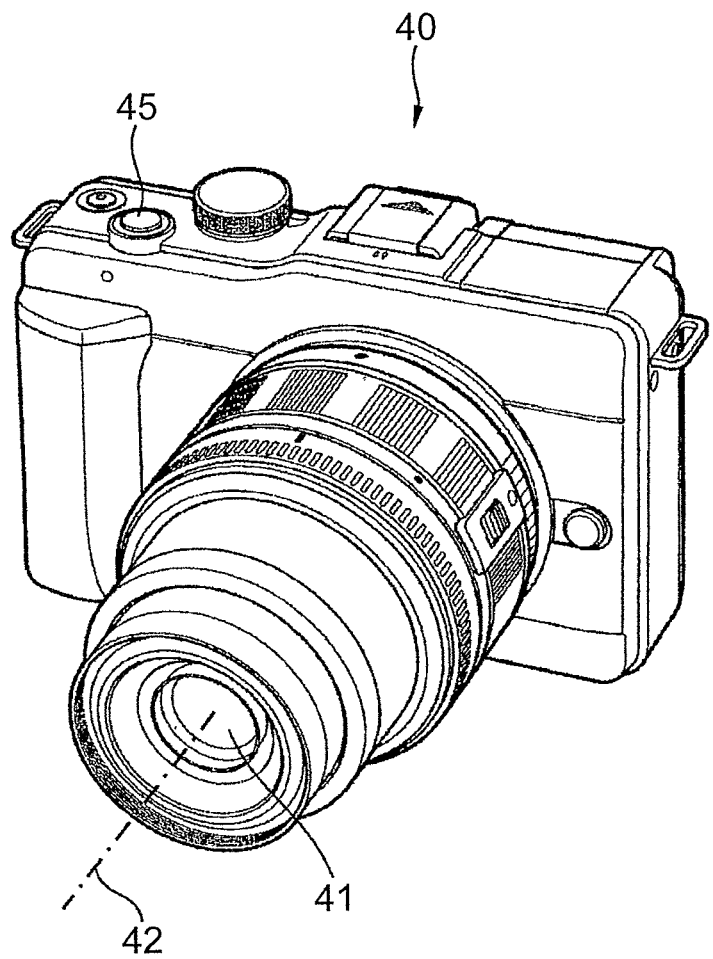
FIG. 18 is a front perspective view of the image pickup apparatus.
Figure 19:
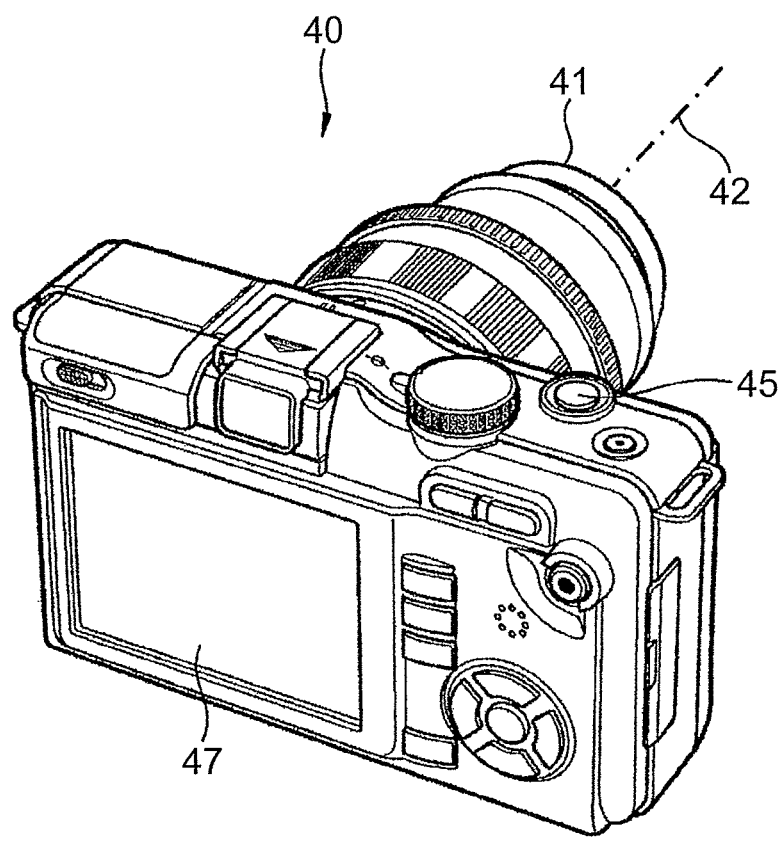
FIG. 19 is a rear perspective view of the image pickup apparatus.

FIG. 18 and FIG. 19 are conceptual diagrams of an arrangement of the image pickup apparatus. FIG. 18 is a front perspective view of a digital camera 40 as the image pickup apparatus, and FIG. 19 is a rear perspective view of the digital camera 40. The zoom optical system according to the present example can be used in a photographic optical system 41 of the digital camera 40.

The digital camera 40 according to the present embodiment can include the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography can be carried out by the photographic optical system 41 such as the zoom optical system according to the first example. An object image which is formed by the photographic optical system 41 can be formed on an image pickup element (photoelectric conversion surface) which is provided near an image forming surface. The object image which has been received optically by the image pickup element can be displayed on the liquid-crystal display monitor 47 which is provided to a rear surface of the camera, as an electronic image by a processor. Moreover, it is possible to record the electronic image which has been photographed, in a storage means.

Figure 20:
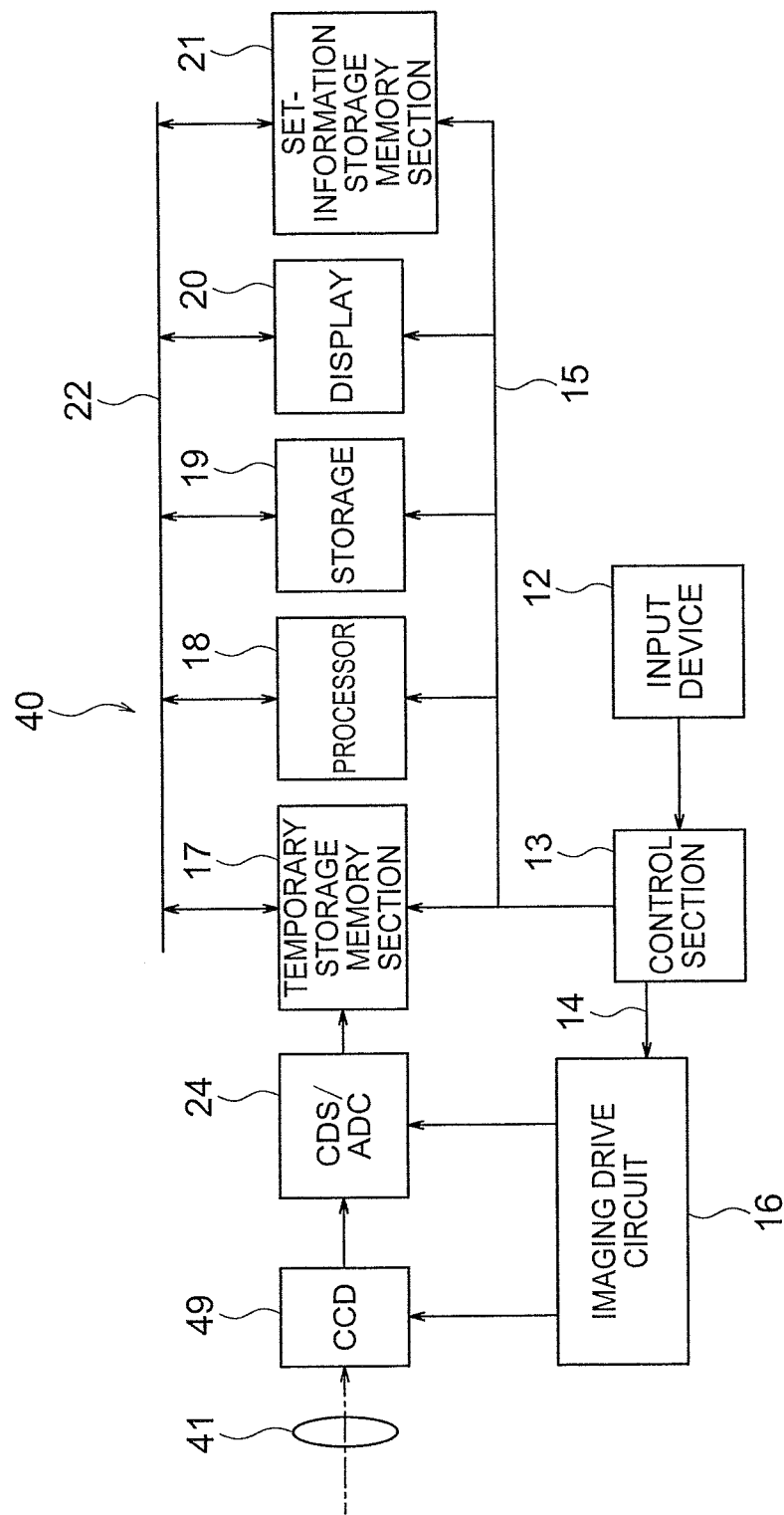
FIG. 20 is a structural block diagram of an internal circuit of a main part of the image pickup apparatus.

FIG. 20 is a structural block diagram of an internal circuit of main components of the digital camera 40. In the following description, the processor described above can include for instance, a CDS/ADC section 24, a temporary storage memory 117, and a processor 18, and a memory can consist of a storage 19 for example.

As shown in FIG. 20, the digital camera 40 can include an input device 12, a control section 13 which is connected to the input device 12, the temporary storage memory 17 and an imaging drive circuit 16 which are connected to a control-signal output port of the control section 13, via a bus 14 and a bus 15, the processor 18, the storage 19, a display 20, and a set-information storage memory section 21.

The temporary storage memory 17, the processor 18, the storage 19, the display 20, and the set-information storage memory section 21 are structured to be capable of mutually inputting and outputting data via a bus 22. Moreover, the CCD 49 and the CDS/ADC section 24 can be connected to the imaging drive circuit 16.

The input device 12 can include various input buttons and switches, and can inform the control section 13 of event information which is input from outside (by a user of the digital camera) via these input buttons and switches. The control section 13 is a central processing unit (CPU), and can include a built-in computer program memory which is not shown in the diagram. The control section 13 can control the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and can output to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 can be a buffer which includes an SDRAM (Synchronous Dynamic Random Access Memory) for example, and can be a memory device which stores temporarily the RAW data which is output from the CDS/ADC section 24. The processor 18 is a circuit which reads the RAW data stored in the temporary storage memory 17, or the RAW data stored in the storage 19, and carries out electrically various image-processing including the distortion correction, based on image-quality parameters specified by the control section 13.

The storage 19 is a recording medium in the form of a card or a stick including a flash memory for instance, detachably mounted. The storage 19 can record and maintain the RAW data transferred from the temporary storage memory 17 and image data subjected to image processing in the processor 18 in the card flash memory and the stick flash memory.

The display 20 includes the liquid-crystal display monitor, and can display photographed RAW data, image data and operation menu on the liquid-crystal display monitor. The set-information storage memory section 21 can include a ROM section in which various image quality parameters are stored in advance, and a RAM section which stores image quality parameters which are selected by an input operation on the operating section 12, from among the image quality parameters which are read from the ROM section.

Figure 21:
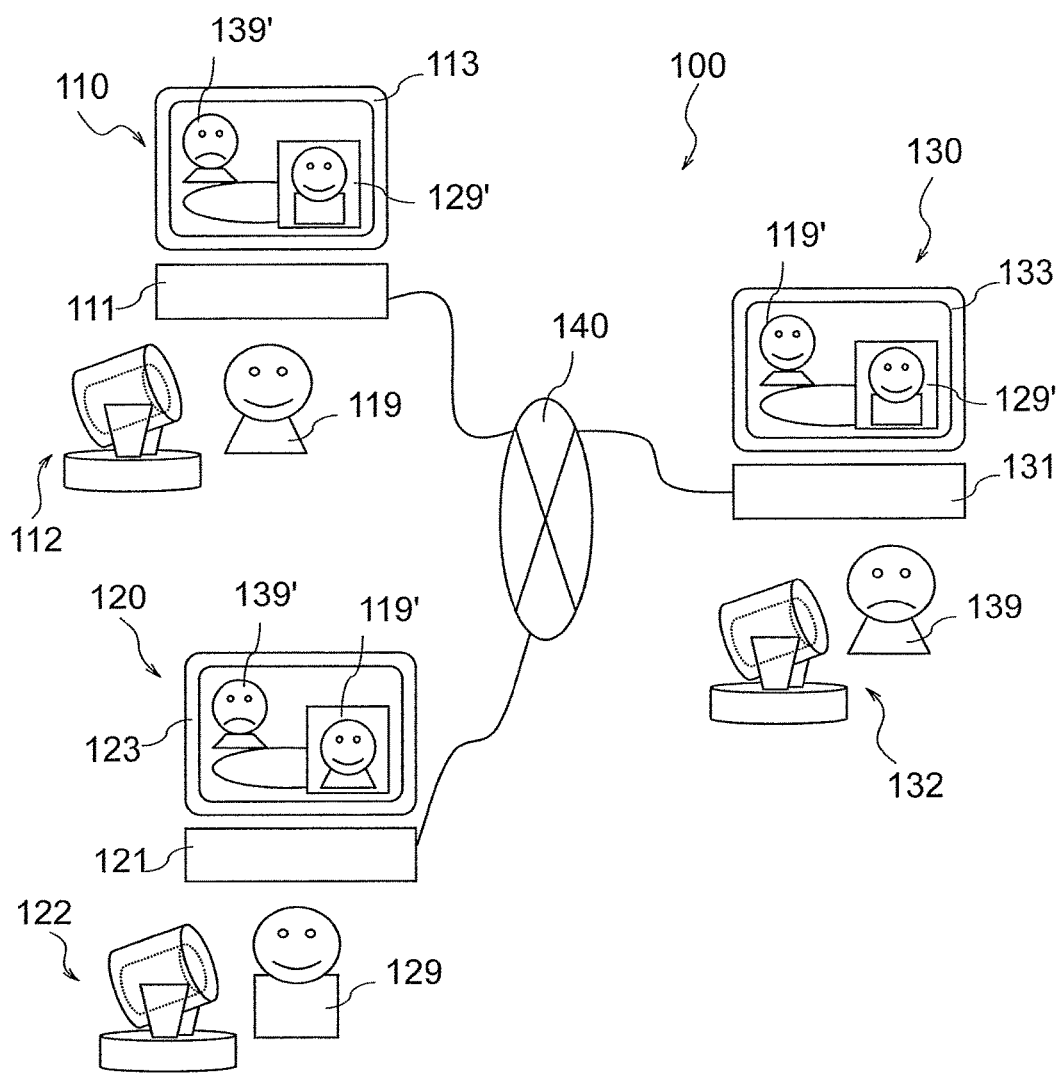
FIG. 21 is a diagram illustrating an arrangement of a television conference system.

FIG. 21 shows an arrangement of a television conference system. The television conference system 100 can include a plurality of television conference apparatuses 110, 120, and 130. Moreover, each of the television conference apparatuses 110, 120, and 130 is can be connected to a network such as a wide area network (WAN) 140.

The television conference apparatus 110 can include a main unit 111, a camera 112, and a display 113. Similarly, the television conference apparatus 120 and the television conference apparatus 130 can include same units. The camera 112 can include zoom optical system of example 1 and an image pickup sensor. Photography of conference participants and conference material can be carried out by the image pickup sensor.

The television conference apparatuses 110, 120, and 130 can be disposed at bases (remote places) which are mutually isolated. Therefore, image of each of conference participant 119, 129, 139 can be transmitted to a television conference apparatus used by other conference participants, via the wide area network (WAN) 140. As a result, an image 129' of the conference participants 129 and an image 139' of the conference participants 139 can be displayed on the display 113. Moreover, an audio can be also transmitted together with the transmission of images. Concerning the display 123 and the display 133, display is performed as with the display 113.

In such manner, by using the television conference system 100, even when the bases are remote places, each of the conference participants 119, 129, and 139 is able to get on with the meeting while watching and listening to other conference participants. A television conference apparatus to be used at each base is not necessarily required to be the same apparatus.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

The present invention can provide a zoom optical system securing a wide angle of view at the wide angle end and a small F-number, and having favorably corrected aberrations, and an image pickup apparatus using the same.

As described above, the present invention is suitable for a zoom optical system securing a wide angle of view at the wide angle end and a small F-number, and having favorably corrected aberrations, and an image pickup apparatus using the same.

What is claimed is:

1. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to an image side among the two or more lens units having a positive refractive power,
when the plurality of lens units include two or more lens units having a negative refractive power, the object-side negative lens unit is disposed closest to an object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit, and
the following Conditional Expressions (23), (17-2), and (30) are satisfied:

$$0.6 \leq FNOw \leq 4.0 \quad (23),$$

$$49.0° \leq \Omega Hw/2 \leq 88.0° \quad (17\text{-}2), \text{ and}$$

$$3.15 \text{ mm} \leq Rimg \leq 40.0 \text{ mm} \quad (30)$$

where
FNOw is an F-number at the wide angle end,
ΩHw is a total angle of view in a horizontal direction at the wide angle end, and
Rimg is a radius of an image circle at an image pickup element.

2. An image pickup apparatus comprising:
an optical system; and
an image pickup element having an image pickup surface and converting an image formed on the image pickup surface with the optical system into an electrical signal, wherein
the optical system is the zoom optical system as claimed in claim 1.

3. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to an image side among the two or more lens units having a positive refractive power,
when the plurality of lens units include two or more lens units having a negative refractive power, the object-side negative lens unit is disposed closest to an object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit, and
the following Conditional Expressions (23-1), (25-1), (17-3), and (30) are satisfied:

$$0.6 \leq FNOw \leq 3.9 \quad (23\text{-}1),$$

$$0.0 \leq ft/fw + 13.38 \times \tan(\Omega Hw/2) - 21.0 \leq 350 \quad (25\text{-}1),$$

$$35.5° \leq \Omega Hw/2 \leq 88.0° \quad (17\text{-}3), \text{ and}$$

$$3.15 \text{ mm} \leq Rimg \leq 40.0 \text{ mm} \quad (30)$$

where
FNOw is an F-number at the wide angle end,
ft is a focal length of the zoom optical system at the telephoto end,
fw is a focal length of the zoom optical system at the wide angle end,
$\Omega$Hw is a total angle of view in a horizontal direction at the wide angle end, and
Rimg is a radius of an image circle at an image pickup element.

4. A zoom optical system comprising:
a plurality of lens units; and
an aperture stop, wherein
the lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit, and includes a predetermined positive lens satisfying the following Conditional Expression (2),
the image-side positive lens unit is disposed closest to the image side among the two or more lens units having a positive refractive power,
when the lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens, and
the following Conditional Expression (1) is satisfied:

$$0.1 \leq fGBUN1/fGPM \leq 2.1 \quad (1), \text{ and}$$

$$60.8 \leq vdGPMP1 \leq 100.0 \quad (2)$$

where
fGBUN1 is a focal length of the first sub-lens unit,
fGPM is a focal length of the positive lens unit,
vdGPMP1 is an Abbe number of the predetermined positive lens, the predetermined positive lens is a positive lens with the largest Abbe number among positive lenses of the positive lens unit, and
a lens component is a single lens or a cemented lens.

5. An image pickup apparatus comprising:
an optical system; and
an image pickup element having an image pickup surface and converting an image formed on the image pickup surface with the optical system into an electrical signal, wherein
the optical system is the zoom optical system as claimed in claim 4.

6. A zoom optical system comprising:
a plurality of lens units; and
an aperture stop, wherein
the lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to the image side among the two or more lens units having a positive refractive power,
when the lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens, and
the following Conditional Expressions (3) and (4) are satisfied:

$$0.02 \leq DGBUN12a/fGBUN1 \leq 4.0 \quad (3), \text{ and}$$

$$0.43 \leq |(MGGBUN1\text{back}) \times (MGGBUN1-1)| \leq 5.0 \quad (4)$$

where
DGBUN12a is an air space between the first sub-lens unit and the second sub-lens unit, fGBUN1 is a focal length of the first sub-lens unit,
MGGBUN1 is a lateral magnification in the first sub-lens unit,
MGGBUN1back is lateral magnification in the predetermined optical system,
the predetermined optical system is an optical system formed of all the lenses disposed closer to the image side than the first sub-lens unit is,
the lateral magnification is lateral magnification at a time of focusing to an object at infinity, and
a lens component is a single lens or a cemented lens.

7. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit, and includes a predetermined positive lens satisfying the following Conditional Expression (2-1),
the image-side positive lens unit is disposed closest to the image side among the two or more lens units having a positive refractive power,
when the plurality of lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens, and
the following Conditional Expression (5) is satisfied:

$$64.8 \leq vdGPMP1 \leq 100.0 \quad (2\text{-}1), \text{ and}$$

$$-2.6 \leq SFGBUN1 \leq 0.95 \quad (5)$$

where
vdGPMP1 is an Abbe number of the predetermined positive lens,
the predetermined positive lens is a positive lens with the largest Abbe number among positive lenses of the positive lens unit,
SFGBUN1 is indicated with the following expression:

$$SFGBUN1=(RGBUN1f+RGBUN1r)/(RGBUN1f-RGBUN1r),$$

RGBUN1f is a radius of curvature of a lens surface disposed closest to the object side among the first sub-lens unit, and
RGBUN1r is a radius of curvature of a lens surface disposed closest to the image side among the first sub-lens unit, and
a lens component is a single lens or a cemented lens.

8. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to the image side among the two or more lens units having a positive refractive power,
when the plurality of lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens,
a space between the image-side positive lens unit and the lens unit disposed adjacent to the image-side positive lens unit is changed at a time of zooming,
a lens surface disposed closest to the image side among the first sub-lens unit is a surface convex on the image side, and the following Conditional Expressions (6), (7), and (8) are satisfied:

$$2.0 \leq fGPM/fw \leq 20.0 \quad (6),$$

$$2.3 \leq fGBUN1/fw \leq 9.7 \quad (7), \text{ and}$$

$$3.0 \leq |LTL\max/fGN1| \leq 16.3 \quad (8)$$

where
fGPM is a focal length of the positive lens unit,
fGBUN1 is a focal length of the first sub-lens unit,
fw is a focal length of the zoom optical system at the wide angle end,
LTLmax is a maximum whole length among whole lengths of the zoom optical system,
fGN1 is a focal length of the object-side negative lens unit, and
a lens component is a single lens or a cemented lens.

9. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit, and includes a predetermined positive lens satisfying the following Conditional Expression (2-2),
the image-side positive lens unit is disposed closest to the image side among the two or more lens units having a positive refractive power,
when the plurality of lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens, and
the following Conditional Expressions (17-1) and (5-2) are satisfied:

$$60 \leq vdGPMP1 \leq 100.0 \quad (2\text{-}2),$$

$$31.9° \leq \Omega Hw/2 \leq 88.0° \quad (17\text{-}1), \text{ and}$$

$$-1.91 \leq SFGBUN1 \leq 0.95 \quad (5\text{-}2)$$

where
vdGPMP1 is an Abbe number of the predetermined positive lens, and
the predetermined positive lens is a positive lens with the largest Abbe number among positive lenses of the positive lens unit,
$\Omega Hw$ is a total angle of view at the wide angle end,
SFGBUN1 is indicated with the following expression:

$$SFGBUN1=(RGBUN1f)+(RGBUN1r)/(RGBUN1f-RGBUN1),$$

RGBUN1f is a radius of curvature of a lens surface disposed closest to the object side among the first sub-lens unit, and
RGBUN1r is a radius of curvature of a lens surface disposed closest to the image side among the first sub-lens unit.

10. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to the image side among the two or more lens units having a positive refractive power,
when the plurality of lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the image-side positive lens unit includes a first sub-lens unit having a positive refractive power, and a second sub-lens unit including a positive lens and a negative lens, and
the following Conditional Expressions (17-1) and (1) are satisfied.

$$31.9° \leq \Omega Hw/2 \leq 88.0° \quad (17\text{-}1), \text{ and}$$

$$0.1 \leq fGBUN1/fGPM \leq 2.1 \quad (1)$$

where
ΩHw is a total angle of view in a horizontal direction at the wide angle end,
fGBUN1 is a focal length of the first sub-lens unit, and
fGPM is a focal length of the positive lens unit.

11. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to the image side among the two or more lens units having a positive refractive power,
when the plurality of lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens,
the aperture stop is moved only in one direction along the optical axis or not moved at a time of zooming, and
the following Conditional Expressions (17-1) and (8-1) are satisfied:

$$31.9° \leq \Omega Hw \leq 88.0° \qquad (17\text{-}1), \text{ and}$$

$$1.0 \leq |LTL\text{max}/fGN1| \leq 19.0 \qquad (8\text{-}1)$$

where
ΩHw is a total angle of view in a horizontal direction at the wide angle end,
LTLmax is a maximum whole length among whole lengths of the zoom optical system, and
fGN1 is a focal length of the object-side negative lens unit.

12. A zoom optical system comprising:
a plurality of lens units; and
an aperture stop, wherein
the plurality of lens units consist of two or more lens units having a positive refractive power, and one or two or more lens units having a negative refractive power,
the two or more lens units having a positive refractive power include a positive lens unit having a positive refractive power, and an image-side positive lens unit,
the one or two or more lens units having a negative refractive power include an object-side negative lens unit,
the image-side positive lens unit is not moved along an optical axis at a time of zooming or at a time of focusing,
in the plurality of lens units, a space between the lens units disposed adjacently is changed at a time of zooming, at a time of focusing, or at a time of zooming and at a time of focusing,
the positive lens unit has the largest refractive power among the two or more lens units having a positive refractive power excluding the image-side positive lens unit,
the image-side positive lens unit is disposed closest to the image side among the two or more lens units having a positive refractive power,
when the plurality of lens units include two or more lens units having a negative refractive power, the object-side negative lens unit is disposed closest to the object side among the one or two or more lens units having a negative refractive power,
the object-side negative lens unit is moved such that a space between the object-side negative lens unit and the positive lens unit at a time of focusing to an object at infinity is narrower at a telephoto end than that at a wide angle end,
the aperture stop is disposed between a lens surface disposed closest to the image side in the object-side negative lens unit and a lens surface disposed closest to the image side in the positive lens unit, or adjacent to the lens surface disposed closest to the image side in the positive lens unit,
the image-side positive lens unit includes a first sub-lens unit having a positive refractive power, and a second sub-lens unit including a positive lens and a negative lens,
the aperture stop is moved only in only direction along the optical axis or not moved at a time of zooming, and
the following Conditional Expressions (17-1) and (5-1) are satisfied:

$$31.9° \leq \Omega Hw \leq 288.0° \qquad (17\text{-}1), \text{ and}$$

$$-2.0 \leq SFGBUN1 \leq 0.95 \qquad (5\text{-}1)$$

where
ΩHw is the total angle of view at the wide angle end,
SFGBUN1 is indicated with the following expression:

$$SFGBUN1=(RGBUN1f)+(RGBUN1r)/(RGBUN1f-RGBUN1),$$

RGBUN1f is a radius of curvature of a lens surface disposed closest to the object side among the first sub-lens unit, and
RGBUN1r is a radius of curvature of a lens surface disposed closest to the image side among the first sub-lens unit.

13. The zoom optical system as claimed in claim 12, wherein a lens surface disposed closest to the image side in the first sub-lens unit is a surface convex on the image side.

14. The zoom optical system as claimed in claim 12, wherein a space between the image-side positive lens unit and a lens unit disposed adjacent to the image-side positive lens unit is changed at a time of zooming.

15. The zoom optical system as claimed in claim 12, wherein the following Conditional Expression (1) is satisfied:

$$0.1 \leq fGBUN1/fGPM \leq 2.1 \tag{1}$$

where
fGBUN1 is a focal length of the first sub-lens unit, and
fGPM is a focal length of the positive lens unit.

16. The zoom optical system as claimed in claim 12, wherein the positive lens unit includes a predetermined positive lens satisfying the following Conditional Expression (2-2):

$$60 \leq vdGPMP1 \leq 100.0 \tag{2-2}$$

where
vdGPMP1 is an Abbe number of the predetermined positive lens, and
the predetermined positive lens is a positive lens with the largest Abbe number among positive lenses of the positive lens unit.

17. The zoom optical system as claimed in claim 12, wherein the following Conditional Expression (3) is satisfied:

$$0.02 \leq DGBUN12a/fGBUN1 \leq 4.0 \tag{3}$$

where
DGBUN12a is an air space between the first sub-lens unit and the second sub-lens unit, and
fGBUN1 is a focal length of the first sub-lens unit.

18. The zoom optical system as claimed in claim 12, wherein the following Conditional Expression (4) is satisfied:

$$0.43 \leq |(MGGBUN1back) \times (MGGBUN1-1)| \leq 5.0 \tag{4}$$

where
MGGBUN1 is a lateral magnification in the first sub-lens unit,
MGGBUN1back is lateral magnification in the predetermined optical system,
the predetermined optical system is an optical system formed of all lenses disposed closer to the image side than the first sub-lens unit is, and
the lateral magnification is lateral magnification at a time of focusing to an object at infinity.

19. The zoom optical system as claimed in claim 12, wherein the following Conditional Expression (5) is satisfied:

$$-2.6 \leq SFGBUN1 \leq 0.95 \tag{5}$$

where
SFGBUN1 is indicated with the following expression:

$$SFGBUN1 = (RGBUN1f + RGBUN1r)/(RGBUN1f - RGBUN1r),$$

RGBUN1f is a radius of curvature of a lens surface disposed closest to the object side in the first sub-lens unit, and
RGBUN1r is a radius of curvature of a lens surface disposed closest to the image side in the first sub-lens unit.

20. The zoom optical system as claimed in claim 12, wherein the following Conditional Expression (6) is satisfied:

$$-2.0 \leq fGPM \leq 20.0 \tag{6}$$

where
fGPM is a focal length of the positive lens unit,
fw is a focal length of the zoom optical system at the wide angle end, and
a lens component is a single lens or a cemented lens.

21. The zoom optical system as claimed in claim 12, wherein the following Conditional Expression (7) is satisfied:

$$2.3 \leq fGBUN1/fw \leq 9.7 \tag{7}$$

where
fGBUN1 is a focal length of the first sub-lens unit, and
fw is a focal length of the zoom optical system at the wide angle end.

22. The zoom optical system as claimed in claim 12, wherein the following Conditional Expression (8-1) is satisfied:

$$1.0 \leq |LTLmax/fGN1| \leq 19.0 \tag{8-1}$$

where
LTLmax is a maximum whole length among whole lengths of the zoom optical system, and
fGN1 is a focal length of the object-side negative lens unit.

23. The zoom optical system as claimed in claim 12, wherein a lens surface disposed closest to the object side in the first sub-lens unit is a surface convex on the object side.

24. The zoom optical system as claimed in claim 12, wherein the positive lens unit is moved to be disposed closer to the object side at the telephoto end than the object side at the wide angle end, at a time of focusing to an object at infinity.

25. The zoom optical system as claimed in claim 12, wherein the following Conditional Expression (9) is satisfied:

$$0.25 \leq |fGN1/fGPM| \leq 2.0 \tag{9}$$

where
fGN1 is a focal length of the object-side negative lens unit, and
fGPM is a focal length of the positive lens unit.

26. The zoom optical system as claimed in claim 12, wherein the following Conditional Expression (10) is satisfied:

$$1.05 \leq |fGN1/fw| \leq 5.5 \tag{10}$$

where
fGN1 is a focal length of the object-side negative lens unit, and
fw is a focal length of the zoom optical system at the wide angle end.

27. The zoom optical system as claimed in claim 12, wherein the following Conditional Expression (11) is satisfied:

$$2.0 \leq fGB/fw \leq 23 \tag{11}$$

where
fGB is a focal length of the image-side optical lens unit, and
fw is a focal length of the zoom optical system at the wide angle end.

28. The zoom optical system as claimed in claim 12, wherein the following Conditional Expression (12) is satisfied:

$$3.5 \leq fGBUN1/IHw35 \leq 14.0 \quad (12)$$

where
fGBUN1 is a focal length of the first sub-lens unit,
IHw35 is indicated with the following expression:

$$IHw35 = fw \times \tan 35°, \text{ and}$$

fw is a focal length of the zoom optical system at the wide angle end.

29. The zoom optical system as claimed in claim 12, wherein the following Conditional Expression (13) is satisfied:

$$1.8 \leq |fGN1/IHw35| \leq 8.0 \quad (13)$$

where
fGN1 is a focal length of the object-side negative lens unit,
IHw35 is indicated with the following expression:

$$IHw35 = fw \times \tan 35°, \text{ and}$$

fw is a focal length of the zoom optical system at the wide angle end.

30. The zoom optical system as claimed in claim 12, wherein the following Conditional Expression (14) is satisfied:

$$0.1 \leq DGBUN12a/fw \leq 2.0 \quad (14)$$

where
DGBUN12a is an air space between the first sub-lens unit and the second sub-lens unit, and
fw is a focal length of the zoom optical system at the wide angle end.

31. The zoom optical system as claimed in claim 12, wherein the first sub-lens unit is formed of a lens component without air space.

32. The zoom optical system as claimed in claim 12, wherein:
the first sub-lens unit consists of one positive lens, and the following Conditional Expression (15) is satisfied:

$$52 \leq vdGBUN1P \leq 100.0 \quad (15)$$

where
vdGBUN1 P is an Abbe number of the positive lens of the first sub-lens unit.

33. The zoom optical system as claimed in claim 12, wherein the second sub-lens unit consists of a negative lens and a positive lens.

34. The zoom optical system as claimed in claim 12, wherein:
the first sub-lens unit consists of one positive lens, and the second sub-lens unit consists of one negative lens and one positive lens.

35. The zoom optical system as claimed in claim 12, wherein the second sub-lens unit consists of a negative lens, a positive lens, and a negative lens disposed closest to the image side.

36. The zoom optical system as claimed in claim 12, wherein the positive lens and the negative lens of the second sub-lens unit are cemented.

37. The zoom optical system as claimed in claim 12, wherein the second sub-lens unit is fixed at a time of zooming.

38. The zoom optical system as claimed in claim 12, wherein the second sub-lens unit includes a negative lens satisfying the following Conditional Expression (16):

$$18.5 \leq vdGBUN2N \leq 55.0 \quad (16)$$

where
vdGBUN2N is an Abbe number of the negative lens of the second sub-lens unit.

39. The zoom optical system as claimed in claim 12, wherein the aperture stop is disposed closer to the object side than the positive lens unit.

40. The zoom optical system as claimed in claim 12, wherein a moving lens unit is disposed on the object side of the image-side positive lens unit,
the moving lens unit is moved along the optical axis at a time of zooming.

41. The zoom optical system as claimed in claim 12, wherein the first sub-lens unit is moved in a direction orthogonal to the optical axis.

42. The zoom optical system as claimed in claim 12, wherein:
an intermediate lens unit is disposed between the object-side negative lens unit and the positive lens unit, and
in comparison of absolute values of refractive powers, a refractive power of the intermediate lens unit is smaller than a refractive power of the object-side negative lens unit, and smaller than a refractive power of the positive lens unit.

43. The zoom optical system as claimed in claim 12, wherein the object-side negative lens unit and the positive lens unit are disposed adjacent to each other.

44. The zoom optical system as claimed in claim 12, wherein an image-side negative lens unit having a negative refractive power is disposed between the positive lens unit and the image-side positive lens unit.

45. The zoom optical system as claimed in claim 12, wherein the following Conditional Expression (17) is satisfied:

$$31.9° \leq \Omega Hw/2 \leq 75.0° \quad (17)$$

where
$\Omega Hw$ is a total angle of view in the horizontal direction at the wide angle end.

46. The zoom optical system as claimed in claim 12, wherein the positive lens unit includes a positive lens and a negative lens.

47. The zoom optical system as claimed in claim 12, wherein the positive lens unit includes a first positive lens disposed closest to the object side, and a second positive lens disposed closest to the image side, and
a lens surface on the image side of the second positive lens is a convex surface.

48. The zoom optical system as claimed in claim 12, wherein a whole length of the zoom optical system is fixed at a time of zooming.

49. The zoom optical system as claimed in claim 12, wherein the aperture stop is moved only in one direction along the optical axis, or is not moved, at a time of zooming.

50. The zoom optical system as claimed in claim 12, wherein the aperture stop is not moved at a time of zooming.

51. The zoom optical system as claimed in claim 12, wherein a predetermined positive lens unit having a positive refractive power is disposed on the object side of the object-side negative lens unit.

52. The zoom optical system as claimed in claim 12, wherein the positive lens unit is not moved along the optical axis at a time of zooming.

53. The zoom optical system as claimed in claim 12, wherein the object-side negative lens unit is disposed closest to the object side.

54. The zoom optical system as claimed in claim 12, wherein the object-side negative lens unit includes a first negative meniscus lens, a second negative meniscus lens, and one positive lens, the first negative meniscus lens is disposed closest to the object side,
the second negative meniscus lens is disposed on the image side of the first negative meniscus lens, and
each of a lens surface of the first negative meniscus lens on the object side and a lens surface of the second negative meniscus lens on the object side is a surface concave on the image side.

55. The zoom optical system as claimed in claim 12, wherein the following Conditional Expression (22) is satisfied:

$$7.0 \leq ft/fw \leq 120 \tag{22}$$

where
ft is a focal length of the zoom optical system at the telephoto end, and
fw is a focal length of the zoom optical system at the wide angle end.

56. The zoom optical system as claimed in claim 12, wherein the following Conditional Expression (23) is satisfied:

$$0.6 \leq FNOw \leq 4.0 \tag{23}$$

where
FNOw is an F-number at the wide angle end.

57. The zoom optical system as claimed in claim 12, wherein the following Conditional Expression (24) is satisfied:

$$0.7 \leq FNOt \leq 5.1 \tag{24}$$

where
FNOt is an F-number at the telephoto end.

58. The zoom optical system as claimed in claim 12, wherein the following Conditional Expression (25-1) is satisfied:

$$0.0 \leq ft/fw + 13.38 \times \tan(\Omega Hw/2) - 21.0 \leq 350 \tag{25-1}$$

where
fw is a focal length of the zoom optical system at the wide angle end, ft is a focal length of the zoom optical system at the telephoto end, and
$\Omega Hw$ is a total angle of view in the horizontal direction at the wide angle end.

59. The zoom optical system as claimed in claim 12, wherein the following Conditional Expression (27) is satisfied:

$$-2.3 < fw \times FNOw/fGN1 < -0.4 \tag{27}$$

where
fw is a focal length of the zoom optical system at the wide angle end,
FNOw is an F-number at the wide angle end, and
fGN1 is a focal length of the object-side negative lens unit.

60. The zoom optical system as claimed in claim 12, wherein the following Conditional Expression (29) is satisfied:

$$-25\% < DTw < 5\% \tag{29}$$

where
DTw is a distortion amount at the maximum angle of view at the wide angle end, and indicated with the following expression:

$$DTw = (IHw1 - IHw2)/IHw2 \times 100(\%),$$

IHw1 is a real image height when luminous flux including the ray of the maximum angle of view is imaged on an image surface,
IHw2 is a paraxial image height when luminous flux including the ray of the maximum angle of view is imaged on the image surface, and
each of them is an image height at a time of focusing to an object at infinity.

61. An image pickup apparatus comprising:
an optical system; and
an image pickup element having an image pickup surface and converting an image formed on the image pickup surface with the optical system into an electrical signal, wherein
the optical system is the zoom optical system as claimed in claim 12.

* * * * *